United States Patent
Ranatunga et al.

(10) Patent No.: US 10,796,234 B2
(45) Date of Patent: *Oct. 6, 2020

(54) RANKED INSIGHT MACHINE LEARNING OPERATION

(71) Applicant: Cognitive Scale, Inc., Austin, TX (US)

(72) Inventors: Dilum Ranatunga, Austin, TX (US);
Stephen P. Draper, Austin, TX (US);
Michael Dobson, Austin, TX (US);
Matthew Sanchez, Austin, TX (US)

(73) Assignee: Cognitive Scale, Inc., Austin, TX (US)

( * ) Notice: Subject to any disclaimer, the term of this patent is extended or adjusted under 35 U.S.C. 154(b) by 637 days.

This patent is subject to a terminal disclaimer.

(21) Appl. No.: 15/432,527

(22) Filed: Feb. 14, 2017

(65) Prior Publication Data
US 2018/0232659 A1  Aug. 16, 2018

(51) Int. Cl.
*G06N 5/04*     (2006.01)
*G06Q 30/02*    (2012.01)
*G06N 7/00*     (2006.01)
*G06Q 10/10*    (2012.01)
*G06Q 50/14*    (2012.01)
*G06Q 50/12*    (2012.01)
*G06Q 10/04*    (2012.01)

(52) U.S. Cl.
CPC ............. *G06N 5/04* (2013.01); *G06N 7/005* (2013.01); *G06Q 10/04* (2013.01); *G06Q 10/10* (2013.01); *G06Q 30/02* (2013.01); *G06Q 30/0201* (2013.01); *G06Q 30/0241* (2013.01); *G06Q 30/0271* (2013.01); *G06Q 50/12* (2013.01); *G06Q 50/14* (2013.01)

(58) Field of Classification Search
CPC ............ G06N 5/02; G06N 5/04; G06N 99/00; G06N 99/005; G06F 17/0345; G06F 17/30598; G06F 17/30867
See application file for complete search history.

(56) References Cited

U.S. PATENT DOCUMENTS 8,140,615 B2 *   3/2012  Miller ................ G06Q 10/06
                                                709/202
10,445,656 B2    10/2019 Sanchez et al.
(Continued)

OTHER PUBLICATIONS

Zhou, Mingyuan, Yulai Cong, and Bo Chen. "Augmentable gamma belief networks." The Journal of Machine Learning Research 17.1 (2016): pp. 1-44. (Year: 2016).*

(Continued)

*Primary Examiner* — Kamran Afshar
*Assistant Examiner* — Randall K. Baldwin
(74) *Attorney, Agent, or Firm* — Terrile, Cannatti & Chambers; Stephen A. Terrile

(57) ABSTRACT

A method, system and computer readable medium for generating a cognitive insight comprising: receiving training data, the training data being based upon interactions between a user and a cognitive learning and inference system; performing a ranked insight machine learning operation on the training data; generating a cognitive profile based upon the information generated by performing the ranked insight machine learning operations; and, generating a cognitive insight based upon the cognitive profile generated using the plurality of machine learning operations.

20 Claims, 22 Drawing Sheets

(56) References Cited

U.S. PATENT DOCUMENTS

| | | | |
|---|---|---|---|
| 2010/0250556 A1* | 9/2010 | Park | G06F 16/335 |
| | | | 707/749 |
| 2011/0106743 A1 | 5/2011 | Duchon | |
| 2014/0171039 A1* | 6/2014 | Bjontegard | H04W 4/029 |
| | | | 455/414.1 |
| 2015/0278688 A1* | 10/2015 | Miao | G06F 16/345 |
| | | | 706/55 |
| 2015/0356410 A1* | 12/2015 | Faith | G06F 16/287 |
| | | | 706/46 |
| 2015/0356411 A1 | 12/2015 | Faith et al. | |
| 2015/0356437 A1* | 12/2015 | Sanchez | G06F 16/287 |
| | | | 706/55 |
| 2016/0026720 A1* | 1/2016 | Lehrer | G06Q 10/101 |
| | | | 707/710 |
| 2016/0275046 A1 | 9/2016 | Zheng et al. | |

OTHER PUBLICATIONS

Wang, Xuerui, and Andrew McCallum. "Topics over time: a non-Markov continuous-time model of topical trends." Proceedings of the 12th ACM SIGKDD international conference on Knowledge discovery and data mining. ACM, 2006 (Year: 2006).*

Mingyuan Zhou et al., Augmentable Gamma Belief Networks, Submitted Dec. 9, 2015, Published Sep. 2016 in Journal of Machine Learning Research 17 (2016), https://arxiv.org/pdf/1512.03081.pdf.

List of Patents or Applications Treated as Related.

* cited by examiner

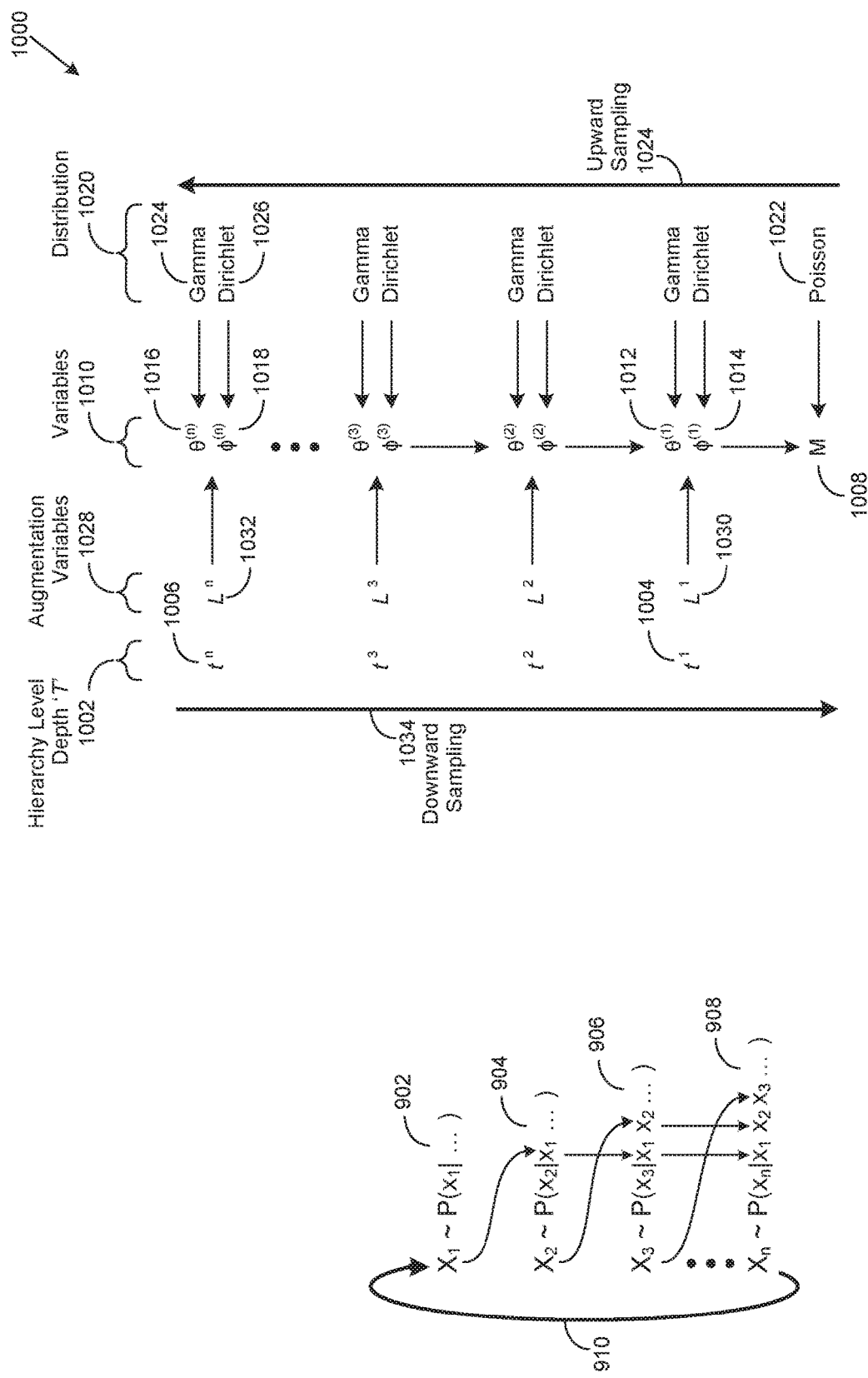

RANKED INSIGHT MACHINE LEARNING OPERATION

BACKGROUND OF THE INVENTION

Field of the Invention

The present invention relates in general to the field of computers and similar technologies, and in particular to software utilized in this field. Still more particularly, it relates to a method, system and computer-usable medium for generating and using cognitive insights via a ranked insight machine learning operation.

Description of the Related Art

In general, "big data" refers to a collection of datasets so large and complex that they become difficult to process using typical database management tools and traditional data processing approaches. These datasets can originate from a wide variety of sources, including computer systems, mobile devices, credit card transactions, television broadcasts, and medical equipment, as well as infrastructures associated with cities, sensor-equipped buildings and factories, and transportation systems. Challenges commonly associated with big data, which may be a combination of structured, unstructured, and semi-structured data, include its capture, curation, storage, search, sharing, analysis and visualization. In combination, these challenges make it difficult to efficiently process large quantities of data within tolerable time intervals.

Nonetheless, big data analytics hold the promise of extracting insights by uncovering difficult-to-discover patterns and connections, as well as providing assistance in making complex decisions by analyzing different and potentially conflicting options. As such, individuals and organizations alike can be provided new opportunities to innovate, compete, and capture value.

One aspect of big data is "dark data," which generally refers to data that is either not collected, neglected, or underutilized. Examples of data that is not currently being collected includes location data prior to the emergence of companies such as Foursquare or social data prior to the advent of companies such as Facebook. An example of data that is being collected, but is difficult to access at the right time and place, includes data associated with the side effects of certain spider bites while on a camping trip. As another example, data that is collected and available, but has not yet been productized or fully utilized, may include disease insights from population-wide healthcare records and social media feeds. As a result, a case can be made that dark data may in fact be of higher value than big data in general, especially as it can likely provide actionable insights when it is combined with readily-available data.

SUMMARY OF THE INVENTION

In one embodiment, the invention relates to a method comprising: receiving training data, the training data being based upon interactions between a user and a cognitive learning and inference system; performing a ranked insight machine learning operation on the training data; generating a cognitive profile based upon the information generated by performing the ranked insight machine learning operations; and, generating a cognitive insight based upon the cognitive profile generated using the plurality of machine learning operations.

In one embodiment, the invention relates to a system comprising: a processor; a data bus coupled to the processor; and a non-transitory, computer-readable storage medium embodying computer program code, the non-transitory, computer-readable storage medium being coupled to the data bus. The computer program code interacting with a plurality of computer operations and comprising instructions executable by the processor and configured for: receiving training data, the training data being based upon interactions between a user and a cognitive learning and inference system; performing a ranked insight machine learning operation on the training data; generating a cognitive profile based upon the information generated by performing the ranked insight machine learning operations; and, generating a cognitive insight based upon the cognitive profile generated using the plurality of machine learning operations.

In another embodiment, the invention relates to a non-transitory, computer-readable storage medium embodying computer program code, the computer program code comprising computer executable instructions configured for: receiving training data, the training data being based upon interactions between a user and a cognitive learning and inference system; performing a ranked insight machine learning operation on the training data; generating a cognitive profile based upon the information generated by performing the ranked insight machine learning operations; and, generating a cognitive insight based upon the cognitive profile generated using the plurality of machine learning operations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 9 shows the use of Gibbs sampling by a cognitive machine learning algorithm;

FIG. 10 depicts upward-downward sampling operations performed by a cognitive machine learning algorithm;

DETAILED DESCRIPTION

Figure 1:
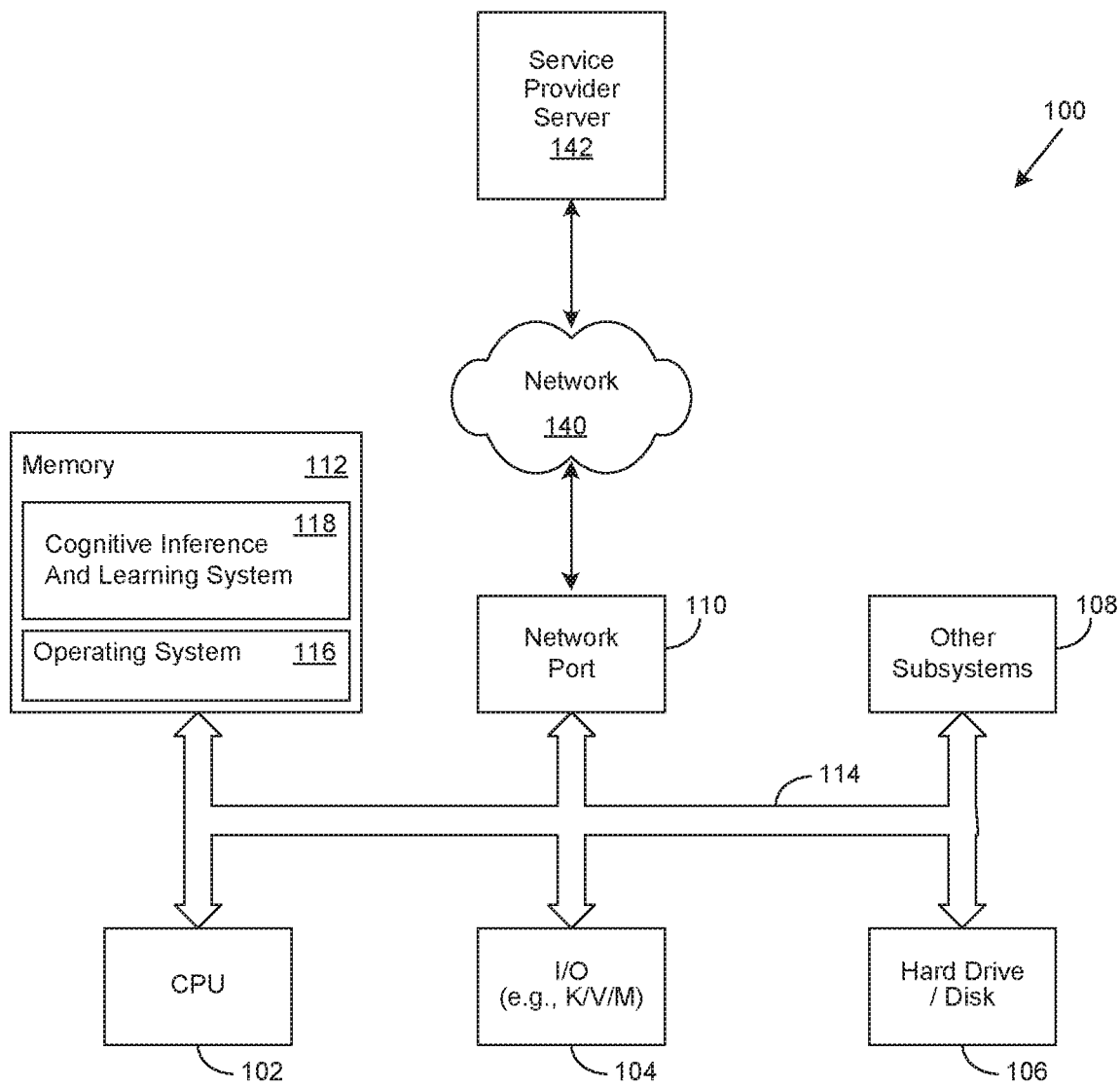
FIG. 1 depicts an exemplary client computer in which the present invention may be implemented.

A method, system and computer-usable medium are disclosed for cognitive inference and learning operations. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a generalized illustration of an information processing system 100 that can be used to implement the system and method of the present invention. The information processing system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information processing system 100 also includes network port 110 operable to connect to a network 140, which is likewise accessible by a service provider server 142. The information processing system 100 likewise includes system memory 112, which is interconnected to the foregoing via one or more buses 114. System memory 112 further comprises operating system (OS) 116 and in various embodiments may also comprise cognitive inference and learning system (CILS) 118. In these and other embodiments, the CILS 118 may likewise comprise invention modules 120. In one embodiment, the information processing system 100 is able to download the CILS 118 from the service provider server 142. In another embodiment, the CILS 118 is provided as a service from the service provider server 142.

In various embodiments, the CILS 118 is implemented to perform various cognitive computing operations described in greater detail herein. As used herein, cognitive computing broadly refers to a class of computing involving self-learning systems that use techniques such as spatial navigation, machine vision, and pattern recognition to increasingly mimic the way the human brain works. To be more specific, earlier approaches to computing typically solved problems by executing a set of instructions codified within software. In contrast, cognitive computing approaches are data-driven, sense-making, insight-extracting, problem-solving systems that have more in common with the structure of the human brain than with the architecture of contemporary, instruction-driven computers.

To further differentiate these distinctions, traditional computers must first be programmed by humans to perform specific tasks, while cognitive systems learn from their interactions with data and humans alike, and in a sense, program themselves to perform new tasks. To summarize the difference between the two, traditional computers are designed to calculate rapidly. Cognitive systems are designed to quickly draw inferences from data and gain new knowledge.

Cognitive systems achieve these abilities by combining various aspects of artificial intelligence, natural language processing, dynamic learning, and hypothesis generation to render vast quantities of intelligible data to assist humans in making better decisions. As such, cognitive systems can be characterized as having the ability to interact naturally with people to extend what either humans, or machines, could do on their own. Furthermore, they are typically able to process natural language, multi-structured data, and experience much in the same way as humans. Moreover, they are also typically able to learn a knowledge domain based upon the best available data and get better, and more immersive, over time.

It will be appreciated that more data is currently being produced every day than was recently produced by human beings from the beginning of recorded time. Deep within this ever-growing mass of data is a class of data known as "dark data," which includes neglected information, ambient signals, and insights that can assist organizations and individuals in augmenting their intelligence and deliver actionable insights through the implementation of cognitive applications. As used herein, cognitive applications, or "cognitive apps," broadly refer to cloud-based, big data interpretive applications that learn from user engagement and data interactions. Such cognitive applications extract patterns and insights from dark data sources that are currently almost completely opaque. Examples of such dark data include disease insights from population-wide healthcare records and social media feeds, or from new sources of information, such as sensors monitoring pollution in delicate marine environments.

Over time, it is anticipated that cognitive applications will fundamentally change the ways in which many organizations operate as they invert current issues associated with data volume and variety to enable a smart, interactive data supply chain. Ultimately, cognitive applications hold the promise of receiving a user query and immediately providing a data-driven answer from a masked data supply chain in response. As they evolve, it is likewise anticipated that cognitive applications may enable a new class of "sixth sense" applications that intelligently detect and learn from relevant data and events to offer insights, predictions and advice rather than wait for commands. Just as web and mobile applications changed the way people access data, cognitive applications may change the way people listen to, and become empowered by, multi-structured data such as emails, social media feeds, doctors notes, transaction records, and call logs.

However, the evolution of such cognitive applications has associated challenges, such as how to detect events, ideas, images, and other content that may be of interest. For example, assuming that the role and preferences of a given user are known, how is the most relevant information discovered, prioritized, and summarized from large streams of multi-structured data such as news feeds, blogs, social media, structured data, and various knowledge bases? To further the example, what can a healthcare executive be told about their competitor's market share? Other challenges include the creation of a contextually-appropriate visual summary of responses to questions or queries.

Figure 2:
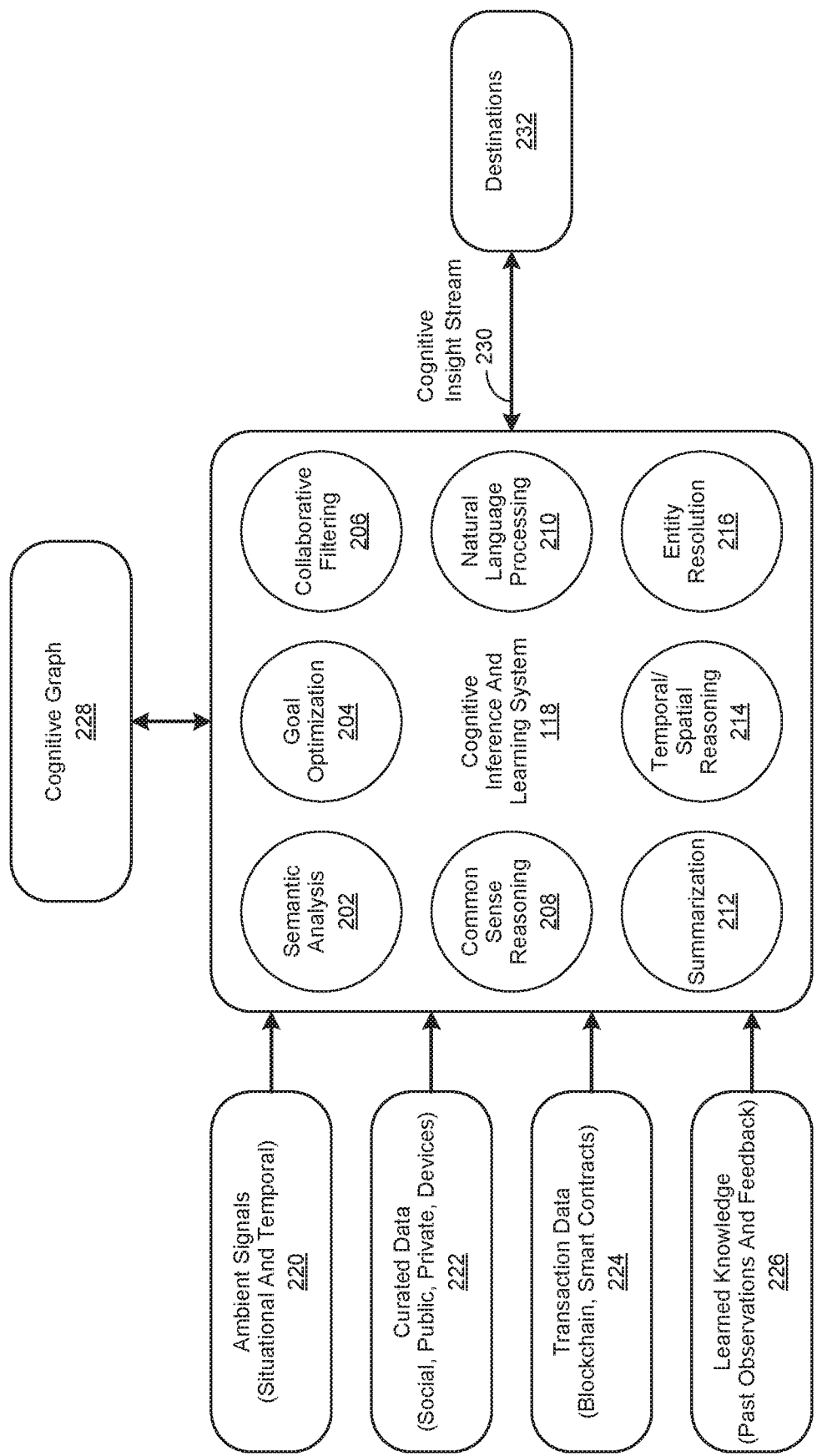
FIG. 2 is a simplified block diagram of a cognitive inference and learning system (CILS)

FIG. 2 is a simplified block diagram of a cognitive inference and learning system (CILS) implemented in accordance with an embodiment of the invention. In various embodiments, the CILS 118 is implemented to incorporate a variety of processes, including semantic analysis 202, goal optimization 204, collaborative filtering 206, common sense reasoning 208, natural language processing 210, summarization 212, temporal/spatial reasoning 214, and entity resolution 216 to generate cognitive insights.

As used herein, semantic analysis 202 broadly refers to performing various analysis operations to achieve a semantic level of understanding about language by relating syntactic structures. In certain embodiments, various syntactic structures are related from the levels of phrases, clauses, sentences and paragraphs, to the level of the body of content as a whole, and to its language-independent meaning. In various embodiments, the semantic analysis 202 process includes processing a target sentence to parse it into its individual parts of speech, tag sentence elements that are related to predetermined items of interest, identify dependencies between individual words, and perform co-reference resolution. For example, if a sentence states that the author really likes the hamburgers served by a particular restaurant, then the name of the "particular restaurant" is co-referenced to "hamburgers."

As likewise used herein, goal optimization 204 broadly refers to performing multi-criteria decision making operations to achieve a given goal or target objective. In various embodiments, one or more goal optimization 204 processes are implemented by the CILS 118 to define predetermined goals, which in turn contribute to the generation of a cognitive insight. For example, goals for planning a vacation trip may include low cost (e.g., transportation and accommodations), location (e.g., by the beach), and speed (e.g., short travel time). In this example, it will be appreciated that certain goals may be in conflict with another. As a result, a cognitive insight provided by the CILS 118 to a traveler may indicate that hotel accommodations by a beach may cost more than they care to spend.

Collaborative filtering 206, as used herein, broadly refers to the process of filtering for information or patterns through the collaborative involvement of multiple agents, viewpoints, data sources, and so forth. The application of such collaborative filtering 206 processes typically involves very large and different kinds of data sets, including sensing and monitoring data, financial data, and user data of various kinds. Collaborative filtering 206 may also refer to the process of making automatic predictions associated with predetermined interests of a user by collecting preferences or other information from many users. For example, if person 'A' has the same opinion as a person 'B' for a given issue 'x', then an assertion can be made that person 'A' is more likely to have the same opinion as person 'B' opinion on a different issue 'y' than to have the same opinion on issue 'y' as a randomly chosen person. In certain embodiments, the collaborative filtering 206 process is implemented with various recommendation engines familiar to those of skill in the art to make recommendations.

As used herein, common sense reasoning 208 broadly refers to simulating the human ability to make deductions from common facts they inherently know. Such deductions may be made from inherent knowledge about the physical properties, purpose, intentions and possible behavior of ordinary things, such as people, animals, objects, devices, and so on. In various embodiments, common sense reasoning 208 processes are implemented to assist the CILS 118 in understanding and disambiguating words within a predetermined context. In certain embodiments, the common sense reasoning 208 processes are implemented to allow the CILS 118 to generate text or phrases related to a target word or phrase to perform deeper searches for the same terms. It will be appreciated that if the context of a word is better understood, then a common sense understanding of the word can then be used to assist in finding better or more accurate information. In various embodiments, this better or more accurate understanding of the context of a word, and its related information, allows the CILS 118 to make more accurate deductions, which are in turn used to generate cognitive insights.

As likewise used herein, natural language processing (NLP) 210 broadly refers to interactions with a system, such as the CILS 118, through the use of human, or natural, languages. In various embodiments, various NLP 210 processes are implemented by the CILS 118 to achieve natural language understanding, which enables it to not only derive meaning from human or natural language input, but to also generate natural language output. Summarization 212, as used herein, broadly refers to processing a set of information, organizing and ranking it, and then generating a corresponding summary. As an example, a news article may be processed to identify its primary topic and associated observations, which are then extracted, ranked, and then presented to the user. In certain embodiments, various summarization 212 processes are implemented by the CILS 118 to generate summarizations of content streams, which are in turn used to generate cognitive insights.

As used herein, temporal/spatial reasoning 214 broadly refers to reasoning based upon qualitative abstractions of temporal and spatial aspects of common sense knowledge, described in greater detail herein. For example, it is not uncommon for a predetermined set of data to change over time. Likewise, other attributes, such as its associated metadata, may likewise change over time. As a result, these changes may affect the context of the data. To further the example, the context of asking someone what they believe they should be doing at 3:00 in the afternoon during the workday while they are at work may be quite different than asking the same user the same question at 3:00 on a Sunday afternoon when they are at home.

As likewise used herein, entity resolution 216 broadly refers to the process of finding elements in a set of data that refer to the same entity across different data sources (e.g., structured, non-structured, streams, devices, etc.), where the target entity does not share a common identifier. In various embodiments, the entity resolution 216 process is implemented by the CILS 118 to identify significant nouns, adjectives, phrases or sentence elements that represent various predetermined entities within one or more domains. From the foregoing, it will be appreciated that the implementation of one or more of the semantic analysis 202, goal optimization 204, collaborative filtering 206, common sense reasoning 208, natural language processing 210, summarization 212, temporal/spatial reasoning 214, and entity resolution 216 processes by the CILS 118 can facilitate the generation of a semantic, cognitive model.

In certain embodiments, the CILS 118 receives ambient signals 220, curated data 222, transaction data 224, and learned knowledge 226, which is then processed by the CILS 118 to generate one or more cognitive graphs 228. In turn, the one or more cognitive graphs 228 are further used by the CILS 118 to generate cognitive insight streams, which are then delivered to one or more destinations 232, as described in greater detail herein. As used herein, ambient signals 220 broadly refer to input signals, or other data streams, that may contain data providing additional insight or context to the curated data 222, transaction data 224, and learned knowledge 226 received by the CILS 118. For example, ambient signals may allow the CILS 118 to understand that a user is currently using their mobile device, at location 'x', at time 'y', doing activity 'z'. To continue the example, there is a difference between the user using their mobile device while they are on an airplane versus using their mobile device after landing at an airport and walking between one terminal and another.

In various embodiments, the curated data 222 may include structured, unstructured, social, public, private, streaming, device or other types of data described in greater detail herein. In certain embodiments, the transaction data 224 may include blockchain-associated data, described in greater detail herein, smart contract data, likewise described in greater detail herein, or any combination thereof. In various embodiments, the learned knowledge 226 is based upon past observations and feedback from the presentation of prior cognitive insight streams and recommendations. In certain embodiments, the learned knowledge 226 is provided via a feedback look that provides the learned knowledge 226 in the form of a learning stream of data.

As likewise used herein, a cognitive graph 228 refers to a representation of expert knowledge, associated with individuals and groups over a period of time, to depict relationships between people, places, and things using words, ideas, audio and images. As such, it is a machine-readable formalism for knowledge representation that provides a common framework allowing data and knowledge to be shared and reused across user, application, organization, and community boundaries. In various embodiments, the information contained in, and referenced by, a cognitive graph 228 is derived from many sources (e.g., public, private, social, device), such as curated data 222 and transaction data 224. In certain of these embodiments, the cognitive graph 228 assists in the identification and organization of information associated with how people, places and things are related to one other. In various embodiments, the cognitive graph 228 enables automated agents, described in greater detail herein, to access the Web more intelligently, enumerate inferences through utilization of curated, structured data 222, and provide answers to questions by serving as a computational knowledge engine.

In certain embodiments, the cognitive graph 228 not only elicits and maps expert knowledge by deriving associations from data, it also renders higher level insights and accounts for knowledge creation through collaborative knowledge modeling. In various embodiments, the cognitive graph 228 is a machine-readable, declarative memory system that stores and learns both episodic memory (e.g., specific personal experiences associated with an individual or entity), and semantic memory, which stores factual information (e.g., geo location of an airport or restaurant). For example, the cognitive graph 228 may know that a given airport is a place, and that there is a list of related places such as hotels, restaurants and departure gates. Furthermore, the cognitive graph 228 may know that people such as business travelers, families and college students use the airport to board flights from various carriers, eat at various restaurants, or shop at certain retail stores.

In certain embodiments, the cognitive insight stream 230 is bidirectional, and supports flows of information both to and from destinations 232. In these embodiments, the first flow is generated in response to receiving a query, and subsequently delivered to one or more destinations 232. The second flow is generated in response to detecting information about a user of one or more of the destinations 232. Such use results in the provision of information to the CILS 118. In response, the CILS 118 processes that information, in the context of what it knows about the user, and provides additional information to the user, such as a recommendation. In various embodiments, the cognitive insight stream 230 is configured to be provided in a "push" stream configuration familiar to those of skill in the art. In certain embodiments, the cognitive insight stream 230 is implemented to use natural language approaches familiar to skilled practitioners of the art to support interactions with a user.

In certain embodiments, the cognitive insight stream 230 may include a stream of visualized insights. As used herein, visualized insights broadly refers to cognitive insights that are presented in a visual manner, such as a map, an infographic, images, and so forth. In various embodiments, these visualized insights may include certain cognitive insights, such as "What happened?", "What do I know about it?", "What is likely to happen next?", or "What should I do about it?" In these embodiments, the cognitive insight stream is generated by various cognitive agents, which are applied to various sources, datasets, and cognitive graphs. As used herein, a cognitive agent broadly refers to a computer program that performs a task with minimum specific directions from users and learns from each interaction with data and human users.

In various embodiments, the CILS 118 delivers Cognition as a Service (CaaS). As such, it provides a cloud-based development and execution platform that allow various cognitive applications and services to function more intelligently and intuitively. In certain embodiments, cognitive applications powered by the CILS 118 are able to think and interact with users as intelligent virtual assistants. As a result, users are able to interact with such cognitive applications by asking them questions and giving them commands. In response, these cognitive applications will be able to assist the user in completing tasks and managing their work more efficiently.

In these and other embodiments, the CILS 118 can operate as an analytics platform to process big data, and dark data as well, to provide data analytics through a public, private or hybrid cloud environment. As used herein, cloud analytics broadly refers to a service model wherein data sources, data models, processing applications, computing power, analytic models, and sharing or storage of results are implemented within a cloud environment to perform one or more aspects of analytics.

In various embodiments, users submit queries and computation requests in a natural language format to the CILS 118. In response, they are provided with a ranked list of relevant answers and aggregated information with useful links and pertinent visualizations through a graphical representation. In these embodiments, the cognitive graph 228 generates semantic and temporal maps to reflect the organization of unstructured data and to facilitate meaningful learning from potentially millions of lines of text, much in the same way as arbitrary syllables strung together create meaning through the concept of language.

Figure 3:
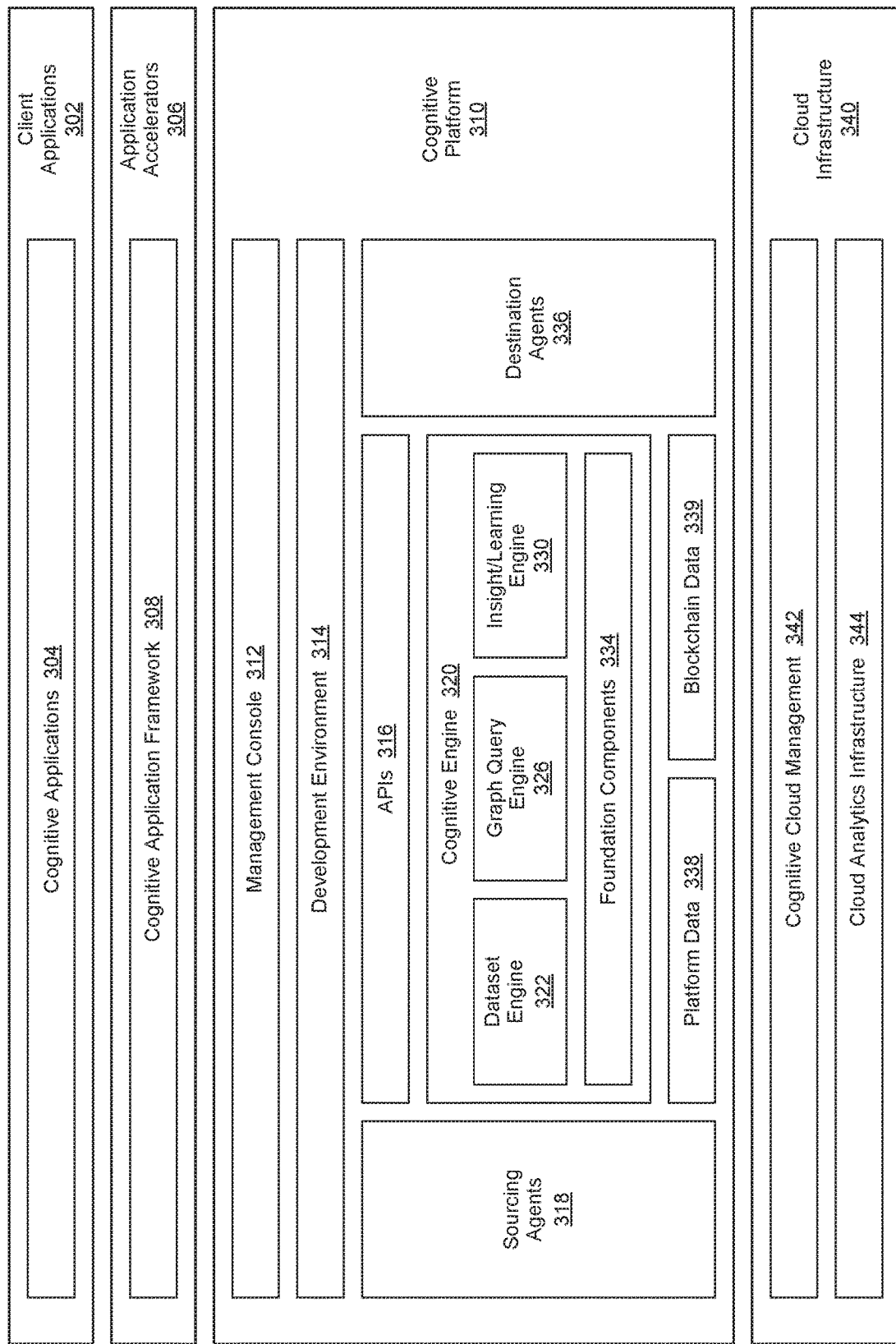
FIG. 3 is a simplified block diagram of a CILS reference model implemented in accordance with an embodiment of the invention.

FIG. 3 is a simplified block diagram of a cognitive inference and learning system (CILS) reference model implemented in accordance with an embodiment of the invention. In this embodiment, the CILS reference model is associated with the CILS 118 shown in FIG. 2. As shown in FIG. 3, the CILS reference model includes client applications 302, application accelerators 306, a cognitive platform 310, and cloud infrastructure 340. In various embodiments, the client applications 302 include cognitive applications 304, which are implemented to understand and adapt to the user by natively accepting and understanding human forms of communication, such as natural language text, audio, images, video, and so forth.

In these and other embodiments, the cognitive applications 304 possess situational and temporal awareness based upon ambient signals from users and data, which facilitates understanding the user's intent, content, context and meaning to drive goal-driven dialogs and outcomes. Further, they are designed to gain knowledge over time from a wide variety of structured, non-structured, transactional and device data sources, continuously interpreting and autonomously reprogramming themselves to better understand a given domain. As such, they are well-suited to support human decision making, by proactively providing trusted advice, offers and recommendations while respecting user privacy and permissions.

In various embodiments, the application accelerators 306 include a cognitive application framework 308. In certain embodiments, the application accelerators 306 and the cognitive application framework 308 support various plug-ins and components that facilitate the creation of client applications 302 and cognitive applications 304. In various embodiments, the application accelerators 306 include widgets, user interface (UI) components, reports, charts, and back-end integration components familiar to those of skill in the art.

As likewise shown in FIG. 3, the cognitive platform 310 includes a management console 312, a development environment 314, application program interfaces (APIs) 316, sourcing agents 318, a cognitive engine 320, destination agents 336, platform data 338, and transaction data 339, such as blockchain data, all of which are described in greater detail herein. In various embodiments, the development environment 314 is implemented to create custom extensions to the CILS 118 shown in FIG. 2. In certain embodiments, the development environment 314 is implemented for the development of a custom application, which may subsequently be deployed in a public, private or hybrid cloud environment. In various embodiments, the development environment 314 is implemented for the development of a custom sourcing agent, a custom bridging agent, a custom destination agent, or various analytics applications or extensions.

In certain embodiments, the APIs 316 are implemented to build and manage various cognitive applications 304, described in greater detail herein, which are then executed on the cognitive platform 310 to generate cognitive insights. Likewise, the sourcing agents 318 are implemented in various embodiments to source a variety of multi-site, multi-structured source streams of data described in greater detail herein. In various embodiments, the cognitive engine 320 includes a dataset engine 322, a graph query engine 326, an insight/learning engine 330, and foundation components 334. In certain embodiments, the dataset engine 322 is implemented to establish and maintain a dynamic data ingestion and enrichment pipeline. In these and other embodiments, the dataset engine 322 may be implemented to orchestrate one or more sourcing agents 318 to source data. Once the data is sourced, the data set engine 322 performs data enriching and other data processing operations, described in greater detail herein, and generates one or more sub-graphs that are subsequently incorporated into a target cognitive graph.

In various embodiments, the graph query engine 326 is implemented to receive and process queries such that they can be bridged into a cognitive graph, as described in greater detail herein, through the use of a bridging agent. In certain embodiments, the graph query engine 326 performs various natural language processing (NLP), familiar to skilled practitioners of the art, to process the queries. In various embodiments, the insight/learning engine 330 is implemented to encapsulate a particular algorithm, which is then applied to a cognitive graph to generate a result, such as a recommendation or a cognitive insight, described in greater detail herein.

In certain embodiments, one or more such algorithms may contribute to answering a specific question and provide additional recommendations, cognitive insights, or a combination thereof. In various embodiments, two or more of the dataset engine 322, the graph query engine 326, and the insight/learning engine 330 may be implemented to operate collaboratively or autonomously to generate a recommendation, a cognitive insight, or a combination thereof. The foundation components 334 shown in FIG. 3 may include various reusable components, familiar to those of skill in the art, which may be used in certain embodiments to enable the dataset engine 322, the graph query engine 326, and the insight/learning engine 330 to perform their respective operations and processes. Examples of such foundation components 334 include natural language processing (NLP) components and core algorithms, such as cognitive algorithms.

In various embodiments, the platform data 338 includes various data repositories, described in greater detail herein, that are accessed by the cognitive platform 310 to generate cognitive insights. In certain embodiments, the transaction data 339 may include blockchain data associated with one or more public blockchains, one or more private blockchains, or a combination thereof, as described in greater detail herein. In various embodiments, the platform data 338, or the transaction data 339, or a combination thereof, is used to generate a blockchain-associated cognitive insight.

As used herein, a blockchain-associated cognitive insight broadly refers to a cognitive insight that is generated at least in part through the use of blockchain data, or alternatively, provided in the form of a blockchain transaction, described in greater detail herein. As likewise used herein, blockchain data broadly refers to any data associated with a given blockchain, whether it is related to the data structure of the blockchain as a whole or its individual elements, the individual data elements it may contain, or its associated metadata. Likewise, blockchain data also broadly refers to the rules and parameters of a corresponding blockchain's operation, the protocols related to its interaction with applications and other blockchains, or its corresponding Application Program Interface (API).

In certain embodiments, the destination agents 336 are implemented to publish cognitive insights to a consumer of cognitive insight data. Examples of such consumers of cognitive insight data include target databases, public or private blockchains, business intelligence applications, and mobile applications. It will be appreciated that many such examples of cognitive insight data consumers are possible. Accordingly, the foregoing is not intended to limit the spirit, scope or intent of the invention. In certain embodiments, as described in greater detail herein, the cloud infrastructure 340 may include cognitive cloud management 342 components and analytics infrastructure 344 components.

Figure 4:
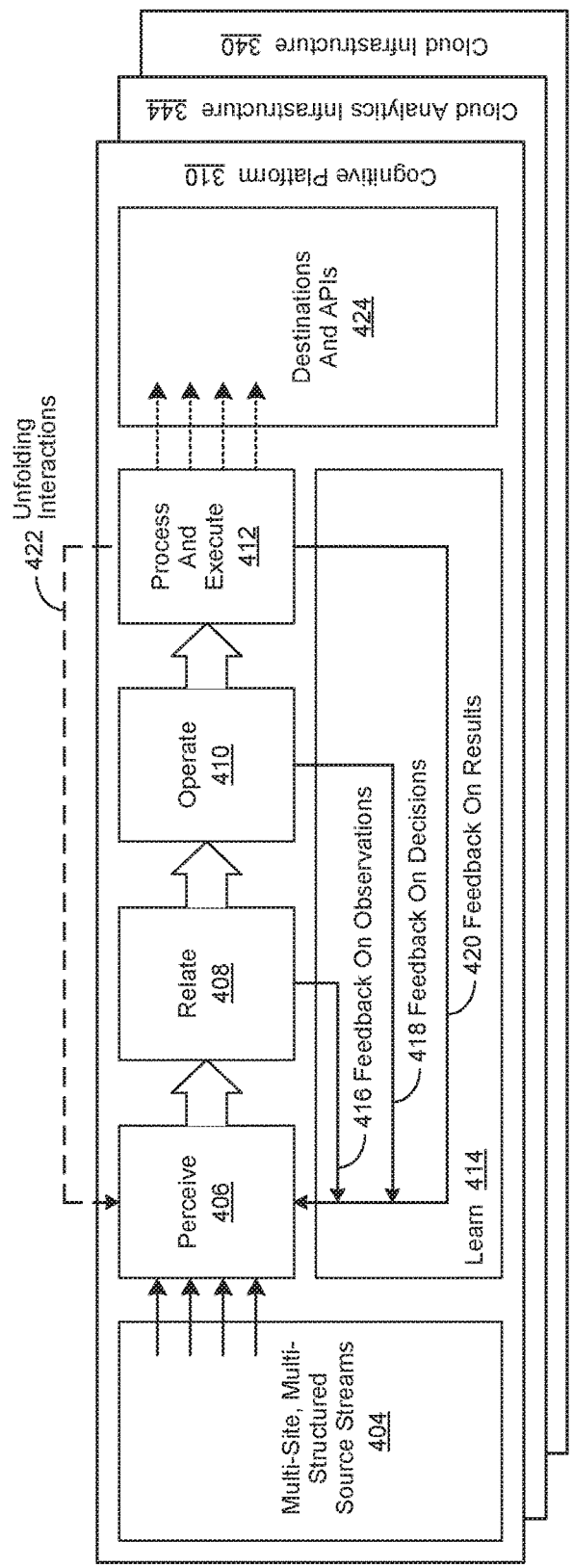
FIG. 4 is a simplified process diagram of CILS operations.

FIG. 4 is a simplified process diagram of cognitive inference and learning system (CILS) operations performed in accordance with an embodiment of the invention. In various embodiments, these CILS operations may include a perceive 406 phase, a relate 408 phase, an operate 410 phase, a process and execute 412 phase, and a learn 414 phase. In these and other embodiments, the CILS 118 shown in FIG. 2 is implemented to mimic cognitive processes associated with the human brain. In various embodiments, the CILS operations are performed through the implementation of a cognitive platform 310, described in greater detail herein. In these and other embodiments, the cognitive platform 310 may be implemented within a cloud analytics infrastructure 344, which in turn is implemented within a cloud infrastructure 340, likewise described in greater detail herein.

In various embodiments, multi-site, multi-structured source streams 404 are provided by sourcing agents, as described in greater detail herein. In these embodiments, the source streams 404 are dynamically ingested in real-time during the perceive 406 phase, and based upon a predetermined context, extraction, parsing, and tagging operations are performed on language, text and images contained in the source streams 404. Automatic feature extraction and modeling operations are then performed with the previously processed source streams 404 during the relate 408 phase to generate queries to identify related data (i.e., corpus expansion).

In various embodiments, operations are performed during the operate 410 phase to discover, summarize and prioritize various concepts, which are in turn used to generate actionable recommendations and notifications associated with predetermined plan-based optimization goals. The resulting actionable recommendations and notifications are then processed during the process and execute 412 phase to provide cognitive insights, such as recommendations, to various predetermined destinations and associated application programming interfaces (APIs) 424.

In various embodiments, features from newly-observed data are automatically extracted from user feedback during the learn 414 phase to improve various analytical models. In these embodiments, the learn 414 phase includes feedback on observations generated during the relate 408 phase, which is provided to the perceive 406 phase. Likewise, feedback on decisions resulting from operations performed during the operate 410 phase, and feedback on results resulting from operations performed during the process and execute 412 phase, are also provided to the perceive 406 phase.

In various embodiments, user interactions result from operations performed during the process and execute 412 phase. In these embodiments, data associated with the user interactions are provided to the perceive 406 phase as unfolding interactions 422, which include events that occur external to the CILS operations described in greater detail herein. As an example, a first query from a user may be submitted to the CILS system, which in turn generates a first cognitive insight, which is then provided to the user. In response, the user may respond by providing a first response, or perhaps a second query, either of which is provided in the same context as the first query. The CILS receives the first response or second query, performs various CILS operations, and provides the user a second cognitive insight. As before, the user may respond with a second response or a third query, again in the context of the first query. Once again, the CILS performs various CILS operations and provides the user a third cognitive insight, and so forth. In this example, the provision of cognitive insights to the user, and their various associated responses, results in unfolding interactions 422, which in turn result in a stateful dialog that evolves over time. Skilled practitioners of the art will likewise realize that such unfolding interactions 422, occur outside of the CILS operations performed by the cognitive platform 310.

Figure 5:
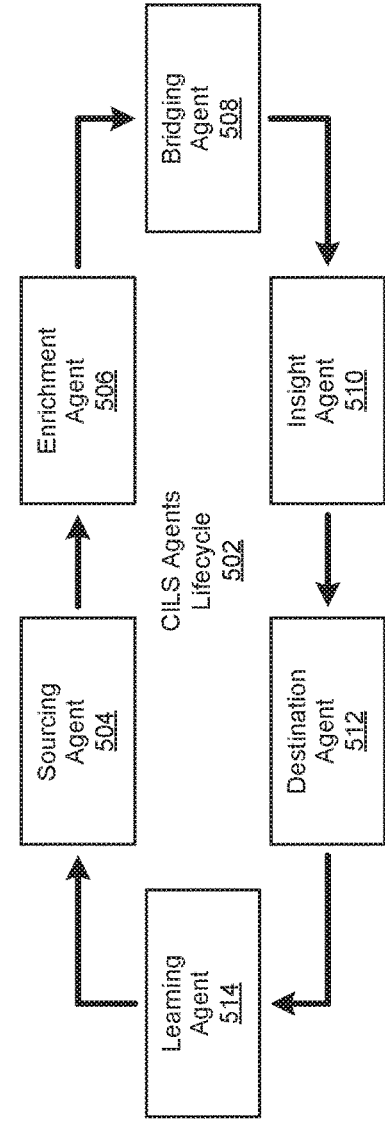
FIG. 5 depicts the lifecycle of CILS agents implemented to perform CILS operations.

FIG. 5 depicts the lifecycle of cognitive inference and learning system (CILS) agents implemented in accordance with an embodiment of the invention to perform CILS operations. In various embodiments, the CILS agents lifecycle 502 may include implementation of a sourcing 504 agent, an enrichment 506 agent, a bridging 508 agent, an insight 510 agent, a destination 512 agent, and a learning 514 agent. In these embodiments, the sourcing 504 agent is implemented to source a variety of multi-site, multi-structured source streams of data described in greater detail herein. In certain embodiments, the sourcing 504 agent may include a batch upload agent, an Application Program Interface (API) connectors agent, a real-time streams agent, a Structured Query Language (SQL)/Not Only SQL (NoSQL) databases agent, a message engines agent, a blockchain sourcing agent, one or more custom sourcing agents, or some combination thereof. Skilled practitioners of the art will realize that other types of sourcing agents 504 may be used in various embodiments.

These sourced data streams are then provided to an enrichment 506 agent, which then invokes an enrichment component to perform enrichment operations familiar to those of skill in the art to generate enriched data streams. As an example, a data stream may be sourced from Associated Press® by a sourcing agent 504 and provided to an enrichment component. In turn, the enrichment component may enrich the data stream by performing sentiment analysis, geotagging, and entity detection operations. In certain embodiments, the enrichment operations include filtering operations familiar to skilled practitioners of the art. To further the preceding example, the Associated Press® data stream may be filtered by a predetermined geography attribute to generate an enriched data stream.

The enriched data streams are then provided to a bridging 508 agent, which is used to perform bridging operations. In various embodiments, the bridging operations are performed to provide domain-specific responses when bridging a translated query to a target cognitive graph. For example, the same query bridged to various cognitive graphs may result in different answers for different domains. In certain embodiments, the bridging operations are implemented to process what is known about the translated query, in the context of the user, to provide an answer that is relevant to a specific domain.

As an example, a user may ask, "Where should I eat today?" If the user has been prescribed a particular health regimen, the bridging operations may result in a suggestion for a restaurant with a "heart healthy" menu. However, if the user is a business traveler, the bridging operations may result in a suggestion for the nearest restaurant that has the user's favorite food. In various embodiments, performance of the bridging operations may result in the provision of answers or suggestions that are composed and ranked according to a specific domain of use.

The results of the bridging operations are in turn provided to an insight 510 agent, which is implemented in certain embodiments to create a visual data story, highlighting user-specific insights, relationships and recommendations. In various embodiments, insight agents 510 use a particular cognitive graph, described in greater detail herein, as a data source to generate individual cognitive insights. In certain embodiments, the cognitive graph may be implemented as an application cognitive graph, likewise described in greater detail herein.

The resulting visual data story is then provided to a destination 512 agent, which is implemented in various embodiments to publish cognitive insights to a consumer of cognitive insight data. Examples of such consumers of cognitive insight data include target databases, public or private blockchains, business intelligence applications, and mobile applications. In various embodiments, destination agents 512 may include a Hypertext Transfer Protocol (HTTP) stream agent, an API connectors agent, a databases agent, a message engines agent, a mobile push notification agent, a blockchain destination agents, custom destination agents, or some combination thereof.

In response to receipt of the visual data story, the consumer of cognitive insight data provides feedback to a learning 514 agent, which is implemented in certain embodiments to provide the feedback to the sourcing agent 504, at which point the CILS agents lifecycle 502 is continued. In various embodiments, a learning agent 514 is implemented to work in the background to continually update a cognitive graph, as described in greater detail herein, from each unique interaction with data and users. From the foregoing, skilled practitioners of the art will recognize that each iteration of the cognitive agents lifecycle 502 provides more informed cognitive insights.

Figure 6:
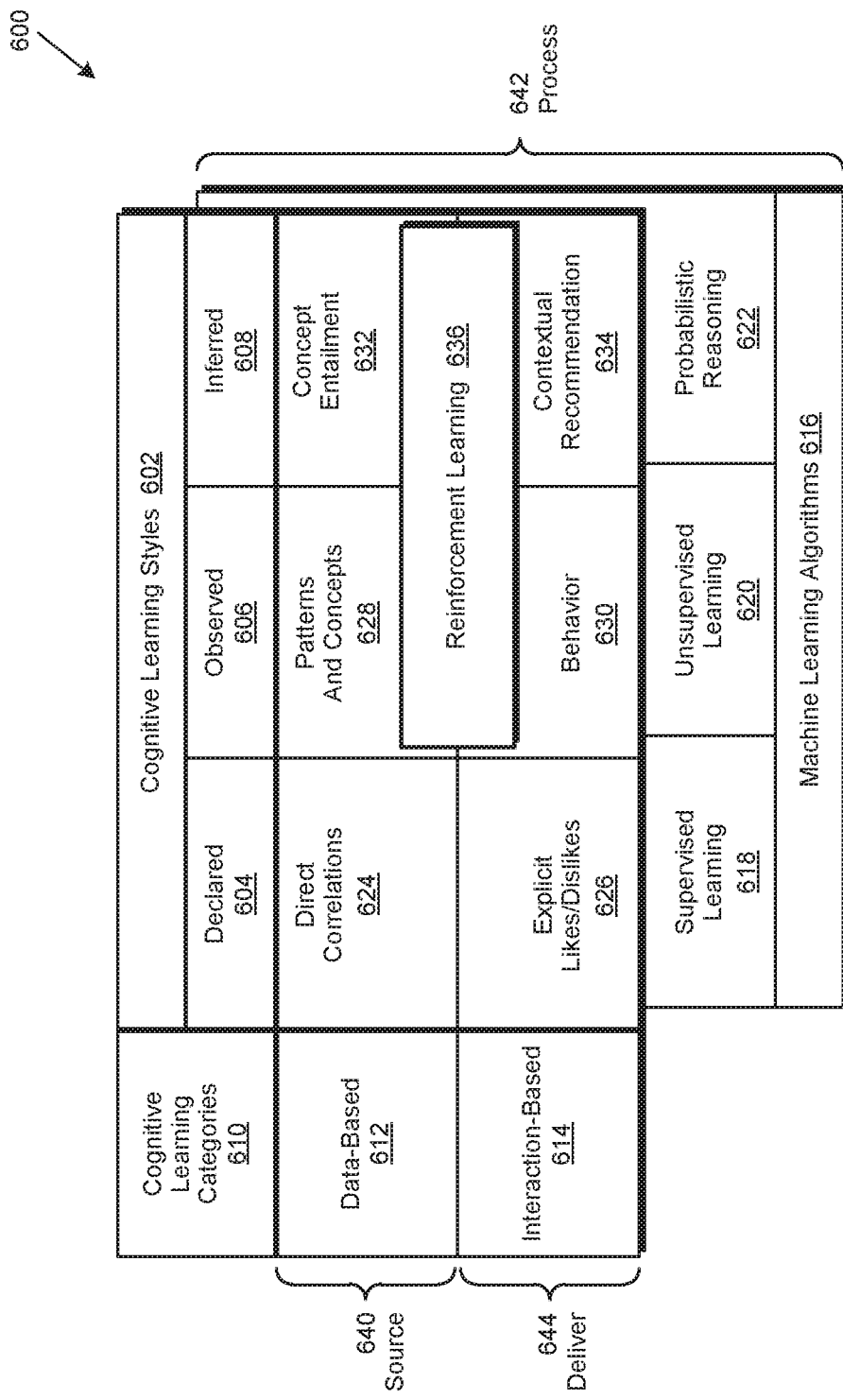
FIG. 6 depicts a cognitive learning framework.

FIG. 6 depicts a cognitive learning framework implemented in accordance with an embodiment of the invention to perform cognitive learning operations. As used herein, a cognitive learning operation broadly refers to the implementation of a cognitive learning technique, described in greater detail herein, to generate a cognitive learning result. In various embodiments, the implementation of the learning technique is performed by a Cognitive Inference and Learning System (CILS), likewise described in greater detail herein. In certain embodiments, the cognitive learning result is used by the CILS to update a knowledge model. In various embodiments, the knowledge model is implemented as a universal knowledge repository. In certain embodiments, the knowledge model is implemented as a cognitive graph.

In various embodiments, the cognitive learning framework 600 may include various cognitive learning styles 602 and cognitive learning categories 610. As used herein, a cognitive learning style broadly refers to a generalized learning approach implemented by a CILS to perform a cognitive learning operation. In certain embodiments, the cognitive learning styles 602 may include a declared 604 cognitive learning style, an observed 606 cognitive learning style, and an inferred 608 cognitive learning style. As likewise used herein, a declared 604 cognitive learning style broadly refers to the use of declarative data by a CILS to perform a corresponding cognitive learning operation. In various embodiments, the declarative data may be processed by the CILS as a statement, an assertion, or a verifiable fact. For example, an electronic medical record (EMR) may contain declarative data asserting that John Smith has Type 1 diabetes, which is a verifiable fact.

Likewise, as used herein, an observed 606 cognitive learning style broadly refers to the use of observed data by CILS to perform a corresponding cognitive learning operation. In various embodiments, the observed data may include a pattern, a concept, or some combination thereof. As an example, a CILS may receive and process a stream of information, and over time observe the formation of a discernable pattern, such as a user always ordering Chinese or Thai food for delivery at lunchtime. In this example, the discerned pattern of the user's ordering behavior may correspond to the concept that the user's lunchtime food preference is Asian cuisine.

In certain embodiments, a concept may include an observation of the use of certain words in a particular context. For example, the use of the word "haircut" in a financial text may refer to the difference between the market value of an asset used as loan collateral and the amount of the loan, as opposed to a service performed by a hair stylist. In this example, natural language processing (NLP) approaches known to those of skill in the art are implemented by the CILS during the performance of cognitive learning operations to determine the context in which the word "haircut" is used.

As likewise used herein, an inferred 608 cognitive learning style broadly refers to the use of inferred data by a CILS to perform a corresponding cognitive learning operation. In various embodiments the inferred data may include data inferred from the processing of source data. In certain embodiments, the inferred data may include concepts that are inferred from the processing of other concepts. In these embodiments, the inferred data resulting from the processing of the source data, the concepts, or a combination thereof, may result in the provision of new information that was not in the source data or other concepts.

As an example, a user's selection of a particular accommodation in a resort area during a holiday may result in an inference they prefer staying at a bed and breakfast while on personal travel. Likewise, the selection of a four star accommodation in a downtown area on a weekday may result in an inference the same user prefers a luxury hotel while on business travel. In this example, the user may not declaratively state an accommodation preference for a given type of travel.

As used herein, a cognitive learning category 610 broadly refers to a source of information used by a CILS to perform cognitive learning operations. In various embodiments, the cognitive learning categories 610 may include a data-based 612 cognitive learning category and an interaction-based 614 cognitive learning category. As likewise used herein, a data-based 612 cognitive learning category broadly refers to the use of data as a source of information in the performance of a cognitive learning operation by a CILS. In certain embodiments, the data may be provided to the CILS in real-time, near real-time, or batch mode as it is performing cognitive learning operations. In various embodiments, the data may be provided to the CILS as a result of a query generated by the CILS.

In certain embodiments, the data is provided to the CILS by a cognitive agent, described in greater detail herein. In one embodiment, the cognitive agent is a learning agent, likewise described in greater detail herein. In various embodiments, the data may be multi-structured data. In these embodiments, the multi-structured data may include unstructured data (e.g., a document), semi-structured data (e.g., a social media post), and structured data (e.g., a string, an integer, etc.), such as data stored in a relational database management system (RDBMS). In certain embodiments, the data may be public, proprietary, or a combination thereof.

As likewise used herein, an interaction-based 614 cognitive learning category broadly refers to the use of one or more results of an interaction as a source of information used by a CILS to perform a cognitive learning operation. In various embodiments, the interaction may be between any combination of devices, applications, services, processes, or users. In certain embodiments, the results of the interaction may be provided in the form of feedback data to the CILS.

In various embodiments, the interaction may be explicitly or implicitly initiated by the provision of input data to the devices, applications, services, processes or users. In certain embodiments, the input data may be provided in response to a cognitive insight provided by a CILS. In one embodiment, the input data may include a user gesture, such as a key stroke, mouse click, finger swipe, or eye movement. In another embodiment, the input data may include a voice command from a user. In yet another embodiment, the input data may include data associated with a user, such as biometric data (e.g., retina scan, fingerprint, body temperature, pulse rate, etc.).

In yet still another embodiment, the input data may include environmental data (e.g., current temperature, etc.), location data (e.g., geographical positioning system coordinates, etc.), device data (e.g., telemetry data, etc.), transaction data (e.g., transaction data associated with a blockchain), or other data provided by a device, application, service, process or user. Those of skill in the art will realize that many such embodiments of cognitive learning styles 602 and cognitive learning categories 610 are possible. Accordingly, the foregoing is not intended to limit the spirit, scope or intent of the invention.

As used herein, a cognitive learning technique refers to the use of a cognitive learning style, in combination with a cognitive learning category, to perform a cognitive learning operation. In various embodiments, individual cognitive learning techniques associated with a primary cognitive learning style are respectively bounded by an associated primary cognitive learning category. For example, as shown in FIG. 6, the direct correlations 624 and explicit likes/dislikes 626 cognitive learning techniques are both associated with the declared 604 learning style and respectively bounded by the data-based 612 and interaction-based 614 cognitive learning categories.

As likewise shown in FIG. 6, the patterns and concepts 628 and behavior 630 cognitive learning techniques are both associated with the observed 606 cognitive learning style and likewise respectively bounded by the data-based 612 and interaction-based 614 cognitive learning categories. Likewise, as shown in FIG. 6, the concept entailment 632 and contextual recommendation 634 cognitive learning techniques are both associated with the inferred 608 cognitive learning style and likewise respectively bounded by the data-based 612 and interaction-based 614 cognitive learning categories.

As used herein, a direct correlations 624 cognitive learning technique broadly refers to the implementation of a declared 604 cognitive learning style, bounded by a data-based 612 cognitive learning category, to perform cognitive learning operations related to direct correlations. Examples of direct correlation include statistical relationships involving dependence, such as the correlation between the stature or other physical characteristics of parents and their biological offspring. As likewise used herein, an explicit likes/dislikes 626 cognitive learning technique broadly refers to the implementation of a declared 604 cognitive learning style, bounded by an interaction-based 614 cognitive learning category, to perform cognitive learning operations related to a user's explicit likes/dislikes.

In various embodiments, a user's explicit likes/dislikes may be declaratively indicated through the receipt of user input data, described in greater detail herein. For example, an online shopper may select a first pair of shoes that are available in a white, black and brown. The user then elects to view a larger photo of the first pair of shoes, first in white, then in black, but not brown. To continue the example, the user then selects a second pair of shoes that are likewise available in white, black and brown. As before, the user elects to view a larger photo of the second pair of shoes, first in white, then in black, but once again, not brown. In this example, the user's online interaction indicates an explicit like for white and black shoes and an explicit dislike for brown shoes.

As used herein, a patterns and concepts 628 cognitive learning technique broadly refers to the implementation of an observed 606 cognitive learning style, bounded by a data-based 612 cognitive learning category, to perform cognitive learning operations related to the observation of patterns and concepts. As an example, a database record may include information related to various transactions associated with a user. In this example, a pattern may be observed within the transactions that the user always uses rental cars when traveling between cities in California, but always uses trains when traveling between cities in New York, New Jersey, or Pennsylvania. By extension, this pattern may correspond to a concept that the user prefers automobile transportation when traveling between cities on the West coast, but prefers train transportation when traveling between cities on the East coast.

As used herein, a behavior 630 cognitive learning technique broadly refers to the implementation of an observed 606 cognitive learning style, bounded by an interaction-based 614 cognitive learning category, to perform cognitive learning operations related to observed behaviors. In various embodiments, the observed behavior associated with an interaction corresponds to various input data, likewise described in greater detail herein. In certain embodiments, the observed behaviors may include observed behavior associated with interactions, described in greater detail herein. For example, a user may consistently place an online order for Mexican, Thai or Indian food to be delivered to their home in the evening. To continue the example, promotional offers for fried chicken or seafood are consistently ignored in the evening, yet consistently accepted at lunchtime. Furthermore, the observed behavior of the user is to accept the promotional offer that provides the most food at the lowest cost. In this example, the user's observed online behavior indicates a preference for spicy food in the evenings, regardless of price. Likewise, the user's observed online behavior may indicate a preference for low cost, non-spicy foods for lunch.

As used herein, a concept entailment 632 cognitive learning technique broadly refers to the implementation of an inferred 608 cognitive learning style, bounded by a data-based 612 cognitive learning category, to perform cognitive learning operations related to concept entailment. As likewise used herein, concept entailment broadly refers to the concept of understanding language, within the context of one piece of information being related to another. For example, if a statement is made that implies 'x', and 'x is known to imply 'y', then by extension, the statement may imply 'y' as well. In this example, there is a chaining of evidence between the statement, 'x', and 'y' that may result in a conclusion supported by the chain of evidence.

As used herein, a contextual recommendation 634 cognitive learning technique broadly refers to the implementation of an inferred 608 cognitive learning style, bounded by an interaction-based 614 cognitive learning category, to perform cognitive learning operations related to contextual recommendations provided to a user. As likewise used herein, a contextual recommendation broadly refers to a recommendation made to a user based upon a particular context. As an example, a user may perform an online search for a casual, affordable restaurant that is nearby. To continue the example, the user is currently on a low-sodium, gluten-free diet that has been prescribed by their healthcare provider. Additionally, the healthcare provider has recommended that the user walk at least two miles every day.

To further continue the example, there may be five casual, affordable restaurants that are in close proximity to the location coordinates provided by the user's mobile device, all of which are presented to the user for consideration. In response, the user further requests distance information to each of the restaurants, followed by a request to show only those restaurants offering low-sodium, gluten free menu items. As a result of the user interaction, the CILS responds with directions to the only restaurant offering low-sodium, gluten-free dishes. Further, the CILS may recommend the user try a Mediterranean dish, as past interactions has indicated that the user enjoys Mediterranean cuisine. In this example, the contextual recommendation is inferred from a series of interactions with the user.

In various embodiments, machine learning algorithms 616 are respectively implemented with a cognitive learning technique by a CILS when performing cognitive learning operations. In one embodiment, a supervised learning 618 machine learning algorithm may be implemented with a direct correlations 624 cognitive learning technique, an explicit likes/dislikes 626 cognitive learning technique, or both. In another embodiment, an unsupervised learning 620 machine learning algorithm may be implemented with a patterns and concepts 628 cognitive learning technique, a behavior 630 cognitive learning technique, or both. In yet another embodiment, a probabilistic reasoning 622 machine learning algorithm may be implemented with a concept entailment 632 cognitive learning technique, a contextual recommendation 634 cognitive learning technique, or both. Skilled practitioners of the art will recognize that many such embodiments are possible. Accordingly, the foregoing is not intended to limit the spirit, scope or intent of the invention.

As used herein, a supervised learning 618 machine learning algorithm broadly refers to a machine learning approach for inferring a function from labeled training data. The training data typically consists of a set of training examples, with each example consisting of an input object (e.g., a vector) and a desired output value (e.g., a supervisory signal). In various embodiments, a supervised learning 618 algorithm is implemented to analyze the training data and produce an inferred function, which can be used for mapping new examples. As likewise used herein, an unsupervised learning 620 machine learning algorithm broadly refers to a machine learning approach for finding non-obvious or hidden structures within a set of unlabeled data. In various embodiments, the unsupervised learning 620 machine learning algorithm is not given a set of training examples. Instead, it attempts to summarize and explain key features of the data it processes.

Examples of unsupervised learning approaches include clustering (e.g., k-means, mixture models, hierarchical clustering, etc.) and latent variable models (e.g., expectation-maximization algorithms, method of moments, blind signal separation techniques, etc.). Likewise, as used herein, a probabilistic reasoning 622 machine learning algorithm broadly refers to a machine learning approach that combines the ability of probability theory to handle uncertainty with the ability of deductive logic to exploit structure. More specifically, probabilistic reasoning attempts to find a natural extension of traditional logic truth tables. The results they define are derived through probabilistic expressions instead.

In various embodiments, reinforcement learning 636 approaches are implemented by a CILS in combination with a patterns and concepts 628, a behavior 630, a concept entailment 632, or a contextualization recommendation 634 cognitive learning technique when performing cognitive learning operations. As used herein, reinforcement learning broadly refers to machine learning approaches inspired by behaviorist psychology, where software agents take actions within an environment to maximize a notion of cumulative reward. Those of skill in the art will be familiar with such reinforcement approaches, which are commonly used in game theory, control theory, operations research, information theory, simulation-based optimization, multi-agent systems, swarm intelligence, statistics, and genetic algorithms.

In certain embodiments, a particular cognitive learning technique may include the implementation of certain aspects of a secondary cognitive learning style, aspects of a secondary learning category, or a combination thereof. As an example, the patterns and concepts 628 cognitive learning technique may include implementation of certain aspects of the direct correlations 624 and concept entailment 632 cognitive learning techniques, and by extension, implementation of certain aspects of the declared 604 and inferred 608 cognitive learning styles. In various embodiments, the data-based 612 cognitive learning category, machine learning algorithms 616, and the interaction-based 614 cognitive learning category are respectively associated with the source 640, process 642 and deliver 644 steps of a cognitive learning process.

As used herein, a cognitive learning process broadly refers to a series of cognitive learning steps performed by a CILS to generate a cognitive learning result. As likewise used herein, a source 640 step of a cognitive learning process broadly refers to operations associated with the acquisition of data used by a CILS to perform a cognitive learning operation. Likewise, as used herein, a process 642 step of a cognitive learning process broadly refers to the use of individual machine learning algorithms 616 by a CILS to perform cognitive learning operations. As likewise used herein, a deliver 644 step of a cognitive learning process broadly refers to the delivery of a cognitive insight, which results in an interaction, described in greater detail herein. Information related to, or resulting from, the interaction is then used by a CILS to perform cognitive learning operations.

In various embodiments, the cognitive insight is delivered to a device, an application, a service, a process, a user, or a combination thereof. In certain embodiments, the resulting interaction information is likewise received by a CILS from a device, an application, a service, a process, a user, or a combination thereof. In various embodiments, the resulting interaction information is provided in the form of feedback data to the CILS. In these embodiments, the method by which the cognitive learning process, and its associated cognitive learning steps, is implemented is a matter of design choice. Skilled practitioners of the art will recognize that many such embodiments are possible. Accordingly, the foregoing is not intended to limit the spirit, scope or intent of the invention.

Figure 7A:
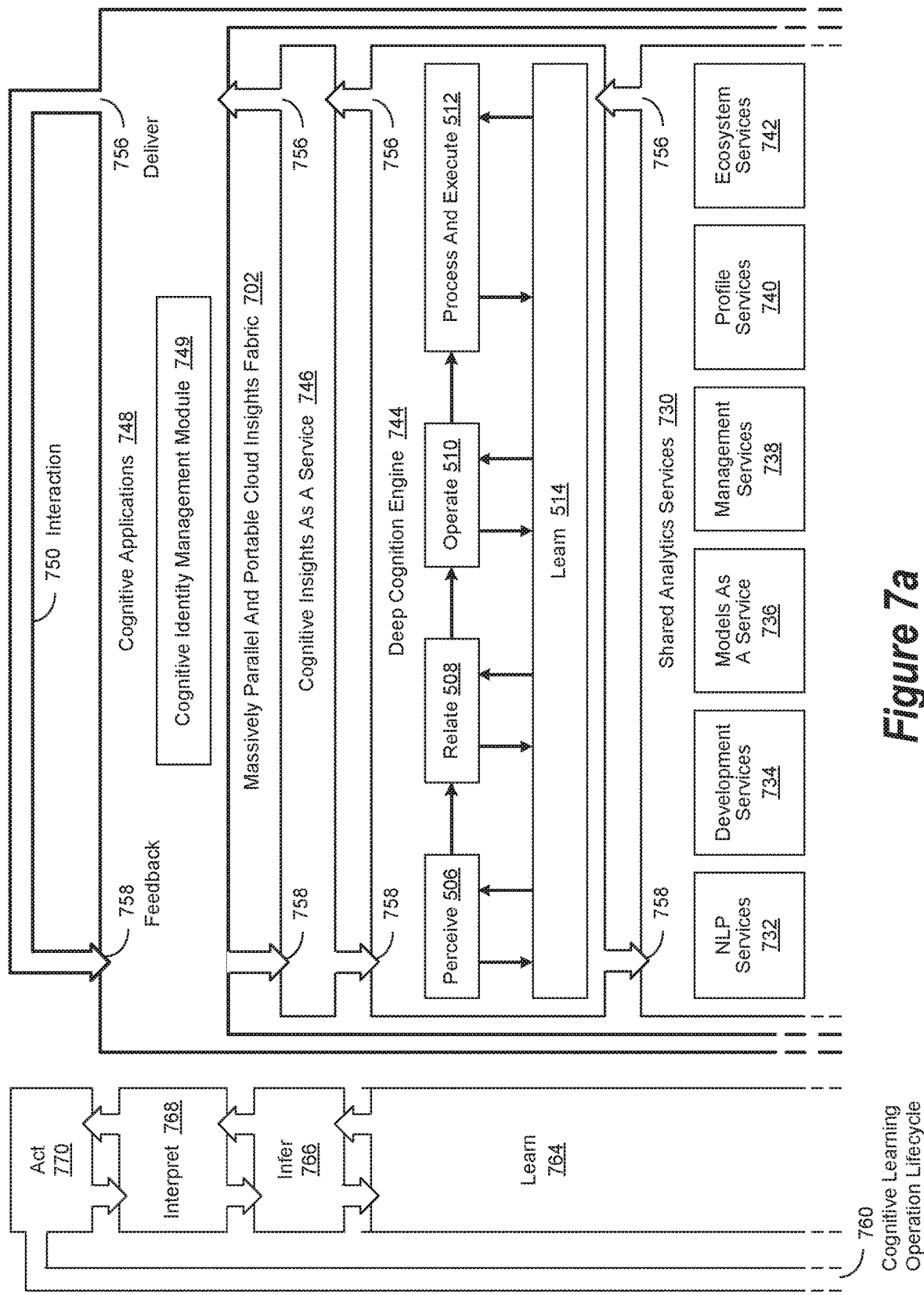
FIGS. 7a and 7b are a simplified block diagram of a CILS used to manage the performance of cognitive learning operations throughout their lifecycle.
Figure 7B:
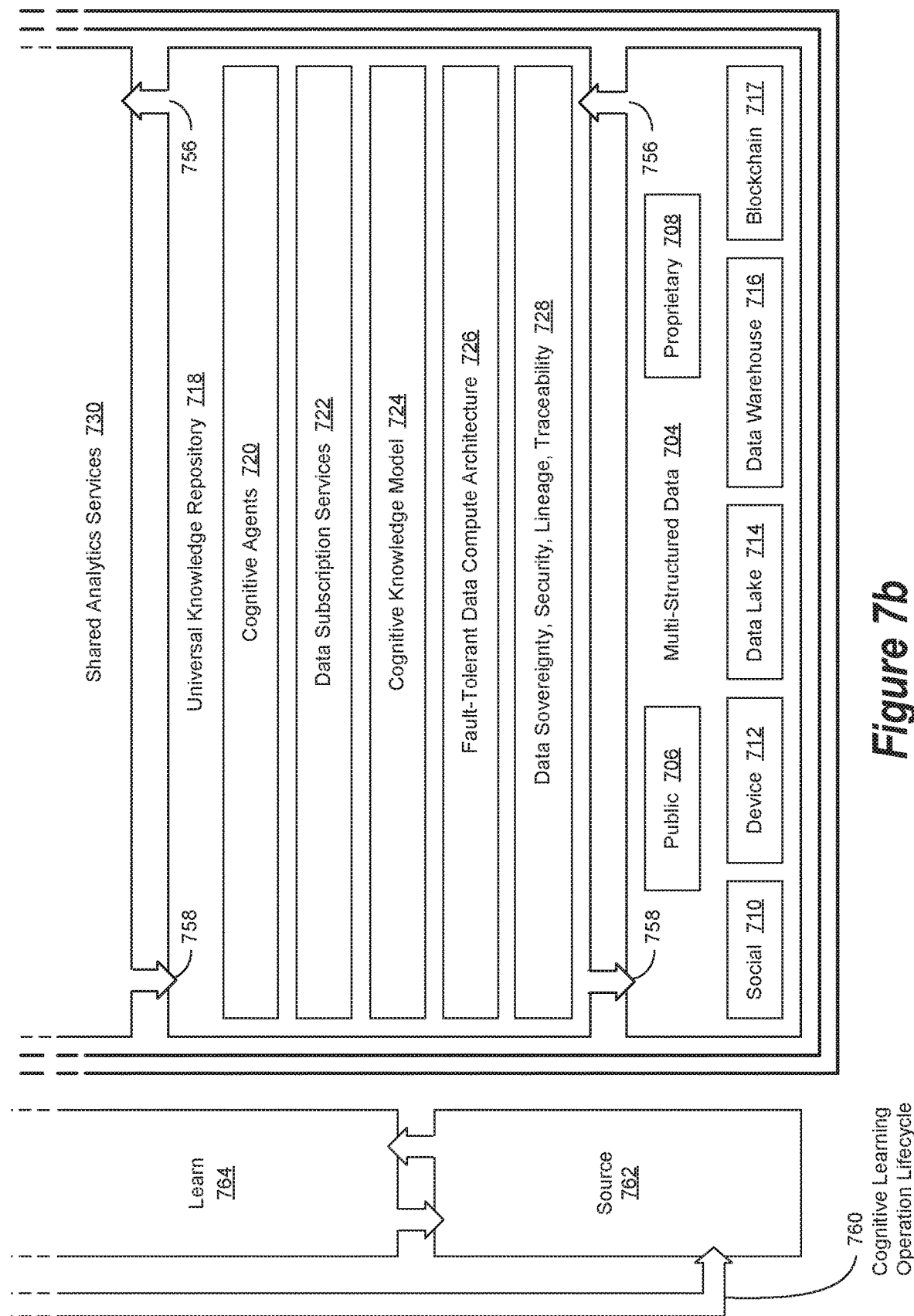

FIGS. 7a and 7b are a simplified block diagram of a Cognitive Learning and Inference System (CILS) implemented in accordance with an embodiment of the invention to manage the performance of cognitive learning operations throughout their lifecycle. In various embodiments, individual elements of a CILS are implemented within a massively parallel and portable cloud insights fabric 702. In this embodiment, the individual elements of the CILS include repositories of multi-structured data 704, a universal knowledge repository 718, various shared analytics services 730, a deep cognition engine 744, and a cognitive insights as a service 746 module.

In certain embodiments, the repositories of multi-structured data 704 may include public 706, proprietary 708, social 710, device 712, and other types of data. Examples of such data include emails, social media feeds, news feeds, blogs, doctor's notes, transaction records, blockchain transactions, call logs, and device telemetry streams. In these embodiments, the repositories of multi-structured data 704 may include unstructured data (e.g., a document), semi-structured data (e.g., a social media post), and structured data (e.g., a string, an integer, etc.), such as data stored in a relational database management system (RDBMS). In various embodiments, such data may be stored in a data lake 714, a data warehouse 716, a blockchain 717, or some combination thereof.

As shown in FIG. 7b, the universal knowledge repository 718 may include various cognitive agents 720, described in greater detail herein, data subscription services 722, and a cognitive knowledge model 724. In certain embodiments, the cognitive agents 720 include a learning agent. As likewise shown in FIG. 7, the universal knowledge repository also includes a fault-tolerant data compute architecture 726, familiar to those of skill in the art, and a data sovereignty, security, lineage and traceability system 728.

In various embodiments, individual data subscription services 722 are implemented to deliver 756 data on an event-driven basis to the various shared analytics services 730. In these embodiments, the data provided to the shared analytics services 730 is retrieved from the cognitive knowledge model 724. In certain embodiments, the cognitive knowledge model 724 is implemented as one or more cognitive graphs. In various embodiments, the cognitive graph may be implemented as an application cognitive graph, a cognitive session graph, a cognitive persona, or a cognitive profile, all of which are described in greater detail herein. The method by which the data is provided to the shared analytics services 730 by the individual data subscription services 722 is a matter of design choice.

In certain embodiments, the fault-tolerant data compute architecture 726 is implemented to provide an operational framework capable of reliably supporting the other elements of the universal knowledge repository 718. In these embodiments, fault-tolerant approaches familiar to those of skill in the art are implemented to accommodate needs to perform various cognitive learning operations described in greater detail herein. The method by which these approaches are implemented is a matter of design choice.

In various embodiments, the data sovereignty, security, lineage and traceability system 728 is implemented to ensure that data ownership rights are observed, data privacy is safeguarded, and data integrity is not compromised. In certain embodiments, data sovereignty, security, lineage and traceability system 728 is likewise implemented to provide a record of not only the source of the data throughout its lifecycle, but also how it has been used, by whom, and for what purpose. Those of skill in the art will recognize many such embodiments are possible. Accordingly, the foregoing is not intended to limit the spirit, scope or intent of the invention.

In this embodiment, the shared analytics services 730 includes Natural Language Processing (NLP) 732 services, development services 734, models-as-a-service 736, management services 738, profile services 740, and ecosystem services 742. In various embodiments, the NLP 732 services include services related to the provision and management of NLP approaches and processes known to skilled practitioners of the art. In these embodiments, NLP 732 services are implemented by a CILS during the performance of cognitive learning operations, as described in greater detail herein. The method by which individual NLP 732 services are implemented by the CILS is a matter of design choice.

In certain embodiments, the development services 734 include services related to the management of data and models as they relate to the development of various analytic approaches known skilled practitioners of the art. In various embodiments, the models-as-a-service 736 includes services for the management and provision of a model. In certain embodiments, the models as a service 736 may be implemented to create and provide a model composed of other models. In this embodiment, the method by which the models-as-a-service 736 is implemented to create and provide such a composite model is a matter of design choice. In various embodiments, the management services 738 include services related to the management and provision of individual services associated with, or a part of, the shared analytics services 730.

In certain embodiments, the profile services 740 include services related to the provision and management of cognitive personas and cognitive profiles, described in greater detail herein, used by a CILS when performing a cognitive learning operation. In various embodiments, a cognitive identity management module 749 is implemented to access cognitive persona and cognitive profile information associated with a user. In certain embodiments, the cognitive identity management module 749 is implemented to verify the identity of a particular user. In various embodiments, provision of cognitive insights, or composite cognitive insights, results in the CILS receiving feedback 758 data from various individual users and other sources, such as cognitive applications 748. Skilled practitioners of the art will recognize that many such embodiments are possible. Accordingly, the foregoing is not intended to limit the spirit, scope or intent of the invention.

In various embodiments, the deep cognition engine 744 is implemented to provide deep contextual understanding and interpretation as various cognitive learning operations, described in greater detail herein, are being performed by a CILS. In certain embodiments, the deep cognition engine 744 may include a perceive 506 phase, a relate 508 phase, an operate 510 phase, a process and execute 512 phase, and a learn 514 phase. In various embodiments, streams of data are sourced from the repositories of multi-structured data 704 are delivered 756 by sourcing agents, described in greater detail herein to the deep cognition engine 744. In these embodiments, the source streams of data are dynamically ingested in real-time during the perceive 506 phase, and based upon a particular context, extraction, parsing, and tagging operations are performed on language, text and images contained therein.

Automatic feature extraction and modeling operations are then performed with the previously processed source streams of data during the relate 508 phase to generate queries to identify related data. In various embodiments, cognitive learning operations are performed during the operate 510 phase to discover, summarize and prioritize various concepts, described in greater detail herein, which are in turn used to generate actionable recommendations and notifications associated. The resulting actionable recommendations and notifications are then processed during the process and execute 512 phase to deliver 756 cognitive insights, such as recommendations, to the cognitive insights as a service 746 module.

In various embodiments, features from newly-observed data are automatically extracted from user interaction 750 during the learn 514 phase to improve various analytical models. In these embodiments, the learn 514 phase includes feedback 758 data associated with observations generated during the relate 508 phase, which is provided to the perceive 506 phase. Likewise, feedback 758 data on decisions resulting from operations performed during the operate 510 phase, and feedback 758 data related to results resulting from operations performed during the process and execute 512 phase, are also provided to the perceive 506 phase.

In various embodiments, user interactions 750 result from operations performed during the process and execute 512 phase. In these embodiments, data associated with the user interactions 750 is provided as feedback 758 data to the perceive 506 phase. As an example, a first query from a user may be submitted to the CILS system, which in turn generates a first cognitive insight, which is then provided to the user. In response, the user may respond by providing a first response, or perhaps a second query, either of which is provided in the same context as the first query. The CILS receives the first response or second query, performs various cognitive learning operations, and provides the user a second cognitive insight. As before, the user may respond with a second response or a third query, in the context of the first or second query. Once again, the CILS performs various cognitive learning operations and provides the user a third cognitive insight, and so forth.

In various embodiments, data may be delivered 756 from the repositories of multi-structured data 704 to the universal knowledge repository 718, which in turn may deliver 756 data to individual shared analytics services 730. In turn, individual shared analytics services 730 may deliver 756 resulting data to the deep cognition engine 744. Likewise, the deep cognition engine 744 may in turn deliver 756 data to the cognitive insights as a service 746. In turn, the cognitive insights as a service 746 module may deliver data to various cognitive applications 748.

In certain embodiments, the data delivered 756 by the cognitive insights as a service 746 to the various cognitive applications 748 includes blockchain-associated cognitive insights, described in greater detail herein. In various embodiments, the various cognitive applications 748 may provide data, including blockchain-associated cognitive insights and composite cognitive insights for interaction 750, described in greater detail herein. In certain embodiments, the interaction may include user interaction resulting in the provision of user input data, likewise described in greater detail herein.

In various embodiments, the interaction results in the provision of feedback 758 data to the various cognitive applications 748, where it may be provided as feedback 758 data to the cognitive insights as a service 746 module. Likewise, the cognitive insights as a service 746 module may provide resulting feedback 758 data to the deep cognition engine 744 for processing. In turn, the deep cognition engine 744 may provide resulting feedback 758 data to individual shared analytics services 730, which likewise may provide resulting feedback 758 data to the universal knowledge repository 718.

In certain embodiments, the feedback 758 data provided to the universal knowledge repository 718 is used, as described in greater detail herein, to update the cognitive knowledge model 724. In various embodiments, the universal knowledge repository 718 may likewise provide feedback 758 data to various repositories of multi-structured data 704. In certain embodiments, the feedback 758 data is used to update repositories of multi-structured data 704. In these embodiments, the feedback 758 data may include updated data, new data, metadata, or a combination thereof.

In various embodiments, a first CILS element may iteratively deliver 756 data to, and receive resulting feedback 758 data from, a second CILS element prior to the second CILS element delivers data to a third CILS element. As an example, the universal knowledge repository 718 may deliver 756 a first set of data to the NLP services 732, which results in a first set of feedback 758 data being returned to the universal knowledge repository 718. As a result of receiving the first set of feedback 758 data, the universal knowledge repository 718 may provide a second set of data to the models-as-a-service 736, which results in the generation of a second set of data. In this example, the second set of data is then delivered 756 to the deep cognition engine 744.

In one embodiment, the feedback 758 data received as a result of an interaction 750 is provided to each of the individual CILS elements. In another embodiment, feedback 758 data received from one CILS element is modified before it is provided as modified feedback 758 data to another CILS element. In yet another embodiment, feedback 758 data received from one CILS element is not modified before it is provided as unmodified feedback 758 data to another CILS element. Skilled practitioners will recognize that many such embodiments are possible. Accordingly, the foregoing is not intended to limit the spirit, scope or intent of the invention.

In various embodiments, the CILS is implemented to manage the lifecycle 760 of a cognitive learning operation. In this embodiment, the cognitive learning operation lifecycle 760 includes a source 762, a learn 765, an infer 766, an interpret 768 and an act 770 lifecycle phase. As shown in FIG. 7, the source 762, the learn 765, the infer 766, the interpret 768, and act 770 lifecycle phases can interact with one another by providing and receiving data between adjacent phases. In addition, the act 770 phase can provide data to the source 762 phase. In certain embodiments, the data the act 707 phase provides to the source 762 phase included feedback data resulting from an interaction, described in greater detail herein.

In various embodiments, the source 762 lifecycle phase is implemented to acquire data from the repositories of multi-structured data 704, which in turn is provided to the universal knowledge repository 718. In one embodiment, the data is provided to the cognitive knowledge model 724 via the implementation of the fault-tolerant data compute architecture 726. In another embodiment, the data sovereignty, security, lineage and traceability system 728 is implemented to ensure that data ownership rights are observed, data privacy is safeguarded, and data integrity is not compromised during the source 762 lifecycle phase. In certain embodiments, data sovereignty, security, lineage and traceability system 728 is likewise implemented to provide a record of not only the source of the data throughout its lifecycle, but also how it has been used, by whom, and for what purpose.

In various embodiments, the learn 764 lifecycle phase is implemented to manage cognitive learning operations being performed by a CILS, as described in greater detail herein. In certain embodiments, cognitive agents 720 are used in the performance of these cognitive learning operations. In one embodiment, a learning agent is used in the performance of certain cognitive learning operations, as described in greater detail herein. In various embodiments, the infer 766 lifecycle phase is implemented to perform cognitive learning operations, described in greater detail herein. In certain embodiments, an inferred learning style, described in greater detail herein, is implemented by the CILS to perform these cognitive learning operations. In one embodiment, a concept entailment cognitive learning technique is implemented by the CILS to perform a cognitive learning operation in the infer 766 lifecycle phase. In another embodiment, a contextual recommendation cognitive learning technique is implemented by the CILS to perform a cognitive learning operation in the infer 766 lifecycle phase.

In these embodiments, the CILS may implement a probabilistic reasoning machine learning algorithm, described in greater detail herein, in combination with the concept entailment or contextual recommendation cognitive learning technique. In certain embodiments, the CILS may implement a reinforcement learning approach, likewise described in greater detail herein, in combination with the concept entailment or contextual recommendation cognitive learning technique. Skilled practitioners of the art will recognize that many such embodiments are possible. Accordingly, the foregoing is not intended to limit the spirit, scope or intent of the invention.

In various embodiments, the interpret 768 lifecycle phase is implemented to interpret the results of a cognitive learning operation such that they are consumable by a recipient, and by extension, present it in a form that is actionable in the act 770 lifecycle phase. In various embodiments, the act 770 lifecycle phase is implemented to support an interaction 750, described in greater detail herein. In certain embodiments, the interaction 750 includes interactions with a user, likewise described in greater detail herein. Skilled practitioners of the art will recognize that many such embodiments are possible. Accordingly, the foregoing is not intended to limit the spirit, scope or intent of the invention.

Figure 8:
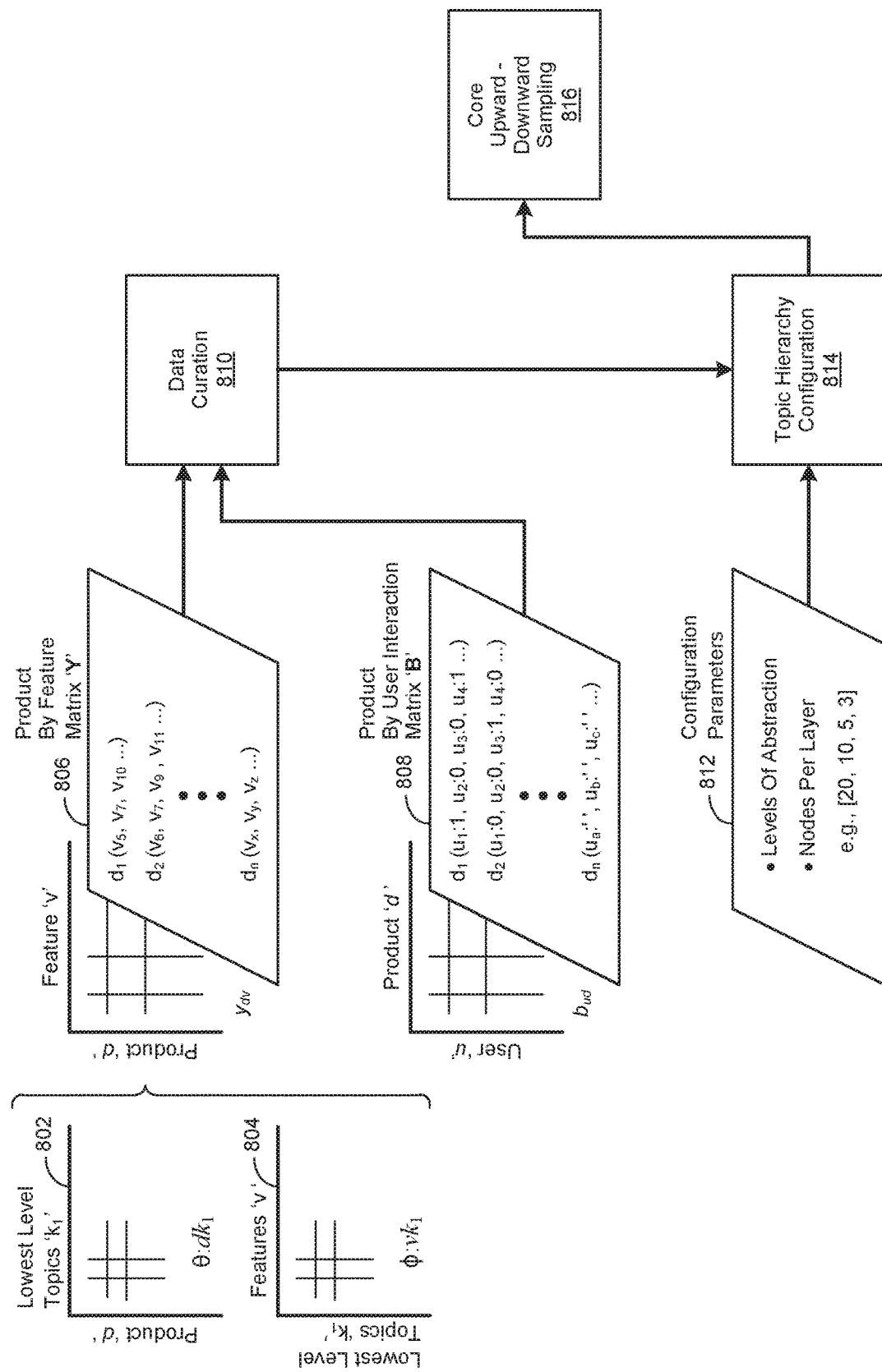
FIG. 8 is a simplified process flow diagram of the performance of cognitive machine learning operations for generating a hierarchical abstraction of topics within a corpus.

FIG. 8 is a simplified process flow diagram of cognitive machine learning operations performed in accordance with an embodiment of the invention to generate a hierarchical abstraction of topics within a corpus. In various embodiments, a cognitive inference and learning system (CILS) utilizes a cognitive machine learning algorithm, as described in greater detail herein, to perform the cognitive machine learning operations. In various embodiments, data curation 810 operations are performed on a corpus, such as a product catalog, to generate a product-by-feature matrix 'Y' 806 and a product-by-user-interaction matrix 'B' 808. As used herein, a feature broadly refers to an attribute, and a user interaction broadly refers to any interaction a user may have with a given product. As an example, a user may select a particular product from three candidate products, each of which has a different set of associated features, displayed on a web page. In this example, the user interaction is the user's act of selecting the chosen product according to its associated features.

In these embodiments, each row of the product-by-feature matrix 'Y' 806 represents a particular product d and each column corresponds to a particular feature v associated with that product d. Likewise, each row of the user-interaction-by-product matrix 'B' 808 represents a particular user u and each column corresponds to a particular product d associated with that that user's interaction v. As an example, the first row of the product-by-feature matrix 'Y' 806 may include product $d_1$, which is associated with features $v_5$, $v_7$, $v_{10}$, and so forth. Likewise, the second row of the product-by-feature matrix 'Y' 806 may include product $d_2$, which is associated with features $v_6$, $v_7$, $v_{11}$, and so forth. To continue the example, the first row of the user-interaction-by-product matrix 'B' 808 may likewise include product $d_1$, which is associated with users $u_1$:1, $u_2$:0, $u_3$:0, $u_4$:1 and so forth. Likewise, the second row of the product-by-feature matrix 'Y' 806 may include product $d_2$, which is associated with users $u_1$:0, $u_2$:0, $u_3$:1, $u_4$:0 and so forth. To further continue the example, the use of a '1' denotes a user's interaction with the product and the use of a '0' denotes the absence of a user's interaction.

As another example, a skillet may be a product that has a corresponding feature of being "non-stick." In certain embodiments, a feature has a one-to-one association with its corresponding product, yet different products may have the same feature. To continue the example, the afore-mentioned skillet and a saucepan may be different products, yet both may have the corresponding feature of being "non-stick." Likewise, the skillet may have a feature of being eight inches in diameter while the saucepan may have a feature of ten inches in diameter. In further continuance of the example, a user may perform a user interaction with the skillet, such as selecting it as a candidate purchase on a web page, but not performing a similar user interaction with the saucepan.

In certain embodiments, the product-by-feature matrix 'Y' 806 may be implemented as a document-by-word matrix. In these embodiments, each row in the product-by-feature matrix 'Y' 806 represents a particular document and each word corresponds to a term associated with that document. In various embodiments, term counts may be implemented to determine their frequency in the document-by-word matrix. Those of skill in the art will recognize that many such embodiments and examples of products, documents, features, terms, and user interactions are possible. According, the foregoing is not intended to limit the spirit, scope or intent of the invention.

As shown in FIG. 8, the dimensions of the product-by-feature matrix 'Y' 806 can be expressed as $y_{dv}$ and the dimensions of the user-interaction-by-feature matrix 'B' 808 can be expressed as $b_{ud}$. Likewise, the indexing of the product-by-feature matrix 'Y' 806 can be represented by $y_{dv}$ where d is a particular product and v is a particular feature. Likewise, the indexing of the product-by-user interaction matrix 'B' 808 is represented by $b_{ud}$ where u is a particular user and d is a particular product.

In certain embodiments, the product-by-feature matrix 'Y' 806 may be decomposed as the product of two matrices. The first matrix, referenced as θ, is a product-by-lowest-level-topics matrix 802. The second matrix, referenced as φ, is a feature-by-lowest-level-topics matrix 804. In these embodiments, the dimension of theta θ can be expressed as $\theta:dk_1$ and the dimension of φ can be expressed as $\phi:vk_1$, where $k_1$ represents the number of topics in the first level of a given hierarchy, which as described in greater detail herein, is also its lowest level of abstraction.

Accordingly, $Y \approx \theta^{(1)}\phi^{(1)}$, $B \approx \Lambda\phi^{(1)}$, and $\beta:u\overline{K}$, where β denotes a user's association with one or more types of users, such as various cognitive personas, described in greater detail herein. Likewise, Λ denotes the mapping between various product clusters and various types of users, and $\overline{K}$ denotes the total number of unique users. By extension, an individual user that is associated with a particular type of user is likely to prefer a certain group of products. As an example, an individual user who is associated with a group of users who are machinists may have a preference for stainless steel machine screws. In contrast, an individual user who is associated with a group of users who are woodworkers may have a preference for brass wood screws. In this example, "stainless steel" and "machine" are features that machinists prefer, while "brass" and "wood" are features that woodworkers prefer.

Once data curation 810 operations are completed, configuration parameters 812 are received, which are in turn used to perform topic hierarchy configuration 814 operations. In various embodiments, the configuration parameters may include a target number of levels of abstraction for a given hierarchy, along with a target number of nodes for each level of the hierarchy. As an example, the hierarchy may be defined as having 20 nodes in its lowest level, 10 in its second, 5 in its third, and 3 in its fourth. In this example, the dimension of θ for the lowest level of abstraction is defined as $\theta^{(1)}:d\ 20$, and the dimension of φ is defined as $\phi^{(1)}:20\ v$, where '20' is the number of nodes in the lowest level of abstraction in the hierarchy. Likewise, the dimension of θ for the second lowest level of abstraction is defined as $\theta^{(2)}$:d 10, and the dimension of $\phi$ is defined as $\phi^{(2)}$: 10 v, where '10' is the number of nodes in the second lowest level of abstraction in the hierarchy. The process is then continued, level by level of the hierarchy, until the highest-defined level of abstraction, such as the fourth level, of the hierarchy is reached.

As used herein, a node broadly refers to either an individual topic or a cluster of topics. As likewise used herein, a topic broadly refers to a statistical distribution of associated attributes. In certain embodiments, a topic may be a product, such as that found in a product catalog, and its associated attributes may be features of the product. In various embodiments, the topic may be a document in a corpus of content and its associated attributes may be terms it contains. In certain embodiments, the affinity of individual attributes to a given topic is defined by a probability vector with each feature representing a certain affinity score between '0' and '1'. In various embodiments, each topic has an affinity towards a given node. However, in certain of these embodiments, this score is not bounded between '0' and '1'. Instead, it can be any non-negative value.

As an example, a bolt and a machine screw may have a particular type of thread that is different. Likewise, the bolt may have a hex head, while the machine screw may have a slotted head. As such, even though they may have features that are completely discrete from one another, they both have a strong affinity to the topic of "threaded fasteners." However, both the bolt and machine screw may also have a "diameter" feature, which could be the same dimension. In this example, the feature of "diameter" could have an affinity to the topics of both "threaded fasteners," such as bolts and machine screws, and "non-threaded fasteners," such as cotter pins or pop rivets. Once topic hierarchy configuration 814 operations are completed, then core upward-downward sampling operations, described in greater detail herein, are performed.

FIG. 9 shows the use of Gibbs sampling by a cognitive machine learning algorithm implemented in accordance with an embodiment of the invention. In various embodiments, a generative model may have a plurality of parameters, or variables, such as:

$$x_1, x_2 \ldots x_n$$

where the joint distribution 'P' of the variables can be described as:

$$P(x_1, \ldots, x_n).$$

Skilled practitioners of the art will be familiar with generative processes, which are often used to generate a probabilistic model. As used herein, a generative process broadly refers to various approaches for randomly generating observable data values, generally given some hidden parameters. As such, they typically specify a joint probability distribution over observation and label sequences. Those of skill in the art will also be aware that generative models are commonly used in machine learning for either modeling data directly, such as modeling observations drawn from a probability density function, or as an intermediate step to forming a conditional probability density function.

Skilled practitioners of the art will likewise be aware that a conditional distribution can be formed from a generative model through Bayes' rule, which is commonly used to generate a Bayesian network. As used herein, a Bayesian network broadly refers to a probabilistic graphical model that represents a set of random variables and their conditional dependencies via a directed acyclic graph (DAG). More particularly, Bayesian networks are DAGs whose nodes represent random variables in that they may be observable quantities, latent variables, unknown parameters, or hypotheses. Likewise, edges represent conditional dependencies and nodes that are not connected represent variables that are conditionally independent of one another. In such approaches, each node is associated with a probability function that takes, as input, a particular set of values for the node's parent variables. Each such node also gives, as output, the probability distribution of the variable represented by the node.

As likewise used herein, a probabilistic model broadly refers to a knowledge graph construction resulting from the extraction of information from a knowledge population, and the inference of missing information. In various probabilistic modeling approaches, the missing information is inferred through a statistical analysis of the extracted information. It will be appreciated that it is not uncommon for insufficient external resources in the knowledge population to hinder such statistical inference. In various embodiments, gaps between these two processes may be reduced by an incremental population approach that benefits from the path structure of existing knowledge.

In certain embodiments, the joint distribution $P(x_1, \ldots, x_n)$ of these variables may not initially be known, yet it is desirable to determine the particular values of $x_1, x_2 \ldots x_n$ that will maximize the joint probability $P(\ )$. Accordingly, Gibbs sampling approaches known to those of skill in the art are implemented in various embodiments to perform sampling operations. Skilled practitioners of the art will be familiar with a Gibbs sampler, which is a Markov chain Monte Carlo (MCMC) algorithm for obtaining a sequence of observations that are approximated from a specified multivariate probability distribution. In particular, Gibbs sampling is often utilized when direct sampling is difficult. The sequence of observations resulting from Gibbs sampling can be used for a variety of purposes. For example, the sequence may be used to approximate joint distribution, such as when generating a histogram of the distribution. The sequence can likewise be used to approximate the marginal distribution of a particular variable, or some subset of variables, such as unknown parameters or latent variables. Likewise, the sequence may be used to compute an integral, such as the expected value of one of the variables. In certain embodiments, some of the variables may correspond to observations whose values are known and therefore do not require sampling.

Those of skill in the art will likewise be familiar with Markov chains, which in probability theory and statistics are a stochastic process that satisfies the Markov property, which is typically characterized as "memorylessness." In general, a process satisfies the Markov property if the future outcome of the process can be predicted solely upon its present state, and likewise, the same results can be realized as if the complete history of the process was known. In particular, conditional upon the present state of a given system, its future and past are independent in a Markov process.

More particularly, when implemented in discrete time, a Markov process is known as a discrete-time Markov chain (DTMC). Such processes undergo transitions from one state to another for a given state space, with the probability distribution of the next state dependent only upon the current state and not on the sequence of events that preceded it. Likewise, in continuous time, such processes are known as a continuous-time Markov chain (CTMC), or alternatively, as a continuous-time Markov process. These processes take values in a given finite state space, with the time spent in each state taking non-negative real values and having a corresponding exponential distribution. Accordingly, future behavior of the model, for both the time remaining in the current state and the next state, depends only upon the current state of the model and not on historical behavior.

In these embodiments, a Gibbs sampling operation is performed to determine the probability of $x_1$ as follows:

$$x_1 \sim P(x_1 | \ldots) \qquad 902,$$

such that the value of x is fixed at a particular value. The resulting value of $x_1$ is then used to determine the conditional distribution of $x_2$ by sampling $x_2$ as follows:

$$x_2 \sim P(x_2 | x_1 \ldots) \qquad 904.$$

In turn, the resulting value of $x_2$ is then used to determine the conditional distribution of $x_3$ by sampling $x_3$ as follows:

$$x_3 \sim P(x_2 | x_1, x_2 \ldots) \qquad 906$$

The procedure is then repeated to determine the conditional distribution of $x_n$ by sampling $x_n$ as follows:

$$x_n \sim P(x_n | x_1, x_2, x_3 \ldots) \qquad 908$$

Upon completion of sampling $x_n$ the process continues as a sampling cycle 910. In various embodiments, the number of times the sampling cycle 910 is performed is a matter of design choice. In certain embodiments, the resulting sampling values of $x_1, x_2 \ldots x_n$ from each sampling cycle are respectively averaged, which in turn results in maximizing the joint probability P( ).

FIG. 10 depicts upward-downward sampling operations performed by a cognitive machine learning algorithm implemented in accordance with an embodiment of the invention. In various embodiments, the cognitive machine learning algorithm may be implemented as an augmented Gamma Belief Network (GBN) 1000. Skilled practitioners of the art will be familiar with various GBN 1000 approaches, which are often implemented to infer a multi-level representation of high-dimensional discrete or non-negative real vectors. In certain embodiments, the augmented GBN 1000 may be implemented to factorize each of its hidden hierarchy levels T 1002 of abstraction into the product of a sparse connection weight matrix and the nonnegative real hidden units of the next hierarchy level $t^1$ 1004 through $t^n$ 1006 of abstraction. In various embodiments, the augmented GBN 1000 may be implemented as a domain topic abstraction algorithm, a hierarchical topic navigation algorithm, a temporal topic discovery algorithm, or some combination thereof.

In various embodiments, individual nodes in the augmented GBN 1000 are implemented as clusters of domain topics in a hierarchical topic model, described in greater detail herein. In certain embodiments, the domain topics are characterized as products, such as products in a product catalog, and the data attributes associated with each product are characterized as product features. In various embodiments, individual nodes in the augmented GBN 1000 are implemented as clusters of event topics in a temporal topic model, likewise described in greater detail herein. In certain embodiments, the event topics are characterized as portions of corpora associated with a particular temporal event and their associated data attributes are characterized as terms.

In various embodiments, a product-by-feature matrix M 1008, described in greater detail herein, is the product of two sub-matrices, a product-by-topic matrix and a topic-by-feature matrix, likewise described in greater detail herein. These two sub-matrices, represented by variables 1010 θ and ϕ are Poisson 1022 distributed as follows:

$$M \sim \text{Pois}(\theta^{(1)} \phi^{(1)})$$

Skilled practitioners of the art will be familiar with Poisson 1022 distribution, which is a discrete probability distribution. In various known approaches, Poisson 1022 distributions express the probability of a given number of events occurring in a fixed interval of time, space, or a combination thereof. Poisson 1022 distributions likewise assume that such events occur independently of each preceding event with a known average rate.

In these embodiments, it is desirable to have values greater than 0 for $\theta^{(1)}$ 1012 and $\phi^{(1)}$ 1014, as negative values for $\theta^{(1)}$ 1012 and $\phi^{(1)}$ 1014 would imply a negative affinity to a given topic. However, a value greater than or equal to 0 for either $\theta^{(1)}$ 1012 or $\phi^{(1)}$ 1014 would respectively imply $\theta^{(1)}$ 1012 or $\phi^{(1)}$ 1014 having either a positive affinity, or no affinity, for a given topic. Accordingly, a gamma 1024 distribution is imposed as a prior over $\theta^{(1)}$ 1012 and a Dirichlet 1026 distribution is imposed as a prior over $\phi^{(1)}$ 1014.

Those of skill in the art will be familiar with gamma 1024 distribution, which in the fields of probability theory and statistics refers to a two-parameter family of continuous probability distributions 1020. In general, three different parametrizations are commonly used:

a shape parameter k and a scale parameter θ a shape parameter α=k and an inverse scale parameter β=1/θ, known as a rate parameter, and a shape parameter k and a mean parameter μ=k/β

In each of these three forms, both parameters are positive real numbers. Skilled practitioners of the art will likewise be familiar with Dirichlet distributions, often denoted Dir(α), which in the fields of probability and statistics refers to a family of continuous multivariate probability distributions parameterized by a vector of positive reals. As such, it is a multivariate generalization of the beta distribution.

Accordingly, the gamma 1024 and Dirichlet 1026 distribution is imposed such that:

$\theta^{(1)} \sim$ Gamma( ), and $\phi^{(1)} \sim$ Dir( ), which in certain embodiments results in the determination of conditional distributions 1020 as follows:

$\theta^{(1)} | \sim$ and $\phi^{(1)} | \sim$ and so forth, for each associated level $t^1$ 1004 through $t^n$ 1006 of the augmented GBN 1000 hierarchy.

In various embodiments, once conditional distributions 1020 have been determined for each node in the augmented GBN 1000, then augmentation variables 1028 of $L^1$ 1030 through $L^n$ 1032 are respectively applied to each corresponding node $\theta^{(1)}$ 1012 through $\theta^{(n)}$ 1016. In these embodiments, the application of the augmentation variables 1028 of $L^1$ 1030 through $L^n$ 1032 are used in the performance of downward sampling 1034 operations, beginning with level $t^n$ 1006 and proceeding, level-by-level, to level $t^1$ 1004, as described in greater detail herein. In certain embodiments, the application of the augmentation variables 1028 of $L^1$ 1030 through $L^n$ 1032 result in a tractable form of the conditional distribution 1020 associated with each corresponding variable $\theta^{(1)}$ 1012 through $\theta^{(n)}$ 1016, which allows sampling of $\theta^{(1)}$ 1012 and $\phi^{(1)}$ 1014 to be performed more easily. In various embodiments, the augmentation variables 1028 of $L^1$ 1030 through $L^n$ 1032 are applied according to a Poisson 1022 distribution approach.

In various embodiments, augmentation of a GBN 1000 is based upon the assertion:

$$a x_k \sim \text{Pois}(\zeta_k) \forall k, \text{ and:}$$

$$X = \Sigma_{k=1}^K x_k, \zeta = \Sigma_{k=1}^K \zeta_k, \text{ and if:}$$

$(y_1, \ldots, y_K) \sim \text{mult}(X; \zeta_1/\zeta, \ldots, \zeta_K/\zeta)$, then:

$$P(x_1, \ldots, x_K) = P(y_1, \ldots, y_K; X)$$

Accordingly, the negative binomial (NB) distribution m~NB(r, p), in combination with the probability mass function (PMF):

$$Pr(M = m) = \frac{Gam(m+r)}{m! Gam(r)} p^m (1-p)^r \text{ for } m \in Z,$$

can be augmented into a gamma 1024-Poisson 1022 construction as:

$$m \sim \text{Pois}(\lambda), \lambda \sim \text{Gam}(r, p/(1-p)),$$

where the gamma 1024 distribution is parameterized by its shape r and scale p/(1−p). Likewise, it can also be augmented under a compound Poisson 1022 representation as:

$$m = \sum_{t=1}^{l} u_t, u_t^{iid} \sim \text{Log}(p), l \sim \text{Pois}(-r \ln(1-p)),$$

where:
u~Log(p) is the logarithmic distribution.

In certain embodiments, the augmented GBN's 1000 hierarchy levels 1002 are jointly trained with a Gibbs sampler implemented to perform upward 1024 and downward 1034 sampling. In various embodiments, each upward 1024 sampling iteration of the augmented GBN 1000 propagates latent counts and samples Dirichlet 1026 distributed connection weight vectors starting from a bottom-most level $t^1$ 1004.

In certain embodiments, downward 1034 sampling of the augmented GBN 1000 iteratively samples gamma 1024 distributed hidden units starting from the top hierarchy level $t^n$ 1006, with each lower level (e.g., level $t^3$) solved with the same sequence of operations. In these embodiments, the gamma-negative binomial process, combined with such a level-wise training approach, allows the augmented GBN 1000 to infer the width of each hierarchy level 1002 given a fixed budget on the width of the first, or bottom-most level $t^1$ 1004.

In certain of these embodiments, the basis for the probabilistic model is established by first implementing a product-by-feature matrix $Y \in 0,1^{D \times V}$, described in greater detail herein, wherein the $(d, w)^{th}$ entry of the matrix is denoted by $y_{dw}$ and is linked to a latent count as follows:

$$x_{dw}^{(1)} \sim \text{Pois}\left(\sum_{k_1=1}^{K_1} \theta_{dk_1}^{(1)} \phi_{wk_1}^{(1)}\right) \text{ as } y_{dw} = 1_{\{x_{dw}^{(1)} > 0\}}$$

In these embodiments, a tree-structured prior over $\theta_{dk_1}^{(1)}$'s is maintained, wherein the hierarchy tree has a depth 1002 of T, the leaves are represented by the $\theta_{dk_1}^{(1)}$'s and the top level nodes, such as the nodes in hierarchy level $t^n$ 1024, are represented by $\theta_{dk_T}^{(T)}$'s, with $K_t$ being the greatest number of nodes at a given hierarchy level 1002 $T^{th}$. Accordingly, the top-most hierarchy level 1002 $T^{th}$ of the tree is sampled as:

$$\varphi_{k_T}^{(T)} \sim \text{Dir}(\eta_T) \forall k_T \in \{1, \ldots, K_T\},$$

as well as:

$$a\theta_{dk_T}^{(T)} \sim \text{Gam}(r_{k_T}, 1/c_d^{(T)}) \forall k_T \in \{1, \ldots, K_T\} \text{ for } \forall k_T, d$$

To complete the generative process, priors are imposed over $r_{k_T}$ as:

$$r_{k_T} \sim \text{Gam}(\gamma_0/K_T, 1/c_0) \forall k_T \in \{1, \ldots, K_T\},$$

where:

$$\gamma_0 \sim \text{Gam}(a_0, 1/b_0), c_0 \sim \text{Gam}(e_0, 1/f_0),$$

and $\varphi_{k_T}^{(T)}$'s are then sampled from Dirichlet distribution. Consequently:

$$\sum_{k_{(T-1)}=1}^{K_{(T-1)}} \phi_{k_{(T-1)}k_T}^{(T)} = 1 \forall k_T \text{ and } \phi_{k_{(T-1)}k_T}^{(T)} \geq 0 \forall k_{(T-1)}, k_T$$

Likewise, each $T^{th}$ level 1002 in the hierarchy tree, where $1 \leq t < T$ 1026, is sampled as:

$$\varphi_{k_t}^{(t)} \sim \text{Dir}(\eta^{(t)}) \forall k_t \in \{1, 2, \ldots, K_t\},$$

followed by:

$$\sum_{k_{(t-1)}=1}^{K_{(t-1)}} \phi_{k_{(t-1)}k_t}^{(t)} = 1 \forall k_t, \quad \phi_{k_{(t-1)}k_t}^{(t)} \geq \forall k_{(t-1)}, k_t,$$

and:
$\forall k_t, d$, is sampled as:

$$\theta_{dk_t}^{(t)} \sim \text{Gam}\left(\sum_{k_{(t+1)}=1}^{K_{(t+1)}} \theta_{dk_{(t+1)}}^{(t+1)} \phi_{k_t k_{(t+1)}}^{(t+1)}, 1/c_d^{(t)}\right)$$

In certain embodiments, $K_1 = V$ is maintained, such that bottom-level topics, such as those topics associated with hierarchy level $t^1$ 1004, are connected to all features, resulting in any topic at any hierarchy level 1002 t>1 having indirect connection to all features. Likewise, the variability in the number of features each individual product of the augmented GBN 1000 can possess is accounted for by:

$$c_d^{(t)} \sim \text{Gam}(e_0, 1/f_0) \forall d$$

In various embodiments, this generative process induces a hierarchical factorization of the features in the product-by-feature matrix M 1008. Consequently, this generative process can be further augmented with the user-by-product interaction matrix B, which is a binary matrix of dimension U×D that encodes the "likes" and "dislikes" of the users corresponding to each of the products in the matrix M 1008. In these embodiments, the $(u,d)^{th}$ entry of the matrix M 1008 is denoted by $B_{ud}$, wherein:

$$B_{ud} \sim \text{Pois}_+(\beta_u \Lambda \theta_d^{(1)}).$$

Likewise, $\beta_u \in R_+^{\bar{K}}$ is the representation of the $u^{th}$ user in the latent space spanned by all different users and is sampled as $\beta_u \sim \text{Dir}(\zeta) \forall u$, with the existence of at most $\bar{K}$ different users. For a given d, $\theta_d^{(1)}$ 1004 likewise represents the product from the lowest level of the hierarchical factorization, such as hierarchy level $t^1$ 1004 to influence a user's decision to "like" a product. Likewise, $$\Lambda \in R_+^{\bar{K} \times K_1}$$

models the association between the set of user factors $\bar{K}$ and product factors $K_1$, and can be sampled as:

$$\Lambda_{k,k_1} \sim \text{Gam}(\rho_0/\bar{K}, 1/c)$$

Consequently, following the properties of Poisson 1014 distribution:

$$B_{ud} = I_{\{b_{ud}>0\}}, \quad b_{ud} = \sum_{k_1, \bar{K}} b_{ud\bar{K}k_1}, \quad b_{ud\bar{K}k_1} \sim Pois(\beta_{u\bar{K}} \Lambda_{\bar{K},k_1} \theta_{dk_1}^{(1)}).$$

From the foregoing, skilled practitioners of the art will recognize that the described augmentation of the interaction matrix ensures that the hierarchical construction of the augmented GBN 1000 is modified such that it reflects a user's preferences. Furthermore, the foregoing provides an approach for unsupervised generation of a hierarchical abstraction of a corpus of content in the absence of user-product interaction data. However, it will be appreciated that the automated categorization of products within such a hierarchy may not match semantic concepts typically perceived by users.

Accordingly, there may be a need to reorganize the hierarchy of the augmented GBN with user-product interaction data. In various embodiments, feedback from the user, or updates to the hierarchical factorization, is not respectively received or performed in real time. Instead, feedback is collected from users for a certain period of time, such as a day or two, followed by using the collected interaction data to re-learn the representation of the augmented GBN 1000. In certain embodiments, such hierarchical categorization of features facilitates the discovery of abstract semantic correlation, which is useful for identifying a user's explicit preferences over a collection of implicit features within the GBN 1000.

In various embodiments, the network structure of the augmented GBN 1000 can be expressed as:

$$E[[x_d^{(1)}, b_{\cdot d}] \mid \theta_d^{(t)}, \{\Phi^{(t)}, c_d^{(t)}\}_{1,t}] = [\Phi^{(1)}, \Lambda] \left[\prod_{t=2}^{t} \Phi^{(t)}\right] \frac{\theta_d^{(t)}}{\prod_{t=2}^{t} c_d^{(t)}},$$

and: $E[\theta_d^{(t)} \mid \{\Phi^{(t)}, c_d^{(t)}\}_{t+1,T}, r] = \left[\prod_{t'=t+1}^{T} \Phi^{(t')}\right] \frac{r}{\prod_{t'=t+1}^{T+1} c_d^{(t')}}$ wherein "[.,.]" denotes concatenation of row vectors and matrices. For visualization, the $K_t$ topics of hierarchy level 1002 $t \in \{1, \ldots, T\}$ can likewise be projected to the bottom data hierarchy level $t^1$ 1004 for visualization as the columns of the $(V+\bar{K}) \times K_t$ matrix $$[\Phi^{(1)}, \Lambda] \prod_{t'=2}^{t} \Phi^{(t')},$$

with their respective popularity being ranked using the $K_t$ dimensional non-negative weight vector $$r^{(t)} := \left[\prod_{t'=(t+1)}^{T} \Phi^{(t')}\right] r.$$

In certain embodiments, the value of $\phi_{k_t k_t'}^{(t)}$ can be used to measure the connection strength between a particular node k of a hierarchy level 1002 t and a node k' of a hierarchy level 1002 (t−1). Accordingly, skilled practitioners of the art will recognize that the differences between typical and augmented GBN 1000 approaches can be observed in these derivations. It can likewise be observed that various abstract user groups, such as users sharing a common cognitive persona, can act as implicit features of dimension $\bar{K}$ along with the explicit product features of dimension V. Likewise, $\varphi_{k_t}^{(t)}$'s at each level 1002 of the hierarchy represent a certain combination of features that can be considered a signature of their corresponding node. As an example, the hierarchy may represent a collection of women's dresses. Accordingly, a given $\varphi_{k_t}^{(t)}$ might represent "50% animal print, 40% pink, 5% party dress," and "5% of urban casual fashion buyers."

From the foregoing, those of skill in the art will recognize that these percentages can be calculated from the posterior assignment of each $\varphi_{k_t}^{(t)}$, which by construction, is a probability vector. In such cases, the corresponding $\theta_{dk_t}^{(t)}$ represents the affinity of the $d^{th}$ product towards these attributes. Accordingly, if the $u^{th}$ user happens to prefer a particular product, then her associated cognitive persona is more likely to be described as "50% animal print, 40% pink, 5% party dress," and "5% of urban casual fashion buyer" and belong to this category. Consequently, user types can be personified in certain embodiments as abstract groups that emerge from the interaction pattern.

In various embodiments, closed-form updates for Gibbs sampling of all latent variables in a model can be derived such that inference is fast, comprehensive, and scalable when processing corpora of content that include large amounts of associated data. As an example, $x_{dw}^{(1)}$ only needs to be sampled when $y_{dw} > 0$, which can be described as:

$$x_{dw}^{(1)} \mid \ldots \sim y_{dw} Pois_+\left(\sum_{k_1=1}^{K_1} \theta_{dk_1}^{(1)} \phi_{wk_1}^{(1)}\right),$$

and accordingly, sampling of $x_{dwk_1}^{(1)}$ can be described as:

$$\left(x_{dwk_1}^{(1)}\right)_{k_1=1}^{K_1} \mid \ldots \sim mult\left(\left(\theta_{dk_1}^{(1)} \phi_{wk_1}^{(1)} \Big/ \sum_{k_1=1}^{K_1} \theta_{dk_1}^{(1)} \phi_{wk_1}^{(1)}\right)_{k_1=1}^{K_1} ; x_{dw}^{(1)}\right)$$

Likewise, $$\left(b_{ud\bar{K}k_1}\right)_{\bar{K}k_1}$$

only needs to be sampled in certain embodiments when $B_{ud} > 0$. In these embodiments, the sampling operations can be described as:

$$\left(b_{udkk_1}\right)_{kk_1} \mid \ldots \sim B_{ud} Pois_+\left(\sum_{\bar{K},k_1} \beta_{u\bar{K}} \Lambda_{kk_1} \theta_{dk_1}^{(1)}\right)$$

In various embodiments, upward 1006 sampling of $\theta_{dk_t}^{(t)}$ 1004 for hierarchy levels $t^1$ 1022 to $t^n$ 1024 can likewise be based upon the assertion that if:

$\lambda \sim \text{Gam}(r, 1/c), x_i \sim \text{Poisson}(m_i \lambda),$ then:

$\lambda | \{x_i\} \sim \text{Gam}(r + \Sigma_i x_i, 1/(c + \Sigma_i m_i)),$ which in turn can be described as:

$$\theta_{dk_1}^{(1)} \bigg| \ldots \sim \text{Gam}\left(\sum_{k_2=1}^{K_2} \theta_{dk_2}^{(2)} \phi_{k_1 k_2}^{(2)} + x_{d \cdot k_1}^{(1)} + b_{\cdot d \cdot k_1}, 1/(c_d^{(1)} + 1 + \Lambda_{\cdot k_1})\right)$$

From the foregoing, those of skill in the art will recognize how the sampling of the $\theta^{(1)}$'s is affected by the observation matrix B. In particular, as the number of user interactions increase, they have a corresponding effect on the posterior of the $\theta^{(1)}$'s 1004. Consequently, the hierarchical construction of the features is shaped by each user interaction 'i' as more data is gathered. Accordingly, for i=2ωi=T 1026, augmentation operations are implemented with the GBN 1000 in various embodiments as follows:

$$x_{dk_{(t-1)}}^{(t)} \bigg| \ldots \sim \text{CRT}\left(x_{d \cdot k_{(t-1)}}^{(t-1)}, \langle \theta_d^{(t)}, \varphi_{k_{(t-1)}}^{(t)} \rangle\right)$$

to determine which data x is transferred from a lower hierarchy level 1002 t (e.g., $t^2$), in the augmented GBN 1000 to a higher hierarchy level 1002 t (e.g., $t^3$), where d represents a product in the augmented GBN 1000 and k represents a particular node.

Thereafter, the following multinomial sampling can be used in various embodiments to split the augmented count amongst the topics at a particular hierarchy level 1002 t:

$$\left(x_{dk_{(t-1)}k_t}\right)_{k_t=1}^{K_t} \bigg| \ldots \sim \text{mult}\left(x_{dk_{(t-1)}}^{(t)}; \left(\theta_{dk_t}^{(t)} \phi_{k_{(t-1)}k_t}^{(t)} / \sum_{k_t=1}^{K_t} \theta_{dk_t}^{(t)} \phi_{k_{(t-1)}k_t}^{(t)}\right)_{k_t=1}^{K_t}\right)$$

Accordingly, assuming m~NB(r, p) is represented under its compound Poisson 1022 representation, then the conditional posterior of l given m and r has PMF as follows:

$$Pr(l = j | m, r) = \frac{\Gamma(r)}{\Gamma(m+r)} |s(m, j)| r^j, \quad j = 0, 1, \ldots, m$$

where |s(m, j)| are unsigned Stirling numbers of the first kind. Accordingly, this conditional posterior can then be denoted as l~CRT(m, r), a Chinese restaurant table (CRT) count random variable, which in turn can be generated via:

$l = \Sigma_{n=1}^m z_n, z_n \sim \text{Bernoulli}(r/(n-1+r))$

Using this approach, the conditional posterior for $\theta_{dk_t}^{(t)}$ can then be derived as:

$$\theta_{dk_t}^{(t)} \bigg| \ldots \sim \text{Gam}\left(\sum_{k_{(t+1)}} \theta_{dk_{(t+1)}}^{(t+1)} \phi_{k_t k_{(t+1)}}^{(t+1)} + x_{d \cdot k_t}, 1/(c_d^{(1)} + 1)\right)$$

In certain embodiments, downward 1034 sampling of $\theta_{dk_t}^{(t)}$ for hierarchy levels $t^n$ 1032 to $t^1$ 1030 can once again be based upon the assertion that if m~NB(r, p) is represented under its compound Poisson 1022 representation, then the conditional posterior of l given m and r has PMF as follows:

$$Pr(l = j | m, r) = \frac{\Gamma(r)}{\Gamma(m+r)} |s(m, j)| r^j, \quad j = 0, 1, \ldots, m$$

where |s(m, j)| are unsigned Stirling numbers of the first kind. Accordingly, this conditional posterior can then be denoted as l~CRT(m, r), which once again can be generated via:

$l = \Sigma_{n=1}^m z_n, z_n \sim \text{Bernoulli}(r/(n-1+r))$

Using this approach, the conditional posterior for $\theta_{dk_t}^{(t)}$ can then likewise be derived once again as:

$$\theta_{dk_t}^{(t)} \bigg| \ldots \sim \text{Gam}\left(\sum_{k_{(t+1)}} \theta_{dk_{(t+1)}}^{(t+1)} \phi_{k_t k_{(t+1)}}^{(t+1)} + x_{d \cdot k_t}, 1/(c_d^{(1)} + 1)\right)$$

In various embodiments, downward 1034 sampling of $\varphi_{k_t}^{(t)}$ for hierarchy levels $t^n$ 1032 to $t^1$ 1030 can be based upon the assertion that if:

$x_w \sim \text{Pois}(m\beta_w) \forall w \in \{1, 2, \ldots, V\},$ and $\beta \sim \text{Dir}(\eta),$ then:

$\beta | \sim \text{Dir}(\eta_1 + x_1, \ldots, \eta_V + x_V),$ and accordingly:

$$\varphi_{k_t}^{(t)} \bigg| \ldots \sim \text{Dir}\left(\eta_1^{(t)} + x_{1k_t}^{(t)}, \ldots, \eta_{K_t}^{(t)} + x_{K_{(t-1)}k_t}^{(t)}\right), \forall 2 \leq t \leq T$$

In certain embodiments, downward 1034 sampling of $c_d^{(t)}$ for hierarchy levels $t^n$ 1032 to $t^1$ 1030 can be based upon the assertion that if:

$r_i \sim \text{Gam}(\alpha_i, 1/b) \forall i \in \{1, 2, \ldots, K\}, b \sim \text{Gam}(c, 1/d),$ then:

$b | \{r_i\} \sim \text{Gam}(\Sigma_{i=1}^K \alpha_i + c, 1/(\Sigma_{i=1}^K r_i + d)),$ and accordingly:

$$c_d^{(t)} \bigg| \ldots \sim \text{Gam}\left(e_0 + \sum_{k_t=1}^{K_t} \theta_{dk_{(t+1)}}^{(t+1)}, 1 / \left(f_0 + \sum_{k_t=1}^{K_t} \theta_{dk_t}^{(t)}\right)\right) \forall d, 1 \leq t < T$$

In various embodiments, other variables that may not be directly related to particular nodes within the augmented GBN 1000 may be sampled using various approaches. In one embodiment, when $B_{ud} > 0$, the variable $b_{udk,k_1}$ can be sampled as follows:

$$(b_{udk,k_1})_{kk_1} \bigg| \ldots \sim B_{ud} \text{Pois}_+\left(\sum_{k,k_1} \beta_{uk} \Lambda_{kk_1} \theta_{dk_1}^{(1)}\right)$$

In another embodiment, sampling of the variable $\beta_k$ can be based upon the assertion that if:

$$\lambda \sim \text{Gam}(r,1/c), x_i \sim \text{Poisson}(m_i\lambda),$$

then:

$$\lambda|\{x_i\} \sim \text{Gam}(r+\Sigma_i x_i, 1/(c+\Sigma_i m_i)),$$

and consequently:

$$\beta k^{-1}|\ldots \sim \text{Dir}(\zeta+b_{1\overline{k}\ldots},\zeta+b_{2\overline{k}\ldots},\ldots,\zeta+b_{U\overline{k}}\ldots)$$

In yet another embodiment, the variable $r_{k_T}$ can be sampled by first performing augmentation operations as follows:

$$ax_{dk_T}^{(T+1)}|\ldots \sim CRT(x_{dk_T}^{(T)}, r_{k_T})$$

and as before, based upon the assertion that if $m \sim NB(r, p)$ is represented under its compound Poisson 1022 representation, then the conditional posterior of l given m and r has PMF as follows:

$$Pr(l=j|m,r) = \frac{\Gamma(r)}{\Gamma(m+r)}|s(m,j)|r^j, \quad j=0,1,\ldots,m$$

where $|s(m, j)|$ are unsigned Stirling numbers of the first kind. Accordingly, this conditional posterior can then be denoted as $l \sim \text{CRT}(m, r)$, which once again can be generated via:

$$l = \Sigma_{n=1}^{m} z_n, z_n \sim \text{Bernoulli}(r/(n-1+r)),$$

thereby allowing $r_{k_T}$ to be sampled as follows:

$$r_{K_T}|\ldots \sim \text{Gam}\left(\gamma_0/K_T + \sum_d x_{dk_T}^{(T+1)}, 1\bigg/\left(c - \sum_d \log(1-p_d^{(T)})\right)\right)$$

In yet still another embodiment, the sampling of variable $\Lambda_{kk_1}$ can be based upon the assertion that if:

$$\lambda \sim \text{Gam}(r,1/c), x_i \sim \text{Poisson}(m_i\lambda),$$

then:

$$\lambda|\{x_i\} \sim \text{Gam}(r+\Sigma_i x_i, 1/(c+\Sigma_i m_i)),$$

thereby allowing the sampling of $A_{kk_1}$ to be performed as follows:

$$\Lambda_{kk_1}|\ldots \sim \text{Gam}((\rho_0/\overline{K}+b_{\ldots kk_1})/b_0 + \theta_{\ldots k_1}))$$

In one embodiment the variable $c_0$ can be sampled based upon the assertion that if:

$$r_i \sim \text{Gam}(\alpha_i, 1/b) \forall i \in \{1,2,\ldots,K\}, b \sim \text{Gam}(c,1/d),$$

then:

$$b|\{r_i\} \sim \text{Gam}(\Sigma_{i=1}^{K} a_i + c, 1/(\Sigma_{i=1}^{K} r_i + d),$$

thereby allowing $c_0$ to be sampled as:

$$c_0|\ldots \sim \text{Gam}\left(e_0 + \gamma_0, 1\bigg/\left(f_0 + \sum_{k_T=1}^{K_T} r_{k_T}\right)\right)$$

In another embodiment the variable $\gamma_0$ can be sampled by first performing augmentation operations as follows:

$$x_{k_T}^{(T+2)}|\ldots \sim CRT\left(\sum_d x_{dk_T}^{(T+1)}, \gamma_0/K_T\right)$$

and as before, based upon the assertion that if $m \sim NB(r, p)$ is represented under its compound Poisson 1014 representation, then the conditional posterior of l given m and r has PMF as follows:

$$Pr(l=j|m,r) = \frac{\Gamma(r)}{\Gamma(m+r)}|s(m,j)|r^j, \quad j=0,1,\ldots,m$$

where $|s(m, j)|$ are unsigned Stirling numbers of the first kind. Accordingly, this conditional posterior can then be denoted as $l \sim \text{CRT}(m, r)$, which once again can be generated via:

$$l = \Sigma_{n=1}^{m} z_n, z_n \sim \text{Bernoulli}(r/(n-1+r)),$$

thereby allowing $\gamma_0$ to be sampled as follows:

$$\gamma_0|\ldots \sim \text{Gam}\left(a_0 + \sum_{k_T} x_{k_T}^{(T+2)}, 1\bigg/\left(b_0 - \frac{1}{K_T}\sum_{k_T}\log(1-p_{k_T}^{(T+1)})\right)\right)$$

Those of skill in the art will recognize that many such embodiments and examples are possible. Accordingly, the foregoing is not intended to limit the spirit, scope or intent of the invention.

Figure 11:
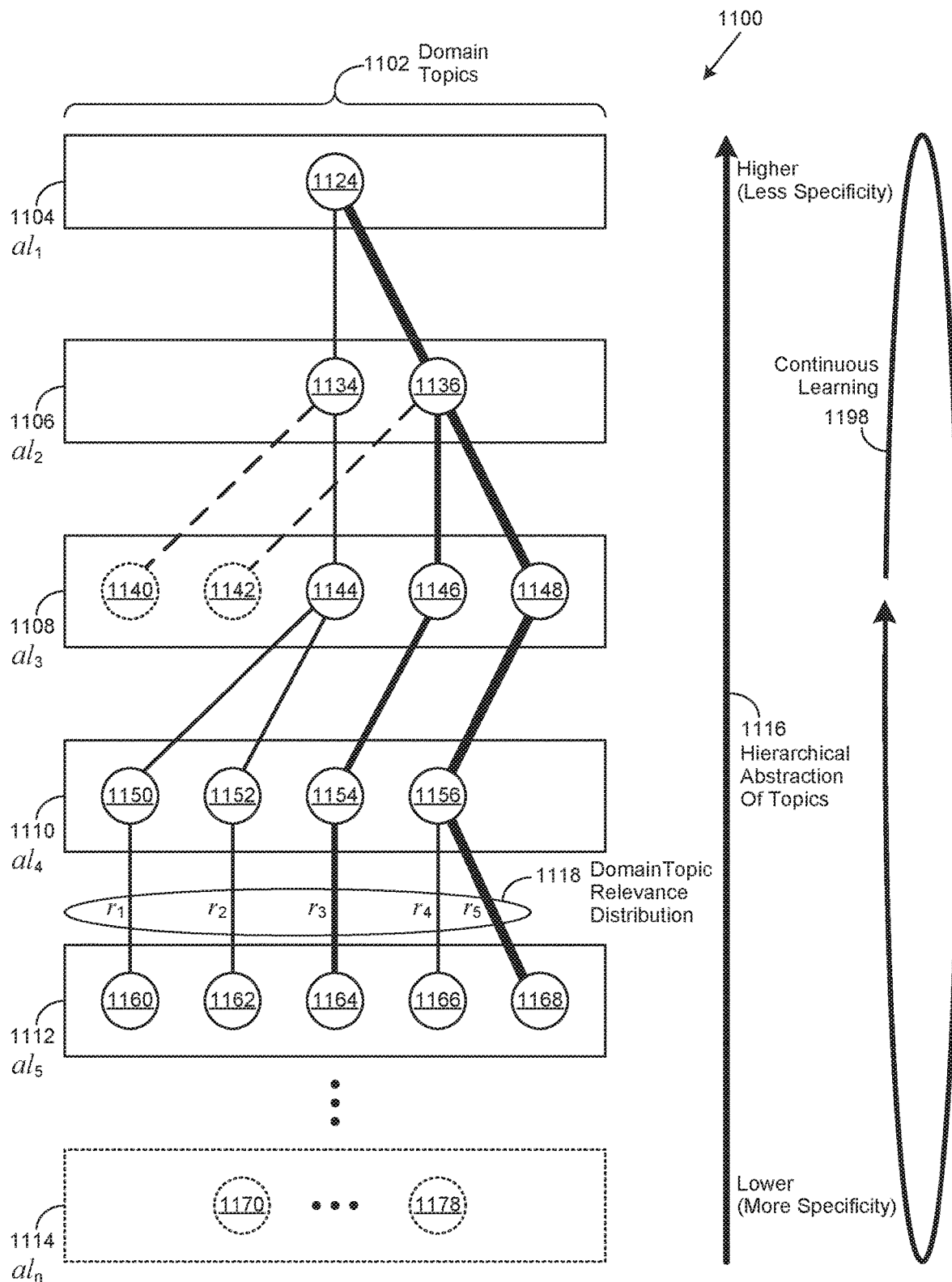
FIG. 11 is a simplified block diagram of the generation of a hierarchical abstraction of topics within a corpus.

FIG. 11 is a simplified block diagram of cognitive machine learning operations performed in accordance with an embodiment of the invention to generate a hierarchical abstraction of topics within a corpus. In various embodiments, a cognitive inference and learning system (CILS) utilizes a cognitive machine learning algorithm, as described in greater detail herein, to perform the cognitive machine learning operations. In certain embodiments, the cognitive machine learning algorithm may be implemented as a domain topic abstraction algorithm. In these embodiments, the hierarchical abstraction of topics 1116 is generated by applying the domain topic abstraction algorithm to a corpus of content associated with a particular domain of information.

In various embodiments, the hierarchical abstraction of topics 1116 is generated in the form of a hierarchical topic model 1100. In certain embodiments, the hierarchical topic model 1100 is implemented in the form of an abstraction hierarchy, described in greater detail herein. In various embodiments, the corpus of content may include a collection of documents, a text, an image, an audio recording, a video recording, streaming media (e.g., newsfeeds), a social media post, database elements, various kinds of metadata associated with the foregoing, or some combination thereof.

As used herein, a topic broadly refers to a statistical distribution of associated attributes. In certain embodiments, a topic may be a product, such as that found in a product catalog, and its associated attributes may be features of the product. In various embodiments, the topic may be a document in a corpus of content and its associated attributes may be the terms it contains. In certain embodiments, a topic may also broadly refer to something that is being discussed, or illustrated, within a given subset of a corpus, such as a phrase, an image, or a sound. In these embodiments, the difference between a topic and a grammatical subject is that a topic is used to describe the information structure of a clause and how it coheres with other clauses, whereas a subject is a grammatical category. Furthermore, both a topic and a grammatical subject are distinguished from an actor, or agent, which is the "doer" within a particular subset of a corpus. Moreover, while a topic is typically the subject, the agent may be omitted or follow the preposition "by" in English clauses with a verb in the passive voice.

As likewise used herein, an algorithm broadly refers to a predetermined set of rules for conducting computational steps that produce a computational effect. Likewise, as used herein, a programming model ("model") broadly refers to a framework for expressing algorithms, but is not an algorithm itself. For example, an algorithm may provide a predetermined set of rules, or computational operations, for carrying out the steps to produce an outcome. In contrast, a programming model does not describe how to carry out steps to solve an actual problem. Instead, it provides a framework for expressing algorithms to do so.

A topic model, as used herein, broadly refers to a statistical model implemented to discover abstract topics occurring within a corpus. Skilled practitioners of the art will be familiar with various topic modeling approaches, which are frequently used in text mining for discovering hidden or non-obvious semantic structures within a body of text. As an example, certain words in a document about a particular topic may occur more frequently than others. To continue the example, words such as "nuts" and "bolts" are more likely to occur in a document whose primary topic is related to threaded fasteners. Likewise, words such as "steel" and "aluminum" are more likely to occur in a document whose primary topic is related to the properties of certain metals. To further continue the example, a document is typically associated with various topics in different proportions. Consequently, a document that is 20% about the properties of certain metals and 80% about their use in fasteners would likely contain four times as many fastener-related words than metal-related words.

Accordingly, the resulting clusters, or nodes, of similar words in such models represent the various topics within a given document. In various embodiments, a topic model is implemented as a mathematical framework, and based upon the statistical distribution of words within each, not only discovers each topic in a document, but also their relative concentration and distribution. Topic models are also known to be referred to as probabilistic topic models, which broadly refer to statistic algorithms used for discovering latent semantic structures within an extensive body of text, such as a corpus of content.

As used herein, domain topic abstraction broadly refers to knowledge elements of an information domain organized in an abstraction hierarchy or taxonomy, where instances of knowledge elements in proximate classes are similar. As such, an abstraction hierarchy broadly refers to a grouping principle, whereby a hierarchy is adhered to with higher levels of abstraction placed near the top of the hierarchy and more specific concepts are placed lower down. Likewise, as used herein, a taxonomy broadly refers to a classification of things, knowledge elements, or concepts associated with a certain domain of information, as well as the principles underlying such a classification.

In various embodiments, a particular taxonomy may be implemented to support relationship schemes other than parent-child hierarchies, such as network structures. In certain embodiments, these network structures may include various cognitive graphs, described in greater detail herein. In these embodiments, one or more taxonomies may be implemented to include single children with multiple parents. As an example, "bolt" may appear within a network structure with parents that include "fasteners," "connectors," and so forth.

Skilled practitioners of the art will be aware that taxonomies are generally considered to be narrower than ontologies within the discipline of knowledge management, as ontologies typically apply to a larger variety of relation types. Those of skill in the art will likewise be aware that a hierarchical taxonomy, within the field of mathematics, is typically considered a tree structure of classifications for a given set of objects. As such, it is also commonly referred to as a containment hierarchy. At the top of such structures is a single classification, the root node, which applies to all objects below it. More particularly, subordinate tiers of nodes in the hierarchy contain progressively more detailed classifications associated with various subsets of a total set of classified objects. Accordingly, the classification of objects proceeds from being more general towards the top of the hierarchy to being more specific towards its lower levels.

As likewise used herein, a hierarchical topic model 1100 broadly refers to an algorithmic approach to discovering topics occurring within a corpus, determining their respective degree of abstraction, and structuring them accordingly into a hierarchy. In various embodiments, higher levels of abstraction for a particular topic are placed near the top of the hierarchy and more specific levels of abstraction are placed lower in the hierarchy. In certain embodiments, a topic's level of abstraction, and its associated placement within a hierarchy, is discovered automatically. In various embodiments, the resulting hierarchy is generated in a taxonomic form familiar to those of skill in the art.

Referring now to FIG. 11, a corpus of content is processed to identify a set of domain topics 1102, which in various embodiments are hierarchically abstracted 1116 into a hierarchical topic model 1100, described in greater detail herein. In these embodiments, domain topics 1102 that have a higher degree of abstraction, or less specificity, are hierarchically abstracted 1116 into the upper levels of the hierarchical topic model 1100. Likewise, domain topics having a lesser degree of abstraction, or more specificity, are hierarchically abstracted 1116 into lower levels. As an example, the domain topic 1124 in abstraction level $al_1$ 1104 in the hierarchical topic model 1100 has a higher degree of abstraction, or less specificity, than domain topics 1134 and 1136 in abstraction level $al_2$ 1106. Likewise, the domain topics 1150, 1152, 1154, and 1156 in abstraction level $al_4$ 1112 have a lower degree of abstraction, or more specificity, than domain topics 1140, 1142, 1144, 1146, and 1148 in abstraction level $al_3$ 1108. To continue the example, domain topics 1160, 1162, 1164, 1166, and 1168 in abstraction level $al_5$ 1112 have a higher degree of abstraction, or less specificity, than domain topics 1170 through 1178 in abstraction level $al_n$ 1114, and so forth.

In various embodiments, individual domain topics 1102 are automatically identified and hierarchically abstracted 1116 into a corresponding abstraction level, such as abstraction levels $al_1$ 1104, $al_2$ 1106, $al_3$ 1108, $al_4$ 1110, $al_5$ 1112, and $al_n$ 1114 shown in FIG. 11, according to their associated attributes. In one embodiment, attributes associated with a particular domain topic 1102 are in the form of data elements stored in a database, such as a relational database. In another embodiment, the attributes are in the form of knowledge elements stored in a knowledge repository, such as a cognitive graph. In yet another embodiment, the attributes are in the form of metadata. In yet still another embodiment, the attributes are derived from processing image, video or audio data. In one embodiment, the attributes are derived from social media data associated with a particular set of users. Skilled practitioners of the art will recognize that many such examples of domain topic 1102 attributes are possible. Accordingly, the foregoing is not intended to limit the spirit, scope or intent of the invention.

As an example, a manufacturer of industrial fasteners may have tens-of-thousands of individual products in their product line, each with various attributes such as length, diameter, width, thread characteristics, head type, grades and materials, mechanical properties, prices, and so forth. In this example, domain topics 1170 through 1178 in abstraction level $al_n$ 1114 may be the lowest level of abstraction within the hierarchical topic model 1100 that includes all products having attributes of both "screw" and "metal." To continue the example, the application of a domain topic abstraction algorithm, described in greater detail herein, to the domain topics 1170 through 1178 in abstraction level $al_n$ 1114 may result in the hierarchical abstraction of domain topics 1160, 1162, 1164, 1166, and 1168 into abstraction level $al_5$ 1112. In continuance of the example, domain topics 1160 and 1162 may respectively relate to wood screws and machine screws manufactured from brass. Likewise, domain topic 1164 may relate to stainless steel machine screws, while domain topics 1166 and 1168 may respectively relate to zinc-plated steel wood screws and machine screws.

In further continuance of the example, the domain topic abstraction algorithm may be applied to domain topics 1160, 1162, 1164, 1166, and 1168 in abstraction level $al_5$ 1112, resulting in the hierarchical abstraction of domain topics 1150, 1152, 1154, and 1156 into abstraction level $al_4$ 1110. To continue the example, domain topics 1150 and 1152 may respectively relate to brass wood screws and machine screws. Likewise, domain topic 1154 may relate to stainless steel machine screws, while domain topics 1156 may relate to zinc-plated steel screws of different types.

To continue the example, the domain topic abstraction algorithm may then be applied to domain topics 1150, 1152, 1154, and 1156 in abstraction level $al_4$ 1110, resulting in the hierarchical abstraction 1116 of domain topics 1144, 1146, and 1148 into abstraction level $al_3$ 1108. To continue the example further, domain topics 1144, 1146 and 1148 may respectively relate to screws of various types manufactured from brass, stainless steel, and zinc-plated steel. Likewise, domain topics 1140 and 1142 may respectively relate to various types of threaded fasteners manufactured from nylon and wood, which are abstracted from other domain topics 1102 not shown in FIG. 11.

To further continue the example, the domain topic abstraction algorithm may then be applied to domain topics 1140, 1142, 1144, 1146, and 1148 in abstraction level al 1108, resulting in the hierarchical abstraction of domain topics 1134 and 1136 in abstraction level $al_2$ 1106. In further continuance of the example, domain topics 1134 and 1136 in abstraction level $al_2$ 1106 may respectively relate to threaded fasteners manufactured from various types of brass and steel, whether zinc-plated steel or stainless steel. To continue the example even further, the domain topic abstraction algorithm may once again be applied to domain topics 1134 and 1136 in abstraction level $al_2$ 1106, which results in the hierarchical abstraction of domain topic 1124 in level all 1104. To complete the example, the domain topic 1124 in level $al_1$ 1104 may relate to threaded fasteners of various kinds, as opposed to various types of non-threaded fasteners, such as pop rivets and cotter pins.

In certain embodiments, domain topics are hierarchically abstracted 1116 from lower levels of the hierarchical topic model 1100 according to their domain topic relevance distribution 1118. As used herein, domain topic relevance distribution 1118 broadly refers to the statistical occurrence of a particular domain topic 1102 within a corpus of content. In various embodiments, the domain topic relevance distribution 1118 for a particular domain topic 1102 associated with a particular abstraction level, such as $al_1$ 1104, $al_2$ 1106, $al_3$ 1108, $al_4$ 1110, $al_5$ 1112, and $al_n$ 1114, is assigned a corresponding domain topic relevance distribution 1118 value, such as $r_1$, $r_2$, $r_3$, $r_4$, and $r_5$.

For example, domain topics 1168 and 1166 may share a common attribute, such as both being related to screws manufactured from zinc-plated steel, yet they may have certain distinct attributes, such as respectively being related to wood screws and machine screws. Likewise, the statistical occurrence of domain topic 1168 is higher than that of domain topic 1166. Accordingly, as depicted in FIG. 11, the domain topic relevance distribution 1118 value $r_5$ assigned to domain topic 1168 is higher than the domain topic relevance distribution 1118 value $r_4$ assigned to domain topic 1166. In one embodiment, the domain topic relevance distribution 1118 values associated with any given abstraction level are normalized to sum to a value of 1.0. As an example, the domain topic relevance distribution 1118 values respectively associated with domain topics 1160, 1162, 1164, 1166 and 1198 in abstraction level $al_5$ 1112 may be 0.1, 0.1. 0.3, 0.1 and 0.4.

In various embodiments, continuous learning operations 1198 are performed by iteratively applying a domain topic abstraction algorithm to a corpus of content. In certain embodiments, the continuous learning operations 1198 are performed through the use of upwards-downwards Gibbs sampling, described in greater detail herein. In various embodiments, the hierarchical topic model 1100 is implemented as an augmented Gamma Belief Network (GBN), likewise described in greater detail herein. In these embodiments, the number of iterations used when applying the domain abstraction level is a matter of design choice.

In certain embodiments, user input is processed to determine the number of abstraction levels, and the number of domain topics 1102 each contains. In these embodiments, the number of abstraction levels, and the number of domain topics 1102 each contains, is a matter of design choice. Those of skill in the art will recognize that many such embodiments and examples are possible. Accordingly, the foregoing is not intended to limit the spirit, scope or intent of the invention.

Figure 12:
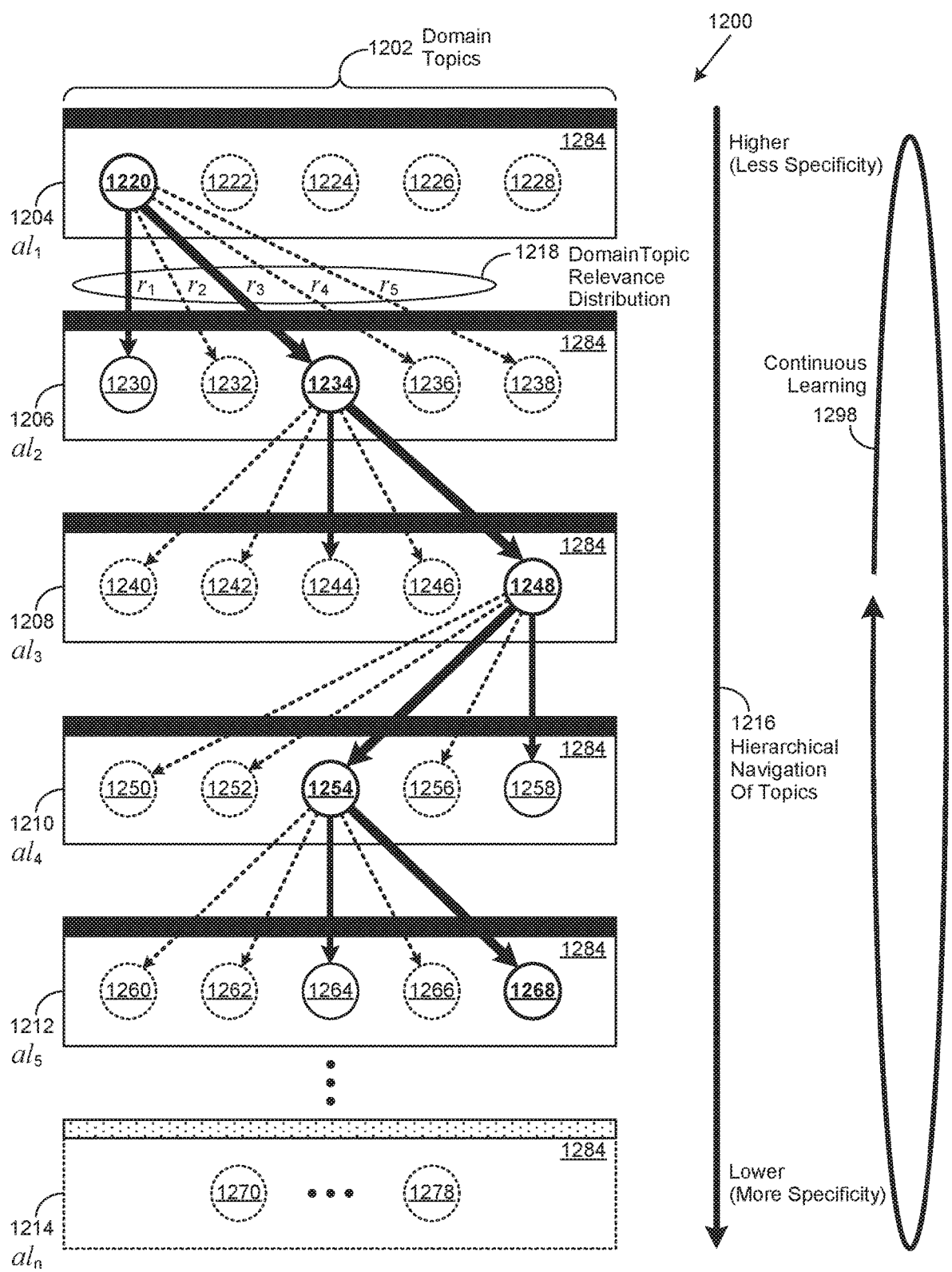
FIG. 12 is a simplified block diagram of the navigation of a hierarchical abstraction of topics within a corpus.

FIG. 12 is a simplified block diagram of cognitive machine learning operations performed in accordance with an embodiment of the invention to navigate a hierarchical abstraction of topics within a corpus. In various embodiments, a cognitive inference and learning system (CILS) utilizes a cognitive machine learning algorithm, as described in greater detail herein, to perform cognitive machine learning operations. In certain embodiments, the cognitive machine learning algorithm may be implemented as a hierarchical topic navigation algorithm.

In various embodiments, the hierarchical abstraction of topics is implemented in the form of a hierarchical topic model 1200, described in greater detail herein. In certain embodiments, the hierarchical topic model is implemented in the form of an abstraction hierarchy, likewise described in greater detail herein. In various embodiments, the corpus of content may include a collection of documents, a text, an image, an audio recording, a video recording, streaming media (e.g., newsfeeds), a social media post, database elements, various kinds of metadata associated with the foregoing, or some combination thereof.

In these embodiments, the hierarchical topic navigation algorithm is implemented to assist various classes of users, or user types, to hierarchically navigate 1216 a particular hierarchical topic model 1200. In one embodiment, the user type is associated with a cognitive persona, described in greater detail herein. In another embodiment, the user is uniquely associated with a cognitive profile, also referred to as "a profile of one," likewise described in greater detail herein. In these embodiments, the method by which an individual user is determined to be associated with a given cognitive persona or cognitive profile, and by extension, a particular hierarchical topic model 1200, is a matter of design choice.

Referring now to FIG. 12, a hierarchical topic model 1200 is processed to identify a set of domain topics 1202 associated with the highest abstraction level associated with a particular domain of information. In various embodiments, the domain of information is determined by processing a user query. In certain embodiments, the resulting set of domain topics 1202 associated with the identified highest abstraction level is presented to a user within a window 1284 of a user interface (UI).

To extend a prior example, a user may want to peruse a large corpus of industrial fasteners to identify the most applicable fastener for a particular need. However, they are not sure which type of type of fastener is best suited for their needs. In this example, the user first submits a query related to industrial fasteners to a CILS. In response, domain topics 1220, 1222, 1224, 1226, and 1226 in abstraction level $al_1$ 1204, which may be the highest level of abstraction for industrial fasteners within the hierarchical topic model 1200, are displayed within the UI window 1284. In continuance of this example, domain topics 1220, 1222, 1224, 1226, and 1228 may respectively relate to threaded fasteners (e.g., screws), non-threaded fasteners (e.g., rivets), conformant fasteners (e.g., cam locks), clips (e.g., retaining rings), and clamps (e.g., hose clamp). To further continue this example, the user may select domain topic 1220, related to threaded fasteners, through the use of a user gesture familiar to those of skill in the art within the UI window 1284.

As a result, the user's selection of domain topic 1220 is used by a hierarchical topic navigation algorithm to determine the next lowest abstraction level for threaded fasteners in the hierarchical topic model 1200. To continue this example, domain topics 1230, 1232, 1234, 1236, and 1238 in abstraction level $al_2$ 1206, which may be the next lowest abstraction level in the hierarchical topic model 1200 that relates to threaded fasteners, are displayed within the UI window 1284. In further continuance of this example, domain topics 1230, 1232, 1234, 1236, and 1238 may respectively relate to bolts, threaded rods, screws, nuts, and threaded anchors of various kinds. To continue this example, the user may select domain topic 1234, related to screws, within the UI window 1284.

Accordingly, the user's selection of domain topic 1234 is likewise used by the hierarchical topic navigation algorithm to determine the next lowest abstraction level in the hierarchical topic model 1200, and its associated domain topics 1202. In continuance of this example, domain topics 1240, 1242, 1244, 1246, and 1248 in abstraction level $al_3$ 1208, which may be the next lowest abstraction level in the hierarchical topic model 1200 that relates to screws, are displayed within the UI window 1284. In further continuance of this example, domain topics 1240, 1242, 1244, 1246, and 1248 may respectively relate to bolts, threaded rods, screws, nuts, and machine screws. To continue this example, the user may likewise select domain topic 1248, related to machine screws, within the UI window 1284.

As before, the user's selection of domain topic 1248 is then used by the hierarchical topic navigation algorithm to determine the next lowest abstraction level of the hierarchical topic model 1200, and its associated domain topics 1202. To further continue this example, domain topics 1250, 1252, 1254, 1256, and 1258 in abstraction level $al_4$ 1210, which may be the next lowest abstraction level in the hierarchical topic model 1200 that relates to machine screws, are displayed within the UI window 1284. In further continuance of this example, domain topics 1250, 1252, 1254, 1256, and 1258 may respectively relate to machine screws made from brass, zinc-plated steel, stainless steel, hardened steel, and nylon. In this example, the user may then select domain topic 1254, related to machine screws made from stainless steel, within the UI window 1284.

Once again, the user's selection of domain topic 1254 is used by the hierarchical topic navigation algorithm to determine the next lowest abstraction level of the hierarchical topic model 1200, and its associated domain topics 1202. To continue this example, domain topics 1260, 1262, 1264, 1266, and 1268 in abstraction level $al_5$ 1212, which may be the next lowest abstraction level in the hierarchical topic model 1200 that relates to machine screws made from stainless steel, are displayed within the UI window 1284. To further continue this example, domain topics 1260, 1262, 1264, 1266, and 1268 may respectively relate to round head, oval head, pan head, truss head, and flat head stainless steel machine screws. To continue this example further, the user may select domain topic 1268, related to flat head stainless steel machine screws, within the UI window 1284.

Accordingly, the user's selection of domain topic 1268 is once again used by the hierarchical topic navigation algorithm to determine the next lowest abstraction level of the hierarchical topic model 1200, and its associated domain topics 1202. To complete this example, domain topics 1270 through 1278 in abstraction level $al_6$ 1214, which may be the next lowest abstraction level in the hierarchical topic model 1200 that relates to flat head machine screws made from stainless steel, are displayed within the UI window 1284. The process is then repeated until the user has navigated 1216 the hierarchical topic model 1200 to the abstraction level that contains domain topics 1202 with sufficient specificity to satisfy their needs.

In various embodiments, the number of abstraction levels, and the number of domain topics 1202 each contains, is determined by the domain topic relevance distribution 1218 value, such as $r_1$, $r_2$, $r_3$, $r_4$, and $r_5$, associated with each domain topic 1202 within a particular abstraction level. In these embodiments, the domain topic relevance distribution 1218 value that qualifies a particular domain topic 1002 for inclusion within a particular abstraction level is a matter of design choice. In certain embodiments, the number of abstraction levels, and the number of domain topics 1202 each contains, is user-defined. In various embodiments, the number of domain topics 1202 a user may select within a UI window 1284 likewise user-defined. In these embodiments, the number of abstraction layers, or the number of domain topics 1202 each contains, is a matter of design choice.

In various embodiments, domain topics 1202 are iterative presented to a user in a gamified context as the hierarchical topic model 1200 is navigated. As an example, the user may receive points for each selection they make. In this example, the points may be redeemed if the user makes a purchase. As another example, interesting facts or trivia associated with a given domain topic 1202 may be provided to the user as the result of the user making a selection. In these embodiments, the method of gamifying the domain topic 1202 selection process, and the method by which the hierarchical topic model 1200 is navigated, is a matter of design choice. Skilled practitioners of the art will recognize that many such embodiments and examples related to gamification of the domain topic 1202 selection process, and the navigation of the hierarchical topic model 1200, are possible. Accordingly, the foregoing is not intended to limit the spirit, scope or intent of the invention.

In various embodiments, the user's selection of a particular domain topic 1220 in a given level of abstraction within the hierarchical topic model 1200 generates training data. In certain embodiments, the training data is then used as input to a domain topic abstraction algorithm, described in greater detail herein, to generate alternative versions of the hierarchical topic model 1200. In various embodiments, the alternative versions of the hierarchical topic model 1200 are then associated with an individual user or classes of users for subsequent use. As described in greater detail herein, the individual user may be represented by a cognitive persona or a cognitive profile, likewise described in greater detail herein. In certain of these embodiments, the alternative version of the hierarchical topic model is associated with the cognitive persona or a cognitive profile. In various embodiments, continuous learning operations 1298 are performed by iteratively providing training data to the domain topic abstraction algorithm. In these embodiments, the method by which the alternative version of the hierarchical topic model 1200 is associated with the cognitive persona or a cognitive profile, and the method by which the training data is provided to the domain abstraction algorithm, is a matter of design choice.

As an example, a user may be identified as being associated with a certain class of user. Accordingly, the user is presented a particular hierarchical topic model 1200 typically associated with that class of user. As a result, the user may have successively selected domain topics 1220, 1234, 1248, 1254 and 1268, which respectively correspond to threaded fasteners, screws, machine screws, stainless steel machine screws, and flat head stainless steel machine screws. However, the user may have decided thereafter to not navigate 1216 the hierarchical topic model 1200 to any lower abstraction level. Instead, the user navigates 1216 back up to abstraction level al₄ 1210, where domain topic 1252, which relates to zinc-plated machine screws, is selected. Additional training data is generated as a result of the selection, which in turn is provided to the hierarchical topic navigation algorithm for processing.

Accordingly, domain topics in a different abstraction level (not shown) are presented to the user. In this example, the domain topics may relate to round head, oval head, pan head, truss head, and flat head zinc-plated steel machine screws. In turn, the user may select the domain topic related to flat head zinc-plated machine screws, only to navigate 1216 once again to abstraction level al₄ 1210. Once there, the user may select domain topic 1250, which relates to brass machine screws. As before, additional training data is generated as a result of the user's selection and is provided to the domain topic abstraction algorithm for processing. Those of skill in the art will recognize that many such embodiments and examples are possible. Accordingly, the foregoing is not intended to limit the spirit, scope or intent of the invention.

Figure 13:
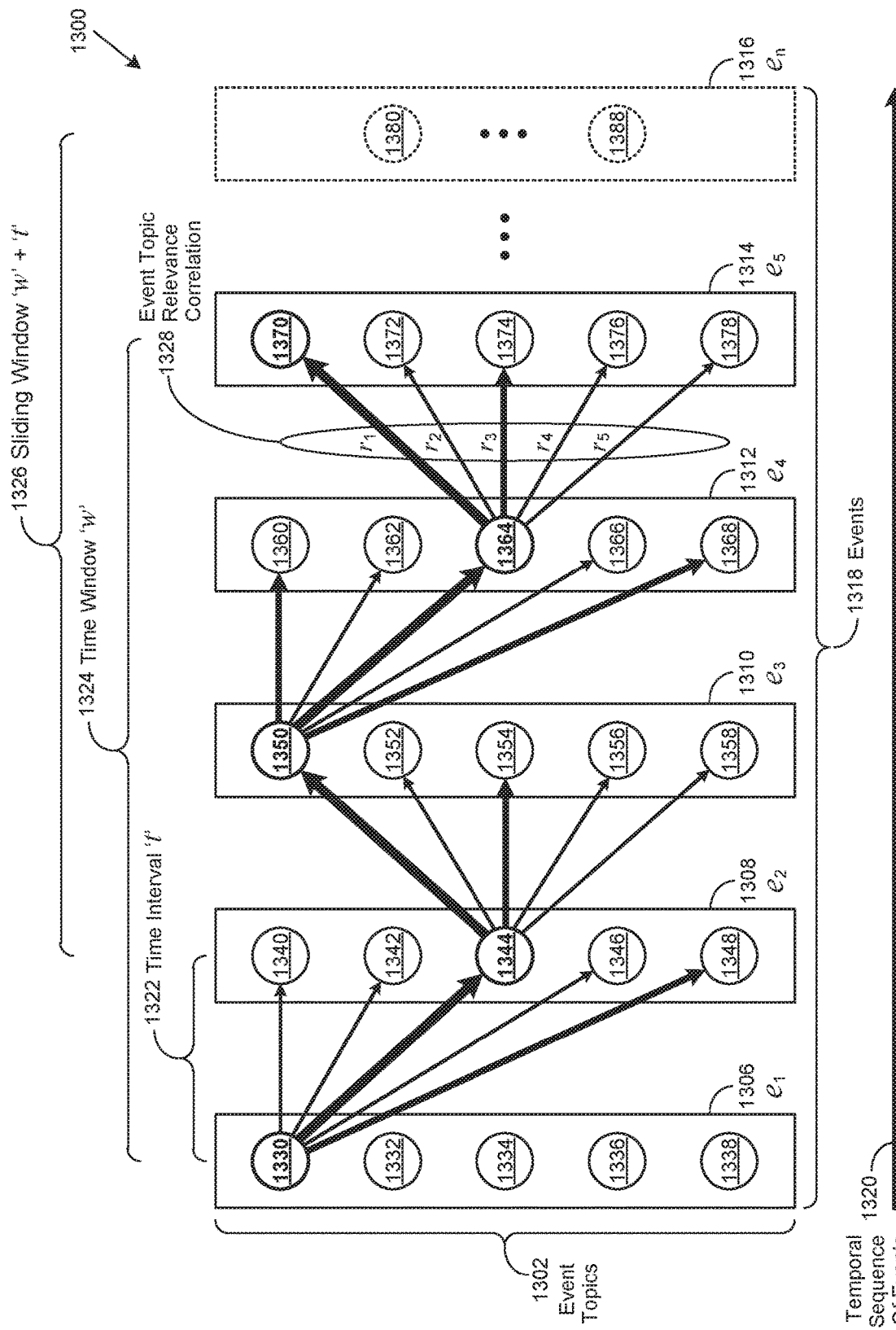
FIG. 13 is a simplified block diagram of cognitive machine learning operations to determine the prevalence of various terms within a corpus of content during a temporal sequence of events.

FIG. 13 is a simplified block diagram of cognitive machine learning operations performed in accordance with an embodiment of the invention to determine the prevalence of various terms within a corpus of content at certain intervals during a temporal sequence of events. In various embodiments, a cognitive inference and learning system (CILS) utilizes a cognitive machine learning algorithm, as described in greater detail herein, to perform the cognitive machine learning operations. In certain embodiments, the cognitive machine learning algorithm may be implemented as a temporal topic discovery algorithm. In various embodiments, the prevalence of various terms during a temporal sequence is determined by iteratively applying the temporal topic discovery algorithm at certain intervals to a corpus of content associated with a particular domain of information. In these embodiments, the corpus of content may include a collection of documents, a text, an image, an audio recording, a video recording, streaming media (e.g., newsfeeds), a social media post, database elements, various kinds of metadata associated with the foregoing, or some combination thereof.

As used herein, a term, as it relates to machine learning operations, broadly refers to a semantic unit within a corpus of content. In certain embodiments, a term may be a word, an image, a phoneme, a data element, or various kinds of metadata associated with any of the foregoing. In various embodiments, a term within a corpus of content may be associated with one or more topics, described in greater detail herein. As an example, the corpus may contain the terms "diesel," "tank," "fuel," "stored," "armored," and "vehicle." Dependent upon the respective prevalence of these terms within the corpus, the primary topic may be "diesel fuel storage" or "diesel-powered armored vehicles."

To continue the example, the corpus may contain a sentence such as, "Diesel fuel, which is commonly used to power a large vehicle, may be stored in an armored storage tank for safety reasons." Likewise, the corpus instead may also contain a sentence such as, "An armored vehicle, such as a tank, is typically powered by an engine that burns diesel fuel, which is generally stored in the vehicle's main fuel tank." In this example, the topic of the first sentence is related to "diesel fuel storage," while the topic of the second sentence is related to "diesel-powered armored vehicles."

To further continue the example, both topics may be associated with the same prevalence of the terms "diesel" and "fuel." However, the topic "diesel fuel storage" may be associated with a higher prevalence of the terms "tank" and "stored." Likewise, the topic "diesel-powered armored vehicles" may be associated with a higher prevalence of the terms "armored" and "vehicle." Furthermore, the overall prevalence of the terms "tank" and "stored" within the corpus may be greater than the prevalence of the terms "armored" and "vehicle." Accordingly, "diesel fuel storage" would be the preeminent topic within the corpus.

In various embodiments, the topics may include event topics 1302. As used herein, an event topic 1302 broadly refers to a topic associated with a particular event 1318, such as events $e_1$ 1306, $e_2$ 1308, $e_3$ 1310, $e_4$ 1312, $e_5$ 1314 through $e_n$ 1316 in the temporal sequence of events 1320 shown in FIG. 13. As likewise used herein, a temporal sequence of events 1320 broadly refers to a chronological sequence of events 1318 occurring at a certain time intervals 't' 1322. In various embodiments, the time intervals 't' 1322 occur within a defined period of time, such as a time window 'w' 1324. An event 1318, as used herein, broadly refers to an occurrence of a particular point in time. Likewise, a time window, as used herein, broadly refers to a period of time defined by a first event 1318 and a second event 1318. For example, as shown in FIG. 13, a time window 'w' 1324 may be defined by a first event $e_1$ 1306 and a second event $e_5$ 1314, separated by time intervals 't' 1322.

In certain embodiments, a time window 'w' 1324 is implemented to iteratively advance at time interval 't' 1322 to provide a sliding window 'w'+'t' 1326 within a temporal sequence of events 1320. For example, the time window 'w' 1324 shown in FIG. 13 may include events $e_1$ 1306 through $e_5$ 1314, which may be iterated by time interval 't' 1322 to include event topics $e_2$ 1308 through $e_n$ 1316. In this example, the event topics 1302 associated with event $e_1$ 1306 are no longer included in the temporal sequence of events 1320 upon the execution of sliding window 'w'+'t' 1326, but the event topics 1302 associated with event topics $e_n$ 1316 are.

In various embodiments, the prevalence of various terms within a corpus of content at certain intervals during a temporal sequence of events 1320 is generated in the form of a temporal topic model 1300. Likewise, as used herein, a temporal topic model 1300 broadly refers to a topic model extended to accommodate various temporal aspects, such as two or more events 1318. As an example, the preeminence of various topics within a temporal topic model 1300, and their respective correlation to one another, may change over time, such as topics related to the activities of one political candidate or another during the course of their respective campaigns.

In certain embodiments, a corpus of content is iteratively processed at time interval t 1322 during a temporal sequence of events 13200 to identify the relative preeminence of event topics 1302 associated with various events 1318. For example, as shown in FIG. 13, event $e_1$ 1306 includes event topics 1330, 1332, 1334, 1336 and 1338, while event $e_2$ 1308 includes event topics 1340, 1342, 1344, 1346 and 1348. Likewise, event $e_3$ 1310 includes event topics 1350, 1352, 1354, 1356 and 1358, while event $e_4$ 1312 includes event topics 1360, 1362, 1364, 1366 and 1368. As likewise shown in FIG. 13, event $e_5$ 1314 includes event topics 1370, 1372, 1374, 1376 and 1378, while event $e_n$ 1316 includes event topics 1380 through 1388.

In these embodiments, the relative preeminence of one event topic 1302 to another is determined by the relative prevalence of their associated terms within the corpus of content at that particular event 1318 in the temporal sequence of events 1320. As an example, event topic 1330 at event $e_1$ 1306 is preeminent to event topics 1332, 1334, 1336 and 1338. Likewise, event topic 1334 at event $e_2$ 1306 is preeminent to event topic 1348, which in turn is preeminent to event topics 1340, 1342 and 1346. To continue the example, event topic 1350 at event $e_3$ 1310 is preeminent to event topic 1354, which in turn is preeminent to event topics 1352, 1356 and 1358. Likewise, event topic 1354 at event $e_4$ 1312 is preeminent to event topics 1360 and 1368, both of which are preeminent to event topics 1362 and 1366. To further continue the example, event topic 1370 at event $e_5$ 1314 is preeminent to event topic 1374, which in turn is preeminent to event topics 1372, 1376 and 1378, continuing on to event topics 1380 through 1399 at event $e_n$ 1316.

In various embodiments, the number of event topics 1302 associated with each event 1318 is determined according to their event topic relevance correlation 1328. As used herein, event topic relevance correlation 1328 broadly refers to the statistical correlation of a particular event topic 1302 to other event topics 1302 within a corpus of content at the time of a particular event 1318 in a temporal sequence of events 1320. In certain embodiments, the event topic relevance correlation 1328 for a particular event topic 1302 associated with a particular event, such as $e_1$ 1306, $e_2$ 1308, $e_3$ 1310, $e_4$ 1312, $e_5$ 1314 through $e_n$ 1316, is assigned a corresponding event topic relevance correlation 1328 value, such as $r_1$, $r_2$, $r_3$, $r_4$, and $r_5$. In certain of these embodiments, the event topic relevance correlation 1328 for various event topics 1302 associated with a corresponding event 1318 is automatically determined by iteratively applying a temporal topic discovery algorithm at certain time intervals t 1322 to a corpus of content.

For example, event topics 1360 and 1364 at event $e_4$ 1312 may be respectively associated with the topics "diesel fuel storage" and "diesel-powered armored vehicles." Likewise, event topics 1370 and 1374 at event $e_5$ 1314 may also be respectively associated with the topics "diesel fuel storage" and "diesel-powered armored vehicles." In this example, event topics 1360, 1364, 1370, and 1374 may all share a set of common terms, such as "diesel," and "fuel," which respectively have an equivalent prevalence in a corpus of content at the time of event $e_4$ 1312 and $e_5$ 1314. However, event topic 1360 may have a lesser prevalence of the terms "tank" and "stored" compared to the prevalence of terms "armored" and "vehicle," which may be associated with event topic 1376. Likewise, event topic 1370 may have a greater prevalence of the terms "tank" and "stored" compared to the prevalence of the terms "armored" and "vehicle," which may be associated with event topic 1374.

Accordingly, the event topic relevance correlation value $r_1$ assigned to event topic 1370 would be higher than the event topic relevance correlation value $r_3$ assigned to event topic 1372. Consequently, at event $e_5$ 1314, the topic "diesel fuel storage," associated with event topic 1370 would have a greater event topic relevance correlation than the topic "diesel-powered armored vehicles" associated with event topic 1374. As a result, the event topic "diesel fuel storage," which was not preeminent at event $e_4$ 1312, becomes the preeminent event topic at event $e_5$ 1314. In these embodiments, the event topic relevance correlation 1328 value that qualifies a particular domain topic 1302 for association with a particular event 1318 is a matter of design choice. Skilled practitioners of the art will recognize that many such embodiments and examples are possible. Accordingly, the foregoing is not intended to limit the spirit, scope or intent of the invention.

Figure 14:
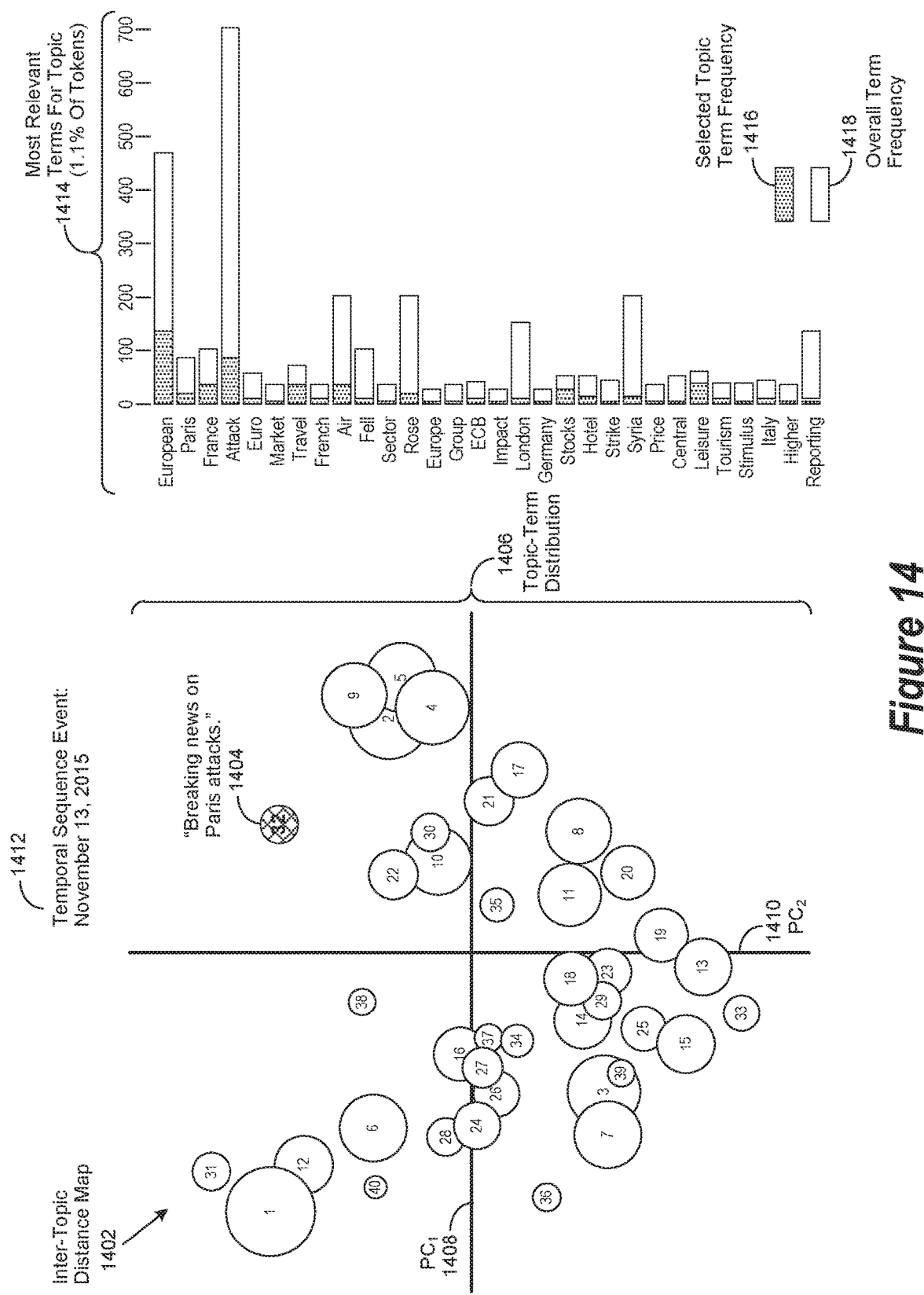
FIG. 14 is an inter-topic distance map depicting the distribution of terms associated with a particular topic on a first date in a temporal sequence.

FIG. 14 is an inter-topic distance map depicting the distribution of terms associated with a particular topic at a first event in a temporal sequence implemented in accordance with an embodiment of the invention. In this embodiment, a corpus of content includes news articles associated with a first temporal sequence event 1412 that occurred on Nov. 13, 2015, which was the date of a terrorist attack in Paris, France. As described in greater detail herein, the corpus of content is first processed to identify the most frequently used terms it contains. The identified terms are then processed to identify related domain topics, which are then ranked according to their preeminence within the corpus.

Once ranked, the domain topics are then graphically plotted on an inter-topic distance map 1402 according to the variability of their respective topic-term distribution 1406. As shown in FIG. 14, the inter-topic distance map includes two axes, $PC_1$ 1408 and $PC_2$ 1410. In this embodiment, the $PC_1$ 1408 axis depicts domain topics that have the most variability while the $PC_2$ 1410 axis depicts domain topics that have the second-most variability. Accordingly, the placement of a domain topic's graphical representation on the inter-topic distance map 1402 provides a visual indication of the respective variability of a given domain topic. As likewise shown in FIG. 14, the relative ranking of each domain topic is depicted according to the size of its respective graphical representation.

In this embodiment, the selection of a graphical representation of a domain topic results in a graphical presentation of the most relevant terms 1414 for the selected topic. Likewise, as shown in FIG. 14, the term frequency for the selected topic 1416 and for the corpus overall 1418 are graphically depicted for the selected domain topic. For example, selection of the graphical representation 1404 for the domain topic "Breaking news on Paris attacks." is depicted as being the $32^{nd}$ least preeminent topic within the corpus at the time of the temporal sequence event 1412. However, one of its related terms, "attack," has the highest term frequency for the corpus overall 1518

Figure 15:
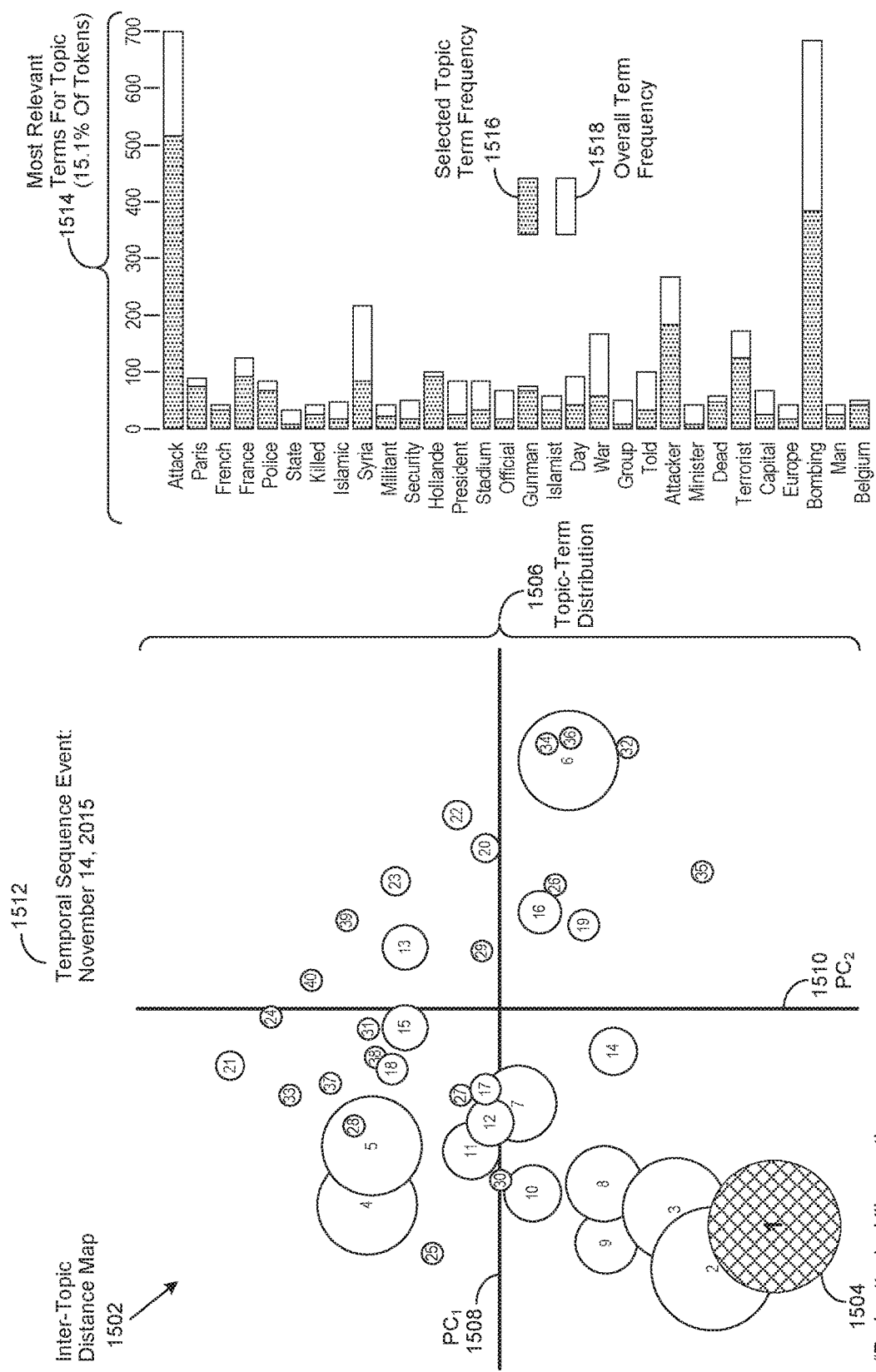
FIG. 15 is an inter-topic distance map depicting the distribution of terms associated with a particular topic on a second date in a temporal sequence.

FIG. 15 is an inter-topic distance map depicting the distribution of terms associated with a particular topic at a second event in a temporal sequence implemented in accordance with an embodiment of the invention. In this embodiment, a corpus of content includes news articles associated with a second temporal sequence event 1512 that occurred on Nov. 14, 2015, which was the day after a terrorist attack in Paris, France. As before, the corpus of content is first processed to identify the most frequently used terms it contains. The identified terms are then processed to identify related domain topics, which are then ranked according to their current preeminence within the corpus.

Once ranked, the domain topics are then graphically plotted on an inter-topic distance map 1502 according to their respective topic-term distribution 1506. As shown in FIG. 15, the inter-topic distance map includes two axes, $PC_1$ 1508 and $PC_2$ 1510. In this embodiment, the $PC_1$ 1508 axis depicts domain topics that have the most variability while the $PC_2$ 1510 axis depicts domain topics that have the second-most variability. Accordingly, the placement of a domain topic's graphical representation on the inter-topic distance map 1502 provides a visual indication of the respective variability of a given domain topic. As likewise shown in FIG. 15, the relative ranking of each domain topic is depicted according to the size of its respective graphical representation.

In this embodiment, the selection of a graphical representation of a domain topic results in a graphical presentation of the most relevant terms 1514 for the selected topic. Likewise, as shown in FIG. 15, the term frequency for the selected topic 1516 and for the corpus overall 1518 are graphically depicted for the selected domain topic. For example, selection of the graphical representation 1504 for the domain topic "Paris attacks kill more than 100 in seemingly coordinated terror strike." is depicted as being the most preeminent topic within the corpus at the time of the second temporal sequence event 1512. Consequently, one of its related terms, "attack," has the highest term frequency for both the selected topic 1516 and for the corpus overall 1518, followed only by the term "bombing."

Figure 16:
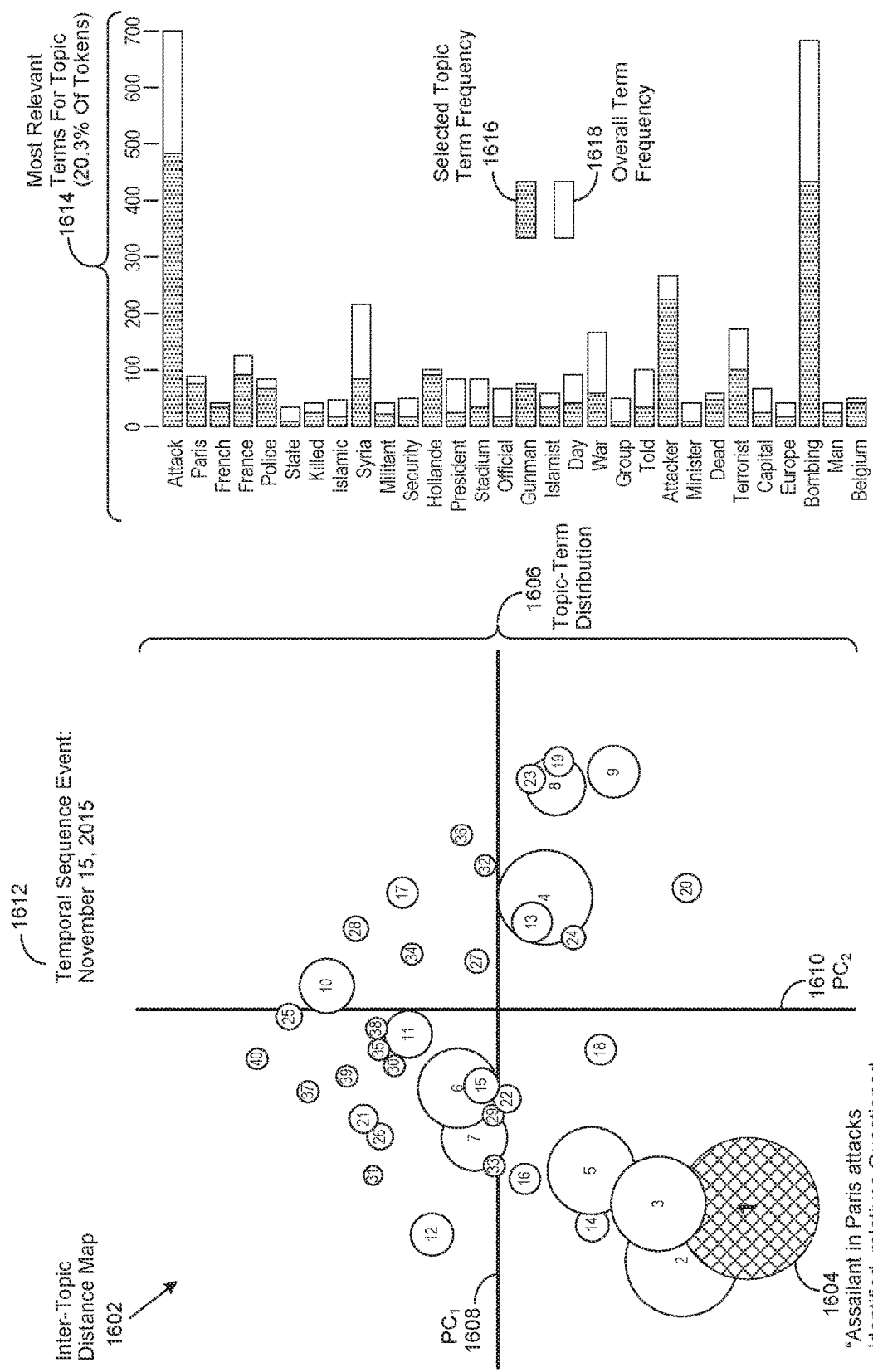
FIG. 16 is an inter-topic distance map depicting the distribution of terms associated with a particular topic on a third date in a temporal sequence.

FIG. 16 is an inter-topic distance map depicting the distribution of terms associated with a particular topic at a third event in a temporal sequence implemented in accordance with an embodiment of the invention. In this embodiment, a corpus of content includes news articles associated with a third temporal sequence event 1612 that occurred on Nov. 15, 2015, which was the second day after a terrorist attack in Paris, France. As before, the corpus of content is first processed to identify the most frequently used terms it contains. The identified terms are then processed to identify related domain topics, which are then ranked according to their current preeminence within the corpus.

Once ranked, the domain topics are then graphically plotted on an inter-topic distance map 1602 according to their respective topic-term distribution 1606. As shown in FIG. 16, the inter-topic distance map includes two axes, $PC_1$ 1608 and $PC_2$ 1610. In this embodiment, the $PC_1$ 1608 axis depicts domain topics that have the most variability while the $PC_2$ 1610 axis depicts domain topics that have the second-most variability. Accordingly, the placement of a domain topic's graphical representation on the inter-topic distance map 1602 provides a visual indication of the respective variability of a given domain topic. As likewise shown in FIG. 16, the relative ranking of each domain topic is depicted according to the size of its respective graphical representation.

In this embodiment, the selection of a graphical representation of a domain topic results in a graphical presentation of the most relevant terms 1614 for the selected topic. Likewise, as shown in FIG. 16, the term frequency for the selected topic 1616 and for the corpus overall 1618 are graphically depicted for the selected domain topic. For example, selection of the graphical representation 1604 for the domain topic "Assailant in Paris attacks identified, relatives questioned. Paris attack probe spreads: manhunt in Belgium." is depicted as being the most preeminent topic within the corpus at the time of the third temporal sequence event 1612. Consequently, one of its related terms, "attack," has the highest term frequency for both the selected topic 1516 and for the corpus overall 1518, followed only by the term "bombing."

Figure 17:
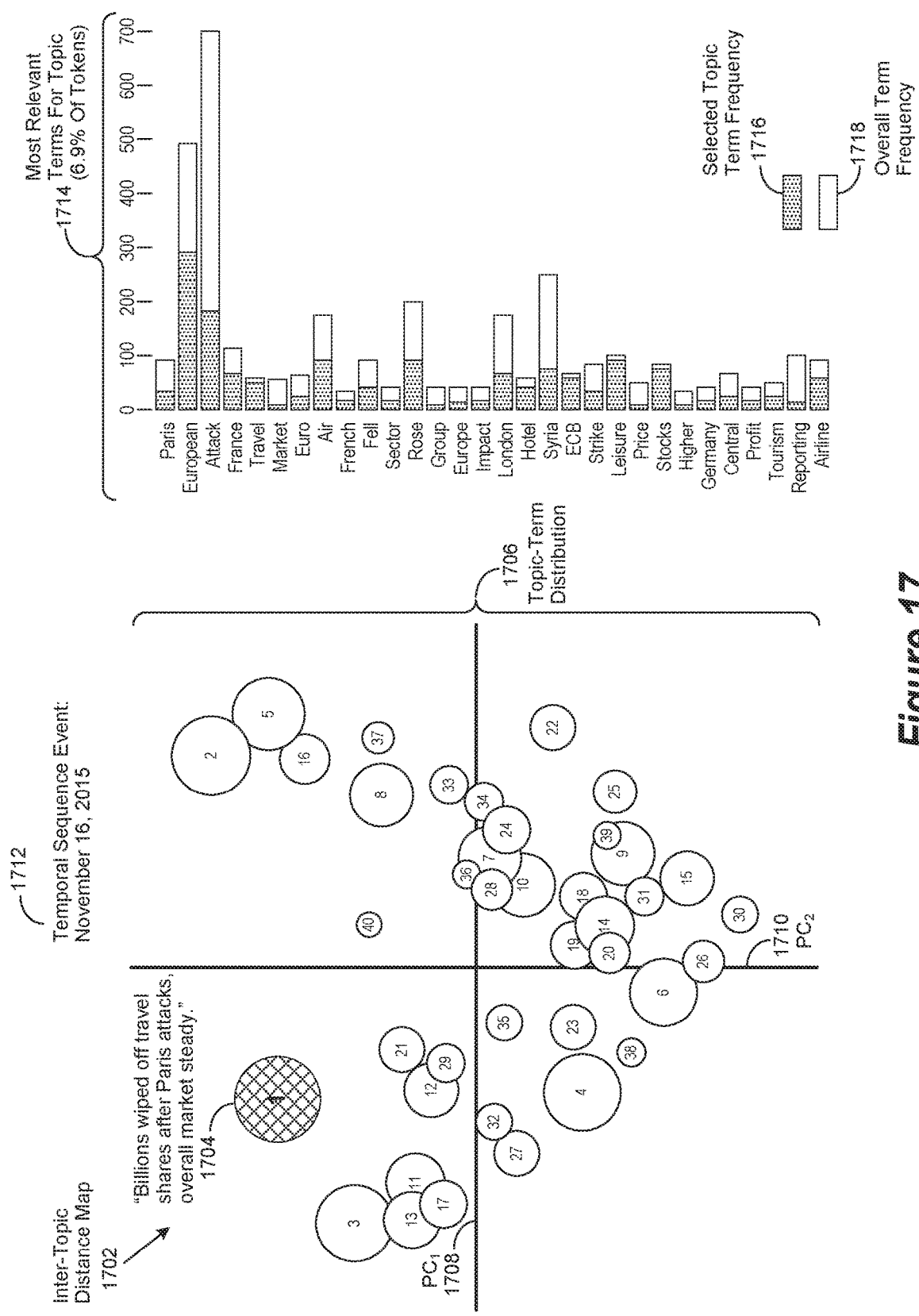
FIG. 17 is an inter-topic distance map depicting the distribution of terms associated with a particular topic on a fourth date in a temporal sequence.

FIG. 17 is an inter-topic distance map depicting the distribution of terms associated with a particular topic at a fourth event in a temporal sequence implemented in accordance with an embodiment of the invention. In this embodiment, a corpus of content includes news articles associated with a fourth temporal sequence event 1712 that occurred on Nov. 16, 2015, which was the third day after a terrorist attack in Paris, France. As before, the corpus of content is first processed to identify the most frequently used terms it contains. The identified terms are then processed to identify related domain topics, which are then ranked according to their current preeminence within the corpus.

Once ranked, the domain topics are then graphically plotted on an inter-topic distance map 1702 according to their respective topic-term distribution 1706. As shown in FIG. 17, the inter-topic distance map includes two axes, $PC_1$ 1708 and $PC_2$ 1710. In this embodiment, the $PC_1$ 1708 axis depicts domain topics that have the most variability while the $PC_2$ 1710 axis depicts domain topics that have the second-most variability. Accordingly, the placement of a domain topic's graphical representation on the inter-topic distance map 1702 provides a visual indication of the respective variability of a given domain topic. As likewise shown in FIG. 17, the relative ranking of each domain topic is depicted according to the size of its respective graphical representation.

In this embodiment, the selection of a graphical representation of a domain topic results in a graphical presentation of the most relevant terms 1714 for the selected topic. Likewise, as shown in FIG. 17, the term frequency for the selected topic 1716 and for the corpus overall 1718 are graphically depicted for the selected domain topic. For example, selection of the graphical representation 1704 for the domain topic "Billions wiped off travel shares after Paris attacks, overall market steady." is depicted as being the most preeminent topic within the corpus at the time of the fourth temporal sequence event 1712. Consequently, one of its related terms, "attack," has the second highest term frequency for the selected topic 1516 and the highest for the corpus overall 1718. However, now the term "European" has the highest term frequency for the selected topic 1716 and the second highest for the corpus overall 1718.

Figure 18:
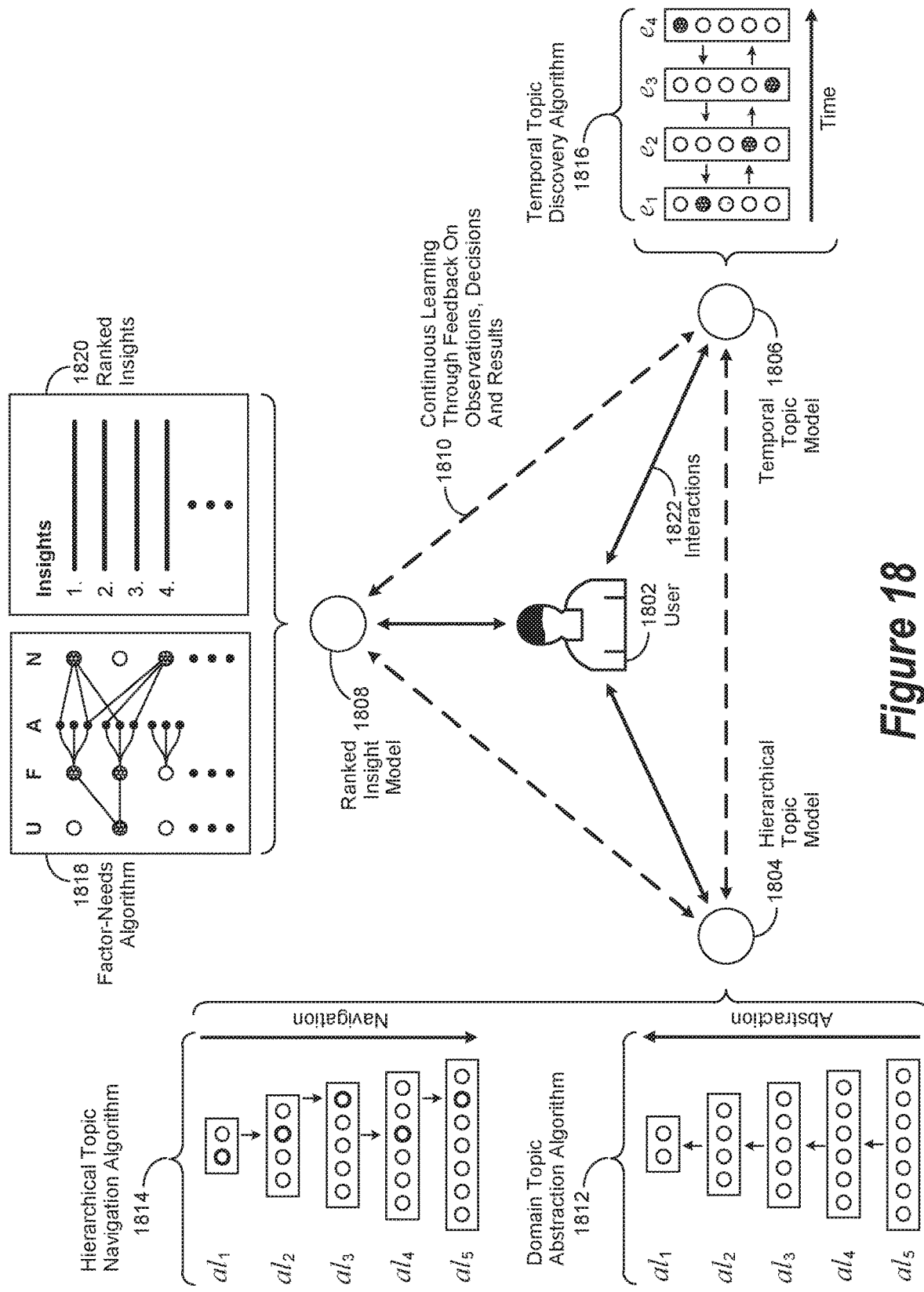
FIG. 18 is a simplified block diagram of the performance of continuous cognitive machine learning operations.

FIG. 18 is a simplified block diagram of the performance of continuous cognitive machine learning operations implemented in accordance with an embodiment of the invention. In various embodiments, a cognitive inference and learning system (CILS) is implemented to utilize a hierarchical topical 1804 model, a temporal topic 1806 model, and a ranked insight 1808 model, or some combination thereof, to perform continuous cognitive machine learning 1810 operations.

In these embodiments, feedback on observations 416, decisions 418, and results 420, described in greater detail in the descriptive text associated with FIG. 4, is used in the performance of the continuous cognitive machine learning 1810 operations. In certain embodiments, the hierarchical topical 1804 model, a temporal topic 1806 model, and a ranked insight 1808 model, or some combination thereof, are implemented to exchange data amongst themselves to perform the continuous cognitive machine learning 1810 operations. In various embodiments, the hierarchical topical 1804 model, a temporal topic 1806 model, and a ranked insight 1808 model, or some combination thereof, are implemented to interact with one another to perform the continuous cognitive machine learning 1810 operations. In certain embodiments, the continuous cognitive machine learning 1810 operations are performed to generate ranked cognitive insights 1820, likewise described in greater detail herein.

In various embodiments, the hierarchical topical 1804 model is implemented through the utilization of a domain topic abstraction 1812 algorithm and a hierarchical topic navigation 1814 algorithm. In certain embodiments, the temporal topic 1806 model is implemented through the utilization of a temporal topic discovery algorithm 1816. In various embodiments, the ranked insight 1804 model is implemented through the utilization of a factor-needs 1818 algorithm configured to perform ranking/re-ranking operations. In certain embodiments, the factor-needs algorithm 1818 is implemented to provide ranked insights 1820 to a user 1802 resulting from the performance of such ranking/re-ranking operations. In various embodiments, these algorithms may be used in various combinations to perform the continuous cognitive machine learning 1810 operations. The method by which these algorithms are used in combination is a matter of design choice. Skilled practitioners of the art will recognize that many such embodiments are possible. Accordingly, the foregoing is not intended to limit the spirit, scope or intent of the invention.

In various embodiments, a factor-needs 1820 algorithm is implemented to generate a needs graph model. In certain embodiments, the needs graph model utilizes a matrix approach to map various users 'U' 1802 to particular factors 'F', each of which have certain attributes 'A'. In turn, various attributes 'A' of each factor 'F' are mapped to certain needs 'N'. In various embodiments, an individual user 'U' 1802 may be mapped to one or more factors 'F'. Likewise, one or more attributes 'A' of a particular factor 'F' may be mapped to one or more needs 'N'.

As used in the context of a factor-needs 1818 algorithm, a factor broadly refers to an element of a corpus of content that has one or more associated attributes. As an example, a factor may be an item in a product catalog. As another example, a factor may be a document or other content element within a corpus of content, as described in greater detail herein. As yet another example, a factor may be a service offered by a service provider. As likewise used in the context of a factor-needs 1818 algorithm, an attribute broadly refers to a description, a parameter, a limitation, a quality, or a consideration associated with a factor. As an example, an item in a product catalog may have certain attributes describing its color, weight, price, uses, and other characteristics. As another example, a topic within a corpus of content may have certain attributes that are characterized by its associated terms. As yet another example, a service offered by a service provider may have attributes describing its capabilities, availability, reliability, and so forth.

As likewise used in the context of the factor-needs 1818 algorithm, a need broadly refers to a requirement, desire or objective associated with a user 1802. As an example, a user 1802 may have a requirement for accommodations with disability access in a particular city on a particular date. As another example, a user 1802 may have a desire to attend a certain type of musical performance. As yet another example, a user 1802 may have an objective of completing a series of tests to be granted certification in a particular skill. Those of skill in the art will recognize that many such examples of factors, attributes and needs are possible. Accordingly, the foregoing is not intended to limit the spirit, scope or intent of the invention.

In various embodiments, the hierarchical topic navigation 1814 algorithm is implemented to generate training data. In certain embodiments, the training data is used by the factor-needs algorithm 1818 algorithm to rank, or re-rank, various cognitive insights, which are provided to the user 1802 in the form of ranked insights 1820. In one embodiment, the training data is used by the factor-needs algorithm 1810 to generate a new cognitive persona, which is then associated with the user 1802 or a class of users 1802. In another embodiment, the training data is used by the factor-needs algorithm 1810 to revise an existing cognitive persona associated with the user 1802 or a class of users 1802. In yet another embodiment, the training data is used by the factor-needs algorithm 1810 to generate a new cognitive profile for the user 1802. In yet still another embodiment, the training data is used by the factor-needs algorithm to revise an existing cognitive profile associated with the user 1802.

In various embodiments, the training data may include feedback from observations, decisions, results, or some combination thereof. In certain embodiments, this feedback may be generated by various interactions 1822 between a user 1802 and a CILS. In one embodiment, the feedback may be generated as a result of a user 1802 submitting a query to a CILS. In another embodiment, the feedback may be generated by the provision of external input data, such as a social media post or a streaming media feed. In yet another embodiment, the feedback may be generated by the user 1802 navigating a hierarchical topic 1804 model, as described in greater detail herein. In certain embodiments, the factor-needs 1818 algorithm is implemented as an online training algorithm.

In various embodiments, continuous cognitive machine learning 1810 operations are initiated by a CILS receiving user 1802 input. In certain embodiments, the user 1802 input may include a query, other input related to a user 1802, or some combination thereof. As an example, user-related input may include information related to the user's 1802 location. In this example, a determination is then made whether a relevant cognitive persona or cognitive profile, described in greater detail herein, is available for the user 1802. If so, then it is retrieved and then processed for use as additional user 1802 input. The resulting user 1802 input is then processed to determine whether a relevant hierarchical topic

1804 model, or temporal topic 1806 model, or a combination of the two, are available. If a relevant temporal topic model 1806 is available, then the factor-needs 1818 algorithm is used to process it and the user input to determine relevant events and their associated event topics, described in greater detail herein.

A determination is then made whether a relevant hierarchical topic 1804 model is available. If not, then the previously-determined relevant event topics are processed by the factor-needs 1818 algorithm to generate a ranked list 1820 of event topics insights. If a relevant hierarchical topic 1804 model was not available, then the ranked list 1820 of event topic insights is provided to the user 1802. Otherwise, the user 1802 input, the ranked list 1820 of event topic insights, and a relevant hierarchical topic 1804 model are processed with the factor-needs 1818 algorithm to determine the highest relevant level of abstraction, and its associated domain topics, within the hierarchical topic 1804 model.

However, if it was determined that a relevant temporal topic 1816 model was not available, or that a relevant hierarchical topic 1804 model was, then user 1802 input and the hierarchical topic 1804 model is processed with the factor-needs 1818 algorithm to determine the highest relevant abstraction level, and its associated domain topics, within the hierarchical topic 1804 model. The resulting highest relevant abstraction level, and its associated domain topics, is then provided to the user 1802. A determination is then made whether the user 1802 has selected one or more of the provided domain topics through an interaction 1822. If so, then the user's domain topic selection(s) is processed to generate cognitive machine learning training data.

The needs-factor 1818 algorithm is then used to process the resulting cognitive machine learning training data, user 1802 input, ranked event topics (if previously generated), and the hierarchical topic 1804 model, to determine the next lowest relevant level of abstraction, and its associated domain topics, within the hierarchical topic 1804 model. A determination is then made whether the lowest level of abstraction within the hierarchical topic 1804 model has been reached. If not, the next lowest level of abstraction within the hierarchical topic 1804 model, and its associated domain topics, is provided to the user 1802.

A determination is then made whether the user 1802 has selected one or more of the provided domain topics through an interaction 1822. If so, then the user's domain topic selection(s) is processed to generate cognitive machine learning training data. The needs-factor 1818 algorithm is then used to process the resulting cognitive machine learning training data, user 1802 input, ranked event topics (if previously generated), and the hierarchical topic 1804 model, to determine the next lowest relevant level of abstraction, and its associated domain topics, within the hierarchical topic 1804 model. The process is then continued until the lowest level of abstraction in the hierarchical topic 1804 domain model is reached.

Once the lowest level of abstraction in the hierarchical topic 1804 model has been reached, then the factor-needs 1810 algorithm is used to rank the domain topics associated with the lowest level of abstraction within the hierarchical topic 1804 model. Thereafter, or if it was determined that the user 1802 has not selected one or more domain topics, then the previously ranked domain topics, or the originally-provided domain topics, are provided to the user as ranked insight 1820.

As an example, patients may need to visit a distant hospital for an extended period of time to receive a repetitive or time-consuming treatment, such as chemotherapy. As a result, they may likewise have a need to find local restaurants that can accommodate their clinical conditions, dietary requirements, personal preferences, and so forth. In this example, such needs are addressed through the use of a needs graph model, in which both the restaurants and the patients are described in terms of certain sets of needs. To continue the example, the needs associated with to a given restaurant may correspond to certain of its characteristics, such as the kind and quality of cuisine they serve, price points for a typical meal, and their distance relative to a patient's location. Likewise, the same set of needs may also describe a patient who prefers certain types of cuisines, highly-rated or high-quality restaurants, or venues that are nearby.

One challenge of such an approach is the requirement to pre-curate various needs by domain experts. Another is the lack of user 1802 interactions 1822 to provide information necessary to validate these assumptions. In continuance of the example, a pre-curated need for a particular type of cuisine based upon the patient's gender, race, ethnicity, and clinical condition may have little correlation to the kind of foods or restaurants they may actually prefer. Likewise, a restaurant might gain popularity for a special type of food not listed in the menu, or the quality of service from the attendants. Consequently, it may be advantageous to refine the concept of various needs, or augment the need vocabulary with additional needs, such that the needs graph model can gradually evolve over time based upon interactions 1822 with various users 1802.

To continue the example, a hospital may have a large corpus of content related to short-term housing, transportation, grocery stores, restaurants, places of worship, cleaning services of various kinds, financial institutions, entertainment events, recreation venues, social services, and so forth. In this example, the corpus of content is abstracted into various hierarchical topic models 1804, which in turn are associated with various classes of users 1802. A new patient, or user 1802, then interacts 1822 with a CILS to provide input related to their various needs to a ranked insight model 1808. In turn, a factor-needs algorithm 1818 is used to process the user 1802 input to determine the most relevant hierarchical topic model 1804, which is then provided to the user 1802.

The user 1802 then navigates the hierarchical topic model 1804, as described in greater detail herein, to gain access to various domain topics. In various embodiments, the user's 1802 interaction 1822 with the hierarchical topic model 1804 is provided to the ranked insight model 1808, where it is used as training data. In certain embodiments, the training data is in turn processed by the factor-needs algorithm 1818 to generate a list of ranked insights 1820, which is then provided to the user 1802.

To further continue the example, the user 1802 may be interested in medical advances related to a particular affliction or disease. As a result, the user 1802 interacts 1822 with a CILS to provide input related to their various needs to a ranked insight model 1808. In turn, the factor-needs algorithm 1818 processes the user 1802 input to determine the most relevant temporal topic model 1806, which is then provided to the user 1802.

The user 1802 then navigates the temporal topic model 1806, as described in greater detail herein, to gain access to various temporal topics. In various embodiments, the user's 1802 interaction 1822 with the temporal topic model 1806 is provided to the ranked insight model 1808, where it is used as training data. In certain embodiments, the training data is in turn processed by the factor-needs algorithm 1818 to generate a list of ranked insights 1820 related to the user's 1802 interest in a particular affliction or disease, which is then provided to the user 1802.

The process continues, with the user 1802 interacting 1822 with the ranked insight model 1808, the hierarchical topic model 1804, and the temporal topic model 1806 to iteratively receive a list of ranked insights 1820. In various embodiments, the process is iteratively repeated to achieve continuous learning through feedback on observations, decisions and results 1810, as described in greater detail herein. Skilled practitioners of the art will recognize that many such embodiments and examples are possible. Accordingly, the foregoing is not intended to limit the spirit, scope or intent of the invention.

Figure 19A:
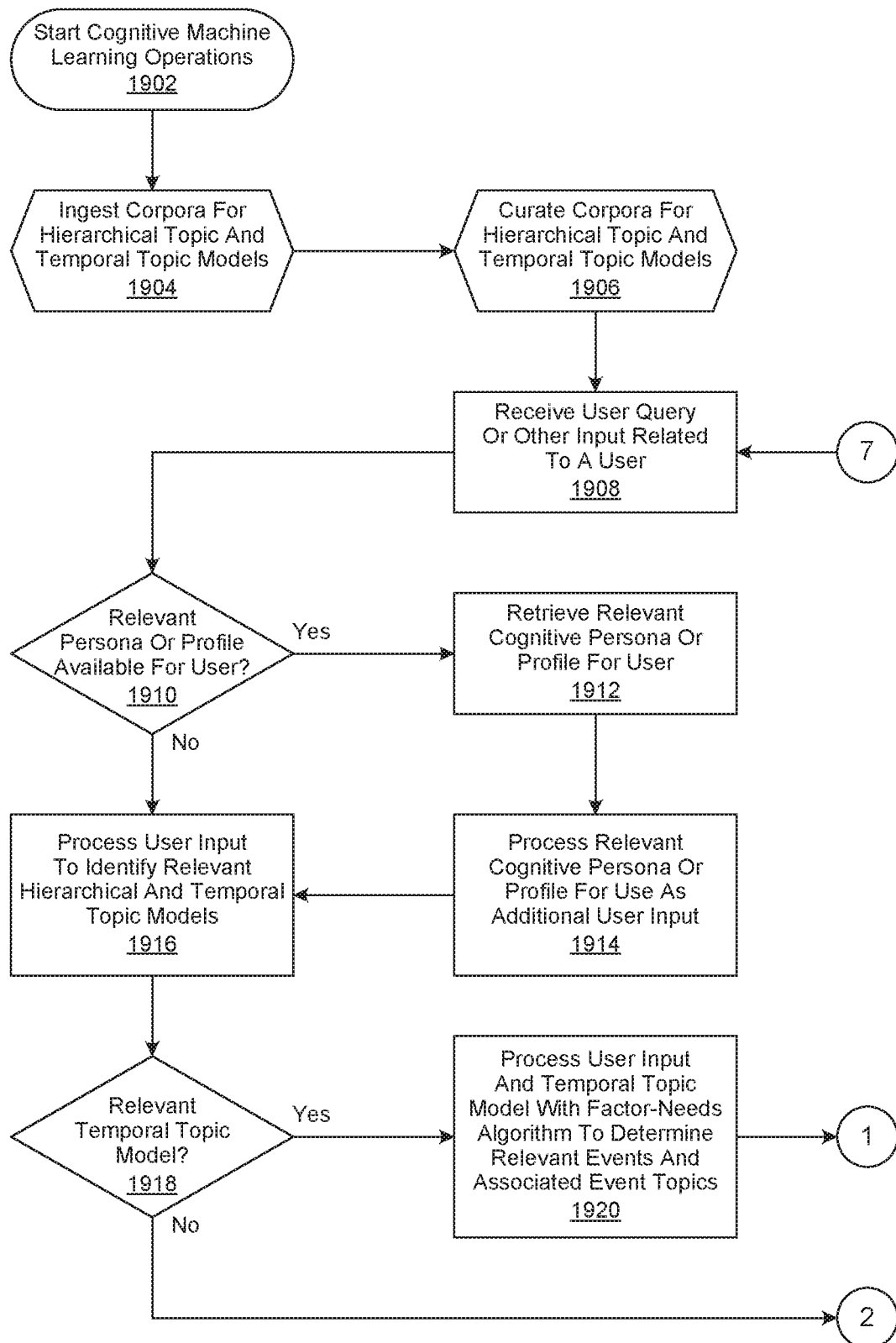
FIGS. 19a through 19c are a generalized flowchart of the performance of continuous cognitive machine learning operations.
Figure 19B:
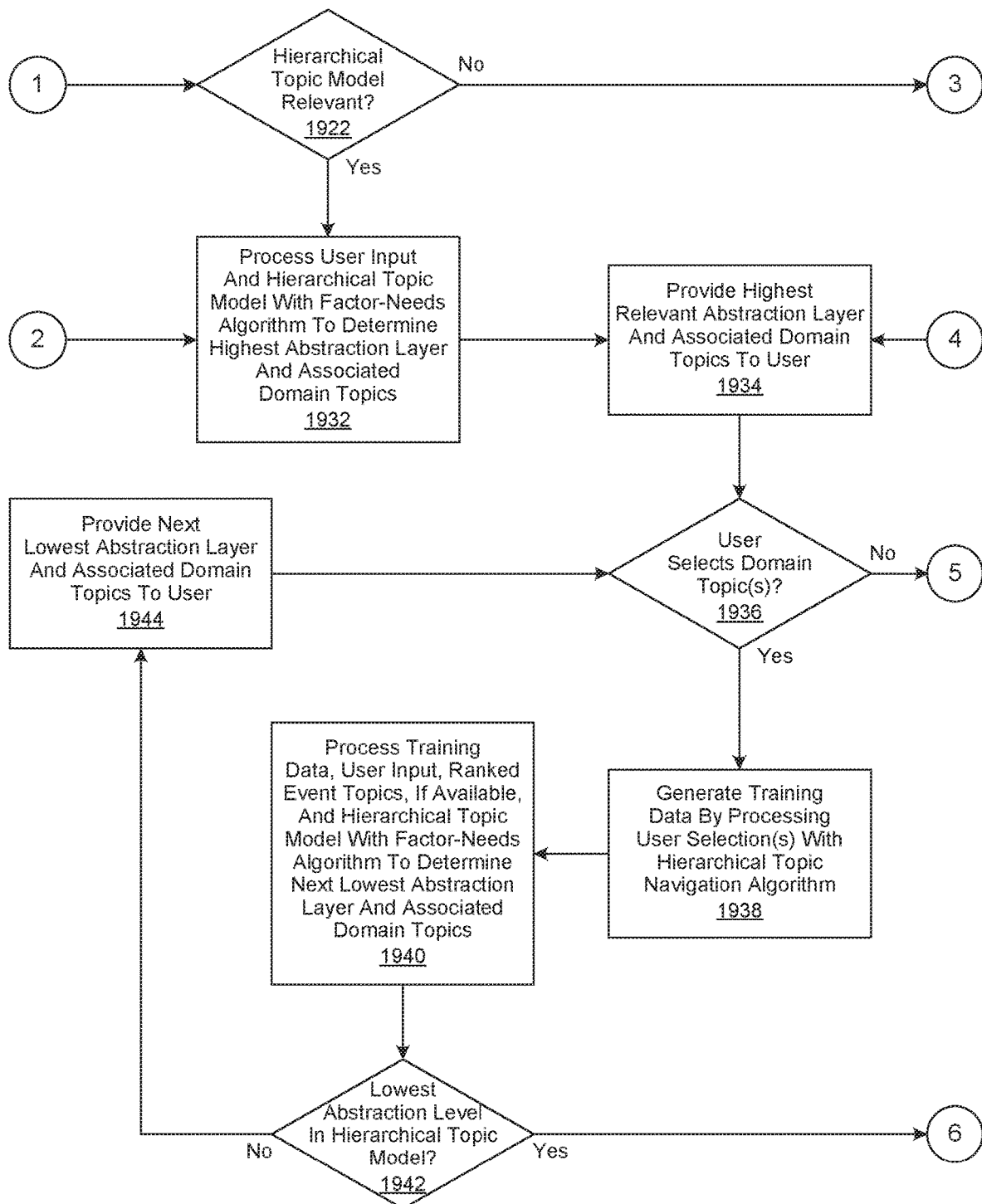
Figure 19C:
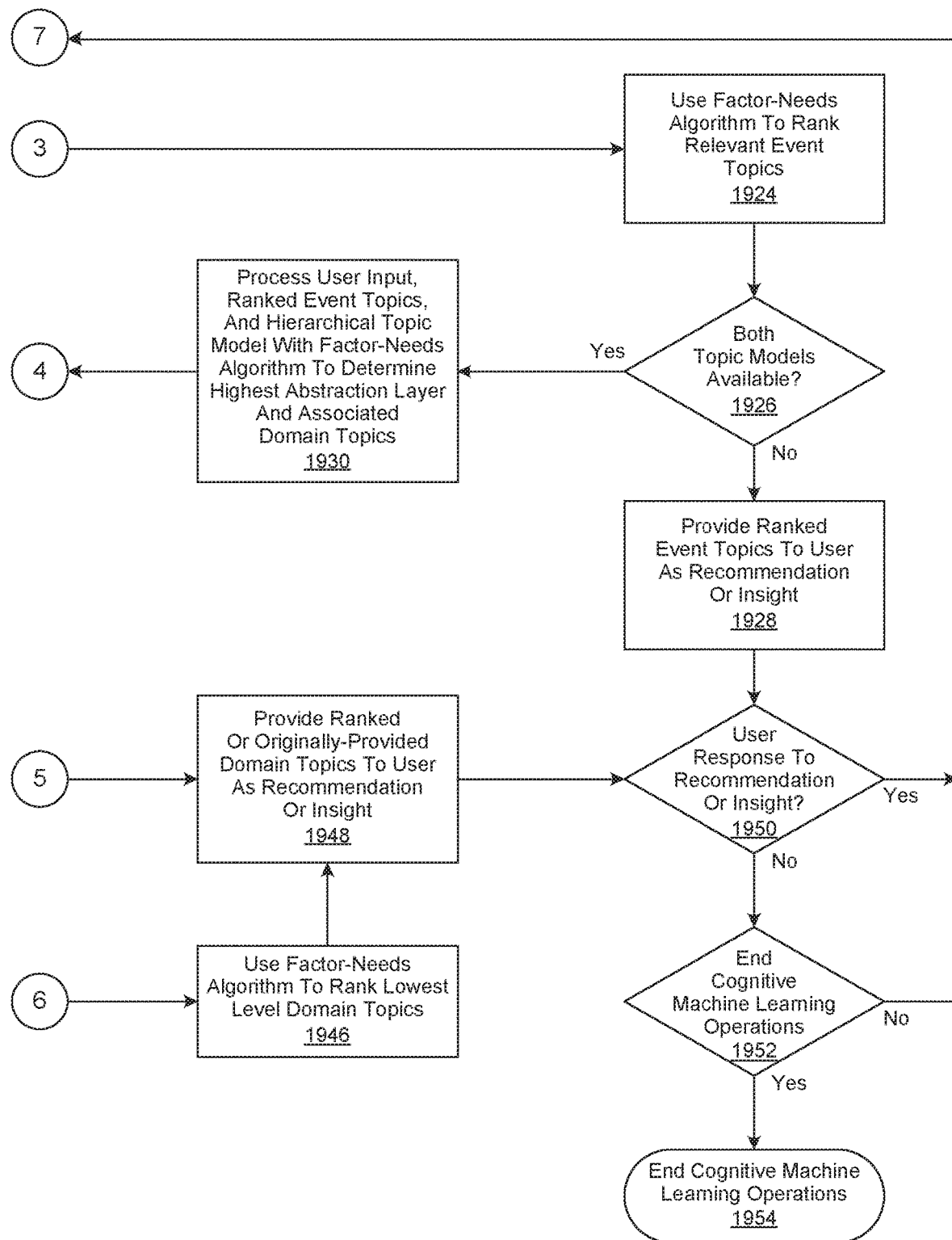

FIGS. 19*a* through 19*c* are a generalized flowchart of continuous cognitive machine learning operations performed in accordance with an embodiment of the invention. In this embodiment, continuous cognitive machine learning operations are begun in step 1902, followed by ongoing corpora ingestion and curation operations, described in greater detail herein, being performed in steps 1904 and 1906. A user query or other input related to a user is then received in step 1908, followed by a determination being made in step 1910 whether a relevant cognitive persona or cognitive profile, described in greater detail herein, is available for the user. If so, then they are retrieved in step 1912 and then processed in step 1914 for use as additional user input.

Thereafter, or if it was determined in step 1910 that a relevant cognitive persona or cognitive profile was not available, the user input is then processed in step 1916 to identify relevant hierarchical and temporal topic models. A determination is then made in step 1918 whether a relevant temporal topic model is available. If so, then user input and the temporal topic model is processed in step 1920 with a factor-needs algorithm to determine relevant events and their associated event topics.

A determination is then made in step 1922 whether a relevant hierarchical topic model is available. If not, then the relevant event topics determined in step 1920 are processed by the factor-needs algorithm in step 1924 to generate a ranked list of event topics. A determination is then made in step 1926 whether both hierarchical and temporal topic models are available. If not, then the ranked list of event topics is provided to the user in step 1928 as a ranked recommendation or cognitive insight. Otherwise, the user input, the ranked list of event topics, and a relevant hierarchical topic model are processed in step 1930 with a factor-needs algorithm to determine the highest relevant level of abstraction, and its associated domain topics, within the hierarchical topic model.

However, if it was respectively determined in steps 1918 and 1922 that a relevant temporal topic model was not available, or that a relevant hierarchical topic model was, then user input and the hierarchical topic model is processed in step 1932 with the factor-needs algorithm to determine the highest relevant abstraction level, and its associated domain topics, within the hierarchical topic model. The resulting highest relevant abstraction level determined in either step 1930 or step 1932, and its associated domain topics, is then provided to the user in step 1934. A determination is then made in step 1936 whether the user has selected one or more of the domain topics provided in step 1934. If so, then cognitive machine learning training data is generated in step 1938 by processing the user's domain topic selection(s) with a hierarchical topic navigation algorithm.

The factor-needs algorithm is then used in step 1940 to process the resulting cognitive machine learning training data, user input, ranked event topics, if generated in step 1924, and the hierarchical topic model, to determine the next lowest relevant level of abstraction, and its associated domain topics, within the hierarchical topic model. A determination is then made in step 1942 whether the lowest level of abstraction within the hierarchical topic model has been reached. If not, the next lowest level of abstraction within the hierarchical topic model, and its associated domain topics, is provided to the user in step 1946. The process is then continued, proceeding with step 1936.

However, if it was determined in step 1942 that the lowest level of abstraction in the hierarchical topic model has been reached, then the factor-needs algorithm is used in step 1946 to rank the domain topics associated with the lowest level of abstraction within the hierarchical topic model. Thereafter, or if it was determined in step 1936 that the user has not selected one or more domain topics, then the previously ranked domain topics, or the domain topics originally provided in step 1934, are provided to the user in step 1948 as a ranked recommendation or cognitive insight.

Thereafter, or after the ranked event topics are provided to the user as a ranked recommendation or cognitive insight in step 1928, a determination is made in step 1950 whether a response to the ranked recommendation or cognitive insight provided in steps 1928 or 1948 is received from the user. If so, then the process is continued, proceeding with step 1908. Otherwise, a determination is made in step 1952 whether to end continuous cognitive machine learning operations. If not, then the process is ended, proceeding with step 1908. Otherwise, continuous cognitive machine learning operations are ended in step 1954.

Figure 20A:
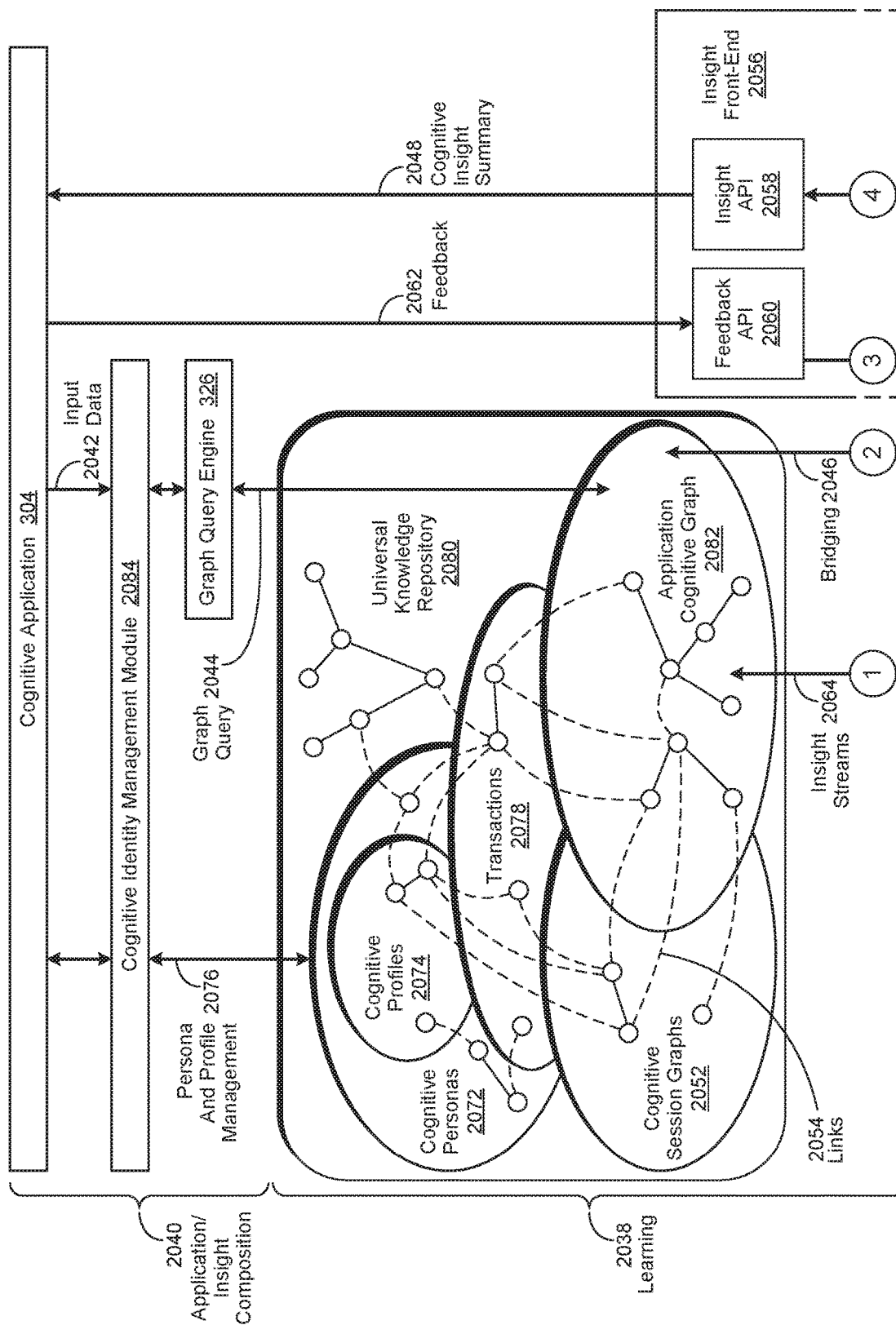
FIGS. 20a and 20b are a simplified process flow diagram showing the generation of cognitive insights by a CILS.
Figure 20B:
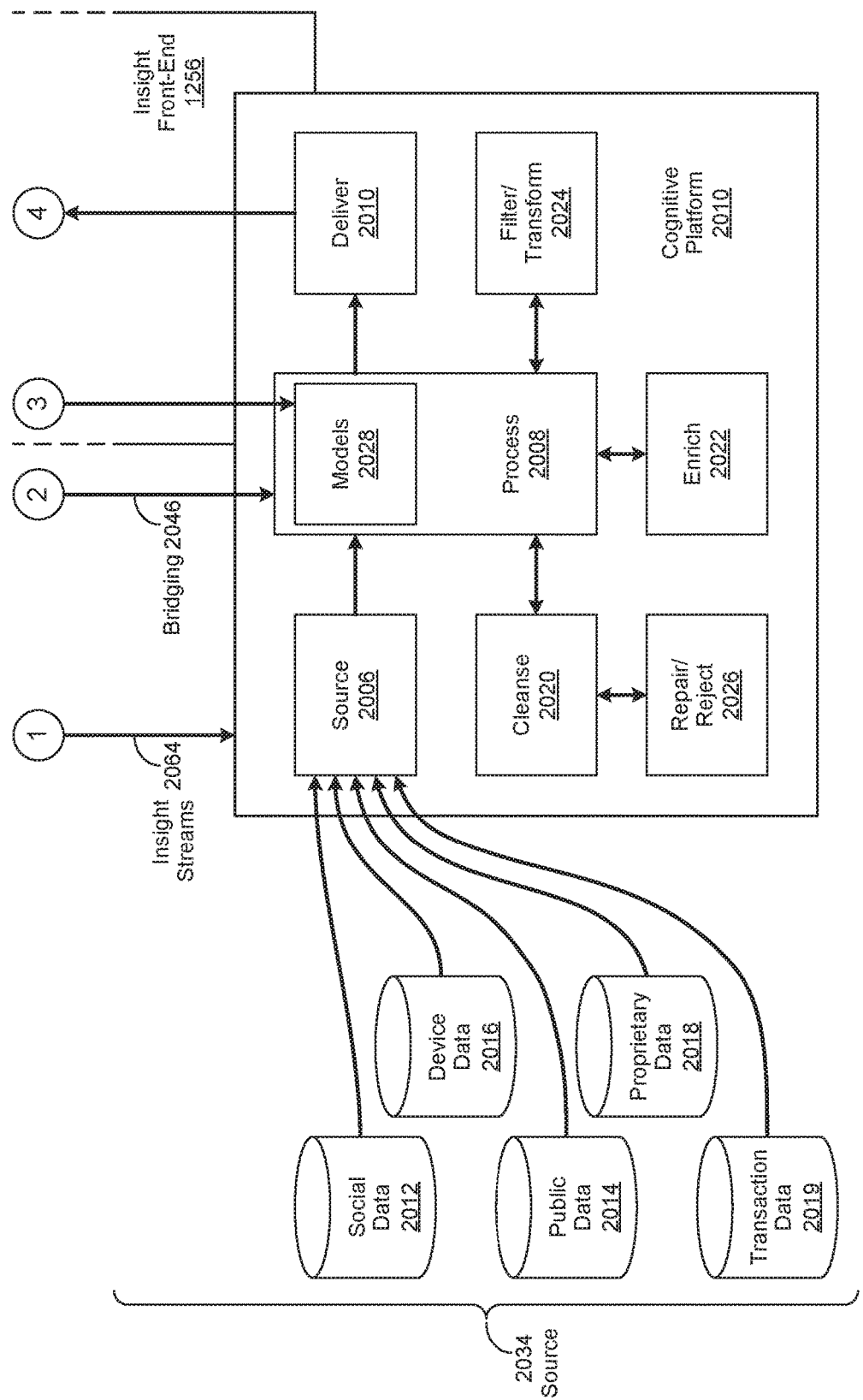

FIGS. 20*a* and 20*b* are a simplified process flow diagram showing the generation of cognitive insights by a Cognitive Inference and Learning System (CILS) implemented in accordance with an embodiment of the invention. In various embodiments, insight agents use a cognitive graph, such as an application cognitive graph 2082, as their data source to generate individual cognitive insights. As used herein, an application cognitive graph 2082 broadly refers to a cognitive graph that is associated with a particular cognitive application 304. In various embodiments, different cognitive applications 304 may interact with different application cognitive graphs 2082 to generate individual cognitive insights for a user. In certain embodiments, the resulting individual cognitive insights are then composed to generate a set of cognitive insights, which in turn is provided to a user in the form of a cognitive insight summary 2048.

In various embodiments, the orchestration of the selected insight agents is performed by the cognitive insight/learning engine 330 shown in FIG. 3. In certain embodiments, a subset of insight agents is selected to provide cognitive insights to satisfy a graph query 2044, a contextual situation, or some combination thereof. For example, it may be determined that a particular subset of insight agents may be suited to provide a cognitive insight related to a particular user of a particular device, at a particular location, at a particular time, for a particular purpose. In certain embodiments, the insight agents are selected for orchestration as a result of receiving direct or indirect input data 2042 from a user.

In various embodiments, the direct user input data 2042 may be a natural language inquiry. In certain embodiments, the indirect user input data 2042 may include the location of a user's device or the purpose for which it is being used. As an example, the Geographical Positioning System (GPS)

coordinates of the location of a user's mobile device may be received as indirect user input data 2042. In certain embodiments, the direct or indirect user input data 2042 may include personal information that can be used to identify the user. In various embodiments, a cognitive identity management module 2084 is implemented to manage personal information associated with the user. In various embodiments, the cognitive identity management module 2084 is implemented to interact with one or more cognitive applications 304. Skilled practitioners of the art will recognize that many such embodiments are possible. Accordingly, the foregoing is not intended to limit the spirit, scope or intent of the invention.

In various embodiments, cognitive insight generation and associated feedback operations may be performed in various phases. In this embodiment, these phases include a data lifecycle 2036 phase, a learning 2038 phase, and an application/insight composition 2040 phase. In the data lifecycle 2036 phase, an instantiation of a cognitive platform 2010 sources social data 2012, public data 2014, licensed data 2016, proprietary data 2018, and transaction data 2019 from various sources as described in greater detail herein. In various embodiments, an example of a cognitive platform 2010 instantiation is the cognitive platform 310 shown in FIG. 3. In this embodiment, the instantiation of a cognitive platform 2010 includes a source 2006 component, a process 2008 component, a deliver 2010 component, a cleanse 2020 component, an enrich 2022 component, a filter/transform 2024 component, and a repair/reject 2026 component. Likewise, as shown in FIG. 20b, the process 2008 component includes a repository of models 2028, described in greater detail herein.

In various embodiments, the process 2008 component is implemented to perform various cognitive insight generation and other processing operations described in greater detail herein. In these embodiments, the process 2008 component is implemented to interact with the source 2006 component, which in turn is implemented to perform various data sourcing operations described in greater detail herein. In various embodiments, the sourcing operations are performed by one or more sourcing agents, as likewise described in greater detail herein. The resulting sourced data is then provided to the process 2008 component. In turn, the process 2008 component is implemented to interact with the cleanse 2020 component, which is implemented to perform various data cleansing operations familiar to those of skill in the art. As an example, the cleanse 2020 component may perform data normalization or pruning operations, likewise known to skilled practitioners of the art. In certain embodiments, the cleanse 2020 component may be implemented to interact with the repair/reject 2026 component, which in turn is implemented to perform various data repair or data rejection operations known to those of skill in the art.

Once data cleansing, repair and rejection operations are completed, the process 2008 component is implemented to interact with the enrich 2022 component, which is implemented in various embodiments to perform various data enrichment operations described in greater detail herein. Once data enrichment operations have been completed, the process 2008 component is likewise implemented to interact with the filter/transform 2024 component, which in turn is implemented to perform data filtering and transformation operations described in greater detail herein. In various embodiments, the process 2008 component is implemented to generate various models, described in greater detail herein, which are stored in the repository of models 2028.

The process 2008 component is likewise implemented in various embodiments to use the sourced data to generate one or more cognitive graphs, such as an application cognitive graph 2082 and the transactions knowledge repository 2078, as likewise described in greater detail herein. In various embodiments, the process 2008 component is implemented to gain an understanding of the data sourced from the sources of social data 2012, public data 2014, device data 2016, proprietary data 2018, and transaction data 2019, which assist in the automated generation of the application cognitive graph 2082 and the transactions knowledge repository 2078.

The process 2008 component is likewise implemented in various embodiments to perform bridging 2046 operations, described in greater detail herein, to access the application cognitive graph 2082 and the transactions knowledge repository 2078. In certain embodiments, the bridging 2046 operations are performed by bridging agents, likewise described in greater detail herein. In certain embodiments, the application cognitive graph 2082 and the transactions knowledge repository 2078 is accessed by the process 2008 component during the learn 2036 phase of the cognitive insight generation operations.

In various embodiments, a cognitive application 304 is implemented to receive input data associated with an individual user or a group of users. In these embodiments, the input data may be direct, such as a user query or mouse click, or indirect, such as the current time or Geographical Positioning System (GPS) data received from a mobile device associated with a user. In various embodiments, the indirect input data may include contextual data, described in greater detail herein. Once it is received, the input data 2042 is then submitted by the cognitive application 304 to a graph query engine 326 during the application/insight composition 2040 phase. In various embodiments, an inferred learning style, described in greater detail herein, is implemented by the CILS to perform cognitive learning operation. In certain embodiments, the CILS is likewise implemented to interpret the results of the cognitive learning operations such that they are consumable by a recipient, and by extension, present them in a form that this actionable in act 2040 phase. In various embodiments, the act 2040 phase is implemented to support an interaction, described in greater detail herein.

The submitted input data 2042 is then processed by the graph query engine 326 to generate a graph query 2044, as described in greater detail herein. The graph query 2044 is then used to query the application cognitive graph 2082, which results in the generation of one or more cognitive insights, likewise described in greater detail herein. In certain embodiments, the graph query 2044 uses knowledge elements stored in the universal knowledge repository 2080 and the transactions knowledge repository 2078 when querying the application cognitive graph 2082 to generate the one or more cognitive insights.

In various embodiments, the graph query 2044 results in the selection of a cognitive persona from a cognitive personas repository 2072 according to a set of contextual information associated with a user. As used herein, a cognitive persona broadly refers to an archetype user model that represents a common set of attributes associated with a hypothesized group of users. In various embodiments, the common set of attributes may be described through the use of demographic, geographic, psychographic, behavioristic, and other information. As an example, the demographic information may include age brackets (e.g., 25 to 34 years old), gender, marital status (e.g., single, married, divorced, etc.), family size, income brackets, occupational classifications, educational achievement, and so forth. Likewise, the geographic information may include the cognitive persona's typical living and working locations (e.g., rural, semi-rural, suburban, urban, etc.) as well as characteristics associated with individual locations (e.g., parochial, cosmopolitan, population density, etc.).

The psychographic information may likewise include information related to social class (e.g., upper, middle, lower, etc.), lifestyle (e.g., active, healthy, sedentary, reclusive, etc.), interests (e.g., music, art, sports, etc.), and activities (e.g., hobbies, travel, going to movies or the theatre, etc.). Other psychographic information may be related to opinions, attitudes (e.g., conservative, liberal, etc.), preferences, motivations (e.g., living sustainably, exploring new locations, etc.), and personality characteristics (e.g., extroverted, introverted, etc.) Likewise, the behavioristic information may include information related to knowledge and attitude towards various manufacturers or organizations and the products or services they may provide. In various embodiments, one or more cognitive personas may be associated with a user. In certain embodiments, a cognitive persona is selected and then used by a CILS to generate one or more cognitive insights as described in greater detail herein. In these embodiments, the cognitive insights that are generated for a user as a result of using a first cognitive persona may be different than the cognitive insights that are generated as a result of using a second cognitive persona.

In various embodiments, provision of the cognitive insights results in the CILS receiving feedback 2062 data from various individual users and other sources, such as a cognitive application 304. In one embodiment, the feedback 2062 data is used to revise or modify the cognitive persona. In another embodiment, the feedback 2062 data is used to create a new cognitive persona. In yet another embodiment, the feedback 2062 data is used to create one or more associated cognitive personas, which inherit a common set of attributes from a source cognitive persona. In one embodiment, the feedback 2062 data is used to create a new cognitive persona that combines attributes from two or more source cognitive personas. In another embodiment, the feedback 2062 data is used to create a cognitive profile based upon the cognitive persona.

As used herein, a cognitive profile refers to an instance of a cognitive persona that references personal data associated with a user. In various embodiments, the personal data may include the user's name, address, Social Security Number (SSN), age, gender, marital status, occupation, employer, income, education, skills, knowledge, interests, preferences, likes and dislikes, goals and plans, and so forth. In certain embodiments, the personal data may include data associated with the user's interaction with a CILS and related cognitive insights that are generated and provided to the user. In various embodiments, the personal data may be distributed. In certain of these embodiments, subsets of the distributed personal data may be logically aggregated to generate one or more cognitive profiles, each of which is associated with the user. In various embodiments, the user's interaction with a CILS may be provided to the CILS as feedback 2062 data. In certain embodiments, the graph query 2044 results in the selection of a cognitive profile from the cognitive profiles repository 2074 according to identification information associated with a user. Those of skill in the art will realize that many such embodiments are possible. Accordingly, the foregoing is not intended to limit the spirit, scope or intent of the invention.

In certain embodiments, the universal knowledge repository 2080 includes the cognitive personas repository 2072. In various embodiments, a cognitive profiles repository 2074 is included in the cognitive personas repository 2072. In certain embodiments, the universal knowledge repository 2080 may contain a repository of session graphs 2052. In various embodiments, the universal knowledge repository 2080 may contain the transactions knowledge repository 2078. In certain embodiments, individual personas in the cognitive personas repository 2072 are implemented as cognitive graphs.

In various embodiments, individual nodes within the cognitive personas stored in the cognitive personas repository 2072 are linked 2054 to corresponding nodes in the universal knowledge repository 2080. In certain embodiments, individual nodes within cognitive personas stored in the cognitive personas repository 2072 are linked 2054 to corresponding nodes in the cognitive profiles repository 2074. In various embodiments, individual nodes within the cognitive personas repository 2072, and individual nodes within the cognitive profiles 2074, are linked 2054 to corresponding nodes in the transactions knowledge repository 2078. In certain embodiments, individual nodes within the cognitive profiles repository 2074 are linked 2054 to corresponding nodes within the universal knowledge repository 2080, which are likewise linked 2054 to corresponding nodes within the cognitive application graph 2082.

As used herein, contextual information broadly refers to information associated with a location, a point in time, a user role, an activity, a circumstance, an interest, a desire, a perception, an objective, or a combination thereof. In various embodiments, the contextual information is likewise used in combination with the selected cognitive persona to generate one or more cognitive insights for a user. In certain embodiments, the contextual information may likewise be used in combination with the selected cognitive persona to perform one or more associated cognitive learning operations. In various embodiments, the cognitive insights that are generated for a user as a result of using a first set of contextual information may be different than the cognitive insights that are generated as a result of using a second set of contextual information.

In one embodiment, the result of using a first set of contextual information in combination with the selected cognitive persona to perform an associated cognitive learning operation may be different than the result of using a second set of contextual information in combination with the selected cognitive persona to perform the same cognitive learning operation. In another embodiment, the cognitive insights that are generated for a user as a result of using a set of contextual information with a first cognitive persona may be different than the cognitive insights that are generated as a result of using the same set of contextual information with a second cognitive persona. In yet another embodiment, the result of using a set of contextual information in combination with a first cognitive persona to perform an associated cognitive learning operation may be different than the result of using the same set of contextual information in combination with a second cognitive persona to perform the same cognitive learning operation.

As an example, a user may have two associated cognitive personas, "purchasing agent" and "retail shopper," which are respectively selected according to two sets of contextual information. In this example, the "purchasing agent" cognitive persona may be selected according to a first set of contextual information associated with the user performing business purchasing activities in their office during business hours, with the objective of finding the best price for a particular commercial inventory item. Conversely, the "retail shopper" cognitive persona may be selected according to a second set of contextual information associated with the user performing cognitive personal shopping activities in their home over a weekend, with the objective of finding a decorative item that most closely matches their current furnishings.

Those of skill in the art will realize that the cognitive insights generated as a result of combining the first cognitive persona with the first set of contextual information will likely be different than the cognitive insights generated as a result of combining the second cognitive persona with the second set of contextual information. Likewise, the result of a cognitive learning operation that uses the first cognitive persona in combination with the first set of contextual information will likely be different that the result of a cognitive learning operation that uses a second cognitive persona in combination with a second set of contextual information. Skilled practitioners of the art will recognize that many such embodiments are possible. Accordingly, the foregoing is not intended to limit the spirit, scope or intent of the invention.

In various embodiments, provision of the cognitive insights results in the CILS receiving feedback 2062 information related to an individual user. In one embodiment, the feedback 2062 information is used to revise or modify a particular cognitive persona. In another embodiment, the feedback 2062 information is used to revise or modify a cognitive profile associated with a user. In yet another embodiment, the feedback 2062 information is used to create a new cognitive profile, which in turn is stored in the cognitive profiles repository 2074. In still yet another embodiment, the feedback 2062 information is used to create one or more associated cognitive profiles, which inherit a common set of attributes from a source cognitive profile. In another embodiment, the feedback 2062 information is used to create a new cognitive profile that combines attributes from two or more source cognitive profiles. In various embodiments, these persona and profile management operations 2076 are performed through interactions between the cognitive application 304, the cognitive identity management module 2084, the cognitive personas repository 2072, the cognitive profiles repository 2074, the transactions knowledge repository 2078, the cognitive session graphs repository 2052, the universal knowledge repository 2080, or some combination thereof.

In various embodiments, the feedback 2062 is generated as a result of an interaction. In various embodiments, the interaction may be between any combination of devices, applications, services, processes, or users. In certain embodiments, the interaction may be explicitly or implicitly initiated by the provision of input data 2042 to the devices, applications, services, processes or users. In various embodiments, the input data 2042 may be provided in response to a cognitive insight provided by a CILS. In one embodiment, the input data 2042 may include a user gesture, such as a key stroke, mouse click, finger swipe, or eye movement. In another embodiment, the input data may include a voice command from a user.

In yet another embodiment, the input data 2042 may include data associated with a user, such as biometric data (e.g., retina scan, fingerprint, body temperature, pulse rate, etc.). In yet still another embodiment, the input data may include environmental data (e.g., current temperature, etc.), location data (e.g., geographical positioning system coordinates, etc.), device data (e.g., telemetry data, etc.), or other data provided by a device, application, service, process or user. In these embodiments, the feedback 2062 may be used to perform various cognitive learning operations, the results of which are used to update a cognitive persona or profile associated with a user. Those of skill in the art will realize that many such embodiments are possible. Accordingly, the foregoing is not intended to limit the spirit, scope or intent of the invention.

In various embodiments, a cognitive profile associated with a user may be either static or dynamic. As used herein, a static cognitive profile refers to a cognitive profile that contains identification information associated with a user that changes on an infrequent basis. As an example, a user's name, Social Security Number (SSN), or passport number may not change, although their age, address or employer may change over time. To continue the example, the user may likewise have a variety of financial account identifiers and various travel awards program identifiers which change infrequently.

As likewise used herein, a dynamic cognitive profile refers to a cognitive profile that contains information associated with a user that changes on a dynamic basis. For example, a user's interests and activities may evolve over time, which may be evidenced by associated interactions 2050 with the CILS. In various embodiments, these interactions 2050 result in the provision of various cognitive insights to the user. In certain embodiments, these interactions 2050 may likewise be used to perform one or more associated cognitive learning operations, the results of which may in turn be used to generate a cognitive insight. In these embodiments, the user's interactions 2050 with the CILS, and the resulting cognitive insights that are generated, are used to update the dynamic cognitive profile on an ongoing basis to provide an up-to-date representation of the user in the context of the cognitive profile used to generate the cognitive insights.

In various embodiments, a cognitive profile, whether static or dynamic, is selected from the cognitive profiles repository 2074 according to a set of contextual information associated with a user. In certain embodiments, the contextual information is likewise used in combination with the selected cognitive profile to generate one or more cognitive insights for the user. In various embodiments, the contextual information may likewise be used in combination with the selected cognitive profile to perform one or more associated cognitive learning operations. In one embodiment, the cognitive insights that are generated as a result of using a first set of contextual information in combination with the selected cognitive profile may be different than the cognitive insights that are generated as a result of using a second set of contextual information with the same cognitive profile. In another embodiment, the result of using a first set of contextual information in combination with the selected cognitive profile to perform an associated cognitive learning operation may be different than the result of using a second set of contextual information in combination with the selected cognitive profile to perform the same cognitive learning operation.

In various embodiments, one or more cognitive profiles may be associated with a user. In certain embodiments, the cognitive insights that are generated for a user as a result of using a set of contextual information with a first cognitive profile may be different than the cognitive insights that are generated as a result of using the same set of contextual information with a second cognitive profile. In one embodiment, the result of using a set of contextual information in combination with a first cognitive profile to perform an associated cognitive learning operation may be different than the result of using the same set of contextual information in combination with a second cognitive profile to perform the same cognitive learning operation.

As an example, a user may have two associated cognitive profiles, "runner" and "foodie," which are respectively selected according to two sets of contextual information. In this example, the "runner" cognitive profile may be selected according to a first set of contextual information associated with the user being out of town on business travel and wanting to find a convenient place to run close to where they are staying. To continue this example, the contextual information may be booking and payment information contained within a blockchain transaction associated with the user. To further continue this example, two cognitive insights may be generated and provided to the user in the form of a cognitive insight summary 2048. The first may be suggesting a running trail the user has used before and liked, but needs directions to find again. The second may be suggesting a new running trail that is equally convenient, but wasn't available the last time the user was in town.

Conversely, the "foodie" cognitive profile may be selected according to a second set of contextual information associated with the user being at home and expressing an interest in trying either a new restaurant or an innovative cuisine. In furtherance of this example, the user's "foodie" cognitive profile may be processed by the CILS to determine which restaurants and cuisines the user has tried in the last eighteen months. In this example, the contextual information may be ordering and payment information contained in various blockchain transactions associated with the user. As a result, two cognitive insights may be generated and provided to the user in the form of a cognitive insight summary 2048. The first may be a suggestion for a new restaurant that is serving a cuisine the user has enjoyed in the past. The second may be a suggestion for a restaurant familiar to the user that includes a promotional offer for a seasonal menu featuring Asian fusion dishes the user has not tried before.

Those of skill in the art will realize that the cognitive insights generated as a result of combining the first cognitive profile with the first set of contextual information will likely be different than the cognitive insights generated as a result of combining the second cognitive profile with the second set of contextual information. Likewise, the result of a cognitive learning operation that uses the first cognitive profile in combination with the first set of contextual information will likely be different that the result of a cognitive learning operation that uses a second cognitive profile in combination with a second set of contextual information.

In various embodiments, a user's cognitive profile, whether static or dynamic, may reference data that is proprietary to the user, a group, an organization, or some combination thereof. As used herein, proprietary data broadly refers to data that is owned, controlled, or a combination thereof, by an individual user, group, or organization, which is deemed important enough that it gives competitive advantage to that individual or organization. In certain embodiments, the organization may be a governmental, non-profit, academic or social entity, a manufacturer, a wholesaler, a retailer, a service provider, an operator of a cognitive inference and learning system (CILS), and others.

In various embodiments, an organization may or may not grant a user the right to obtain a copy of certain proprietary information referenced by their cognitive profile. In certain embodiments, access to the proprietary information may be controlled through the implementation of a cognitive identity management module 2084. In various embodiments, a first organization may or may not grant a user the right to obtain a copy of certain proprietary information referenced by their cognitive profile and provide it to a second organization. As an example, the user may not be granted the right to provide travel detail information (e.g., travel dates and destinations, etc.) associated with an awards program provided by a first travel services provider (e.g., an airline, a hotel chain, a cruise ship line, etc.) to a second travel services provider. In various embodiments, the user may or may not grant a first organization the right to provide a copy of certain proprietary information referenced by their cognitive profile to a second organization. Those of skill in the art will recognize that many such embodiments are possible. Accordingly, the foregoing is not intended to limit the spirit, scope or intent of the invention.

In various embodiments, a set of contextually-related interactions between a cognitive application 304 and the application cognitive graph 2082 are represented as a corresponding set of nodes in a cognitive session graph, which is then stored in a cognitive session graphs repository 2052. As used herein, a cognitive session graph broadly refers to a cognitive graph whose nodes are associated with a cognitive session. As used herein, a cognitive session broadly refers to a user, group of users, theme, topic, issue, question, intent, goal, objective, task, assignment, process, situation, requirement, condition, responsibility, location, period of time, a block in a blockchain, a blockchain transaction associated with a blockchain block, or any combination thereof. In various embodiments, the results of a cognitive learning operation, described in greater detail herein, may be stored in a session graph.

In certain embodiments, a cognitive session graph is used to generate a cognitive insight for a user. As an example, the application cognitive graph 2082 may be unaware of a particular user's preferences, which are likely stored in a corresponding user profile. To further the example, a user may typically choose a particular brand or manufacturer when shopping for a given type of product, such as cookware, thereby indicating their preferences. A record of each query regarding that brand of cookware, or its selection, is iteratively stored in a session graph that is associated with the user and stored in a repository of session graphs 2052. As a result, the preference of that brand of cookware is ranked higher, and a cognitive insight containing promotional offer for that brand of cookware is presented in response to the contextually-related queries, even when the preferred brand of cookware is not explicitly referenced by the user. To continue the example, the user may make a number of queries over a period of days or weeks. However, the queries, and their corresponding cognitive insights, are associated with the same cognitive session graph that is associated with the user. Furthermore, the queries and their corresponding cognitive insights are respectively stored in the repository of session graphs 2052 and transactions knowledge repository 2078, regardless of when each query is made. In this example, the record of each query, and their corresponding cognitive insight, is used to perform an associated cognitive learning operation, the results of which may be stored in an associated session graph.

As another example, a user may submit a query to a cognitive application 304 during business hours to find an upscale restaurant located close their place of business. As a result, a first cognitive session graph stored in a cognitive session graphs repository 2052 is associated with the user's query, which results in the provision of cognitive insights related to restaurants suitable for business meetings. To continue the example, the same user queries the same cognitive application 304 during the weekend to locate a casual restaurant located close to their home. As a result, a second cognitive session graph stored in a cognitive session graphs repository 2052 is associated with the user's query, which results in the provision of cognitive insights related to restaurants suitable for family meals. In these examples, the first and second cognitive session graphs are both associated with the same user, but for two different purposes, which results in the provision of two different sets of cognitive insights.

As yet another example, a group of customer support representatives is tasked with resolving technical issues customers may have with a product. In this example, the product and the group of customer support representatives are collectively associated with a cognitive session graph stored in a cognitive session graphs repository 2052. To continue the example, individual customer support representatives may submit queries related to the product to a cognitive application 304, such as a knowledge base application. In response, a cognitive session graph stored in a cognitive session graphs repository 2052 is used, along with transactions knowledge repository 2078, the universal knowledge repository 2080, and application cognitive graph 2082, to generate individual or composite cognitive insights to resolve a technical issue for a customer. In this example, the cognitive application 304 may be queried by the individual customer support representatives at different times during some time interval, yet the same cognitive session graph stored in a cognitive session graphs repository 2052 is used to generate cognitive insights related to the product.

In various embodiments, each cognitive session graph associated with a user, and stored in a cognitive session graphs repository 2052, includes one or more direct or indirect user queries represented as nodes, and the time at which they were asked, which are in turn linked 2054 to nodes that appear in the application cognitive graph 2082. In certain embodiments, each individual cognitive session graph that is associated with the user and stored in a cognitive session graphs repository 2052 introduces edges that are not already present in the application cognitive graph 2082. More specifically, each of the cognitive session graphs that is associated with the user and stored in a cognitive session graphs repository 2052 establishes various relationships that the application cognitive graph 2082 does not already have.

In various embodiments, individual cognitive profiles in the cognitive profiles repository 2074 are respectively stored as session graphs in the repository of session graphs 2052. In these embodiments, nodes within each of the individual cognitive profiles are linked 2054 to nodes within corresponding cognitive session graphs stored in the repository of cognitive session graphs '1' through 'n' 2054. In certain embodiments, individual nodes within each of the cognitive profiles are likewise linked 2054 to corresponding nodes within various cognitive personas stored in the cognitive personas repository 2072.

In various embodiments, individual graph queries 2044 associated with a session graph stored in a cognitive session graphs repository 2052 are likewise provided to insight agents to perform various kinds of analyses. In certain embodiments, each insight agent performs a different kind of analysis. In various embodiments, different insight agents may perform the same, or similar, analyses. In certain embodiments, different agents performing the same or similar analyses may be competing between themselves.

For example, a user may be a realtor that has a young, upper middle-class, urban-oriented clientele that typically enjoys eating at trendy restaurants that are in walking distance of where they live. As a result, the realtor may be interested in knowing about new or popular restaurants that are in walking distance of their property listings that have a young, middle-class clientele. In this example, the user's queries may result the assignment of insight agents to perform analysis of various social media interactions to identify such restaurants that have received favorable reviews. To continue the example, the resulting cognitive insights may be provided as a ranked list of candidate restaurants that may be suitable venues for the realtor to meet his clients.

In various embodiments, the process 2008 component is implemented to provide these cognitive insights to the deliver 2010 component, which in turn is implemented to deliver the cognitive insights in the form of a cognitive insight summary 2048 to the cognitive business processes and applications 304. In these embodiments, the cognitive platform 2010 is implemented to interact with an insight front-end 2056 component, which provides a composite insight and feedback interface with the cognitive application 304. In certain embodiments, the insight front-end 2056 component includes an insight Application Program Interface (API) 2058 and a feedback API 2060, described in greater detail herein. In these embodiments, the insight API 2058 is implemented to convey the cognitive insight summary 2048 to the cognitive application 304. Likewise, the feedback API 2060 is used to convey associated direct or indirect user feedback 2062 to the cognitive platform 2010. In certain embodiments, the feedback API 2060 provides the direct or indirect user feedback 2062 to the repository of models 2028 described in greater detail herein.

To continue the preceding example, the user may have received a list of candidate restaurants that may be suitable venues for meeting his clients. However, one of his clients has a pet that they like to take with them wherever they go. As a result, the user provides feedback 2062 that he is looking for a restaurant that is pet-friendly. The provided feedback 2062 is in turn provided to the insight agents to identify candidate restaurants that are also pet-friendly. In this example, the feedback 2062 is stored in the appropriate cognitive session graph 2052 associated with the user and their original query.

In various embodiments, as described in the descriptive text associated with FIGS. 4, 6, 7a and 7b, cognitive learning operations are iteratively performed during the learn 2036 phase to provide more accurate and useful cognitive insights. In certain of these embodiments, feedback 2062 received from the user is stored in a session graph that is associated with the user and stored in a repository of session graphs 2052, which is then used to provide more accurate cognitive insights in response to subsequent contextually-relevant queries from the user. In various embodiments, the feedback 2062 received from the user is used to perform cognitive learning operations, the results of which are then stored in a session graph that is associated with the user. In these embodiments, the session graph associated with the user is stored in a repository of session graphs 2052.

As an example, cognitive insights provided by a particular insight agent related to a first subject may not be relevant or particularly useful to a user of a cognitive application 304. As a result, the user provides feedback 2062 to that effect, which in turn is stored in the appropriate session graph that is associated with the user and stored in a repository of session graphs 2052. Accordingly, subsequent insights provided by the insight agent related the first subject may be ranked lower, or not provided, within a cognitive insight summary 2048 provided to the user. Conversely, the same insight agent may provide excellent cognitive insights related to a second subject, resulting in positive feedback 2062 being received from the user. The positive feedback 2062 is likewise stored in the appropriate session graph that is associated with the user and stored in a repository of session graphs 2052. As a result, subsequent cognitive insights provided by the insight agent related to the second subject may be ranked higher within a cognitive insight summary 2048 provided to the user.

In various embodiments, the cognitive insights provided in each cognitive insight summary 2048 to the cognitive application 304, and corresponding feedback 2062 received from a user in return, is provided to an associated session graph 2052 in the form of one or more insight streams 2064. In these and other embodiments, the insight streams 2064 may contain information related to the user of the cognitive application 304, the time and date of the provided cognitive insights and related feedback 2062, the location of the user, and the device used by the user.

As an example, a query related to upcoming activities that is received at 10:00 AM on a Saturday morning from a user's home may return cognitive insights related to entertainment performances scheduled for the weekend. Conversely, the same query received at the same time on a Monday morning from a user's office may return cognitive insights related to business functions scheduled during the work week. In various embodiments, the information contained in the insight streams 2064 is used to rank the cognitive insights provided in the cognitive insight summary 2048. In certain embodiments, the cognitive insights are continually re-ranked as additional insight streams 2064 are received. Skilled practitioners of the art will recognize that many such embodiments are possible. Accordingly, the foregoing is not intended to limit the spirit, scope or intent of the invention.

Although the present invention has been described in detail, it should be understood that various changes, substitutions and alterations can be made hereto without departing from the spirit and scope of the invention as defined by the appended claims.

What is claimed is:

1. A computer-implementable method for generating a cognitive insight comprising:
   receiving training data, the training data being based upon interactions between a user and a cognitive learning and inference system;
   performing a cognitive learning operation via a cognitive inference and learning system using the training data, the cognitive learning operation implementing a cognitive learning technique according to a cognitive learning framework, the cognitive learning framework comprising a plurality of cognitive learning styles and a plurality of cognitive learning categories, each of the plurality of cognitive learning styles comprising a generalized learning approach implemented by the cognitive inference and learning system to perform the cognitive learning operation, each of the plurality of cognitive learning categories referring to a source of information used by the cognitive inference and learning system when performing the cognitive learning operation, an individual cognitive learning technique being associated with a primary cognitive learning style and bounded by an associated primary cognitive learning category, the cognitive learning operation applying the cognitive learning technique via a machine learning operation to generate a cognitive learning result;
   performing a ranked insight machine learning operation on the training data, the machine learning operation comprising the ranked insight machine learning operation;
   generating a cognitive profile based upon the information generated by performing the ranked insight machine learning operation; and,
   generating a cognitive insight based upon the cognitive profile generated using the ranked insight machine learning operation.

2. The method of claim 1, wherein:
   the ranked insight machine learning operation performs a factor-needs operation when generating the cognitive profile.

3. The method of claim 2, wherein:
   the factor-needs operation generates a needs graph model, the needs graph model utilizing a matrix approach to map each of a plurality of users to a plurality of factors, each of the plurality of factors comprising certain attributes.

4. The method of claim 3, wherein:
   the factor-needs operation receives information relating to each of a plurality of topics, the information relating to each of the plurality of topics comprising information regarding a degree of abstraction associated with each of a plurality of topics.

5. The method of claim 4, wherein:
   the factor-needs operation determines a highest level of abstraction relevant to each of the plurality of topics.

6. The method of claim 5, further comprising:
   using the highest level of abstraction relevant to each of the plurality of topics when generating the cognitive insight based upon the cognitive profile.

7. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations and comprising instructions executable by the processor and configured for:
   receiving training data, the training data being based upon interactions between a user and a cognitive learning and inference system;
   performing a cognitive learning operation via a cognitive inference and learning system using the training data, the cognitive learning operation implementing a cognitive learning technique according to a cognitive learning framework, the cognitive learning framework comprising a plurality of cognitive learning styles and a plurality of cognitive learning categories, each of the plurality of cognitive learning styles comprising a generalized learning approach implemented by the cognitive inference and learning system to perform the cognitive learning operation, each of the plurality of cognitive learning categories referring to a source of information used by the cognitive inference and learning system when performing the cognitive learning operation, an individual cognitive learning technique being associated with a primary cognitive learning style and bounded by an associated primary cognitive learning category, the cognitive learning operation applying the cognitive learning technique via a machine learning operation to generate a cognitive learning result;

performing a ranked insight machine learning operation on the training data, the machine learning operation comprising the ranked insight machine learning operation;

generating a cognitive profile based upon the information generated by performing the ranked insight machine learning operation; and, generating a cognitive insight based upon the cognitive profile generated using the plurality of ranked insight machine learning operation.

8. The system of claim 7, wherein:
the ranked insight machine learning operation performs a factor-needs operation when generating the cognitive profile.

9. The system of claim 8, wherein:
the factor-needs operation generates a needs graph model, the needs graph model utilizing a matrix approach to map each of a plurality of users to a plurality of factors, each of the plurality of factors comprising certain attributes.

10. The system of claim 9, wherein:
the factor-needs operation receives information relating to each of a plurality of topics, the information relating to each of the plurality of topics comprising information regarding a degree of abstraction associated with each of a plurality of topics.

11. The system of claim 10, wherein:
the factor-needs operation determines a highest level of abstraction relevant to each of the plurality of topics.

12. The system of claim 11, wherein the instructions executable by the processor further comprise instructions for:
using the highest level of abstraction relevant to each of the plurality of topics when generating the cognitive insight based upon the cognitive profile.

13. A non-transitory, computer-readable storage medium embodying computer program code, the computer program code comprising computer executable instructions configured for:

receiving training data, the training data being based upon interactions between a user and a cognitive learning and inference system;

performing a cognitive learning operation via a cognitive inference and learning system using the training data, the cognitive learning operation implementing a cognitive learning technique according to a cognitive learning framework, the cognitive learning framework comprising a plurality of cognitive learning styles and a plurality of cognitive learning categories, each of the plurality of cognitive learning styles comprising a generalized learning approach implemented by the cognitive inference and learning system to perform the cognitive learning operation, each of the plurality of cognitive learning categories referring to a source of information used by the cognitive inference and learning system when performing the cognitive learning operation, an individual cognitive learning technique being associated with a primary cognitive learning style and bounded by an associated primary cognitive learning category, the cognitive learning operation applying the cognitive learning technique via a machine learning operation to generate a cognitive learning result;

performing a ranked insight machine learning operation on the training data, the machine learning operation comprising the ranked insight machine learning operation;

generating a cognitive profile based upon the information generated by performing the ranked insight machine learning operation; and, generating a cognitive insight based upon the cognitive profile generated using the ranked insight machine learning operation.

14. The non-transitory, computer-readable storage medium of claim 13, wherein:
the ranked insight machine learning operation performs a factor-needs operation when generating the cognitive profile.

15. The non-transitory, computer-readable storage medium of claim 14, wherein:
the factor-needs operation generates a needs graph model, the needs graph model utilizing a matrix approach to map each of a plurality of users to a plurality of factors, each of the plurality of factors comprising certain attributes.

16. The non-transitory, computer-readable storage medium of claim 15, wherein:
the factor-needs operation receives information relating to each of a plurality of topics, the information relating to each of the plurality of topics comprising information regarding a degree of abstraction associated with each of a plurality of topics.

17. The non-transitory, computer-readable storage medium of claim 16, wherein:
the factor-needs operation determines a highest level of abstraction relevant to each of the plurality of topics.

18. The non-transitory, computer-readable storage medium of claim 17, wherein the instructions executable by the processor further comprise instructions for
using the highest level of abstraction relevant to each of the plurality of topics when generating the cognitive insight based upon the cognitive profile.

19. The non-transitory, computer-readable storage medium of claim 13, wherein the computer executable instructions are deployable to a client system from a server system at a remote location.

20. The non-transitory, computer-readable storage medium of claim 13, wherein the computer executable instructions are provided by a service provider to a user on an on-demand basis.

* * * * *